United States Patent [19]
Lange et al.

[11] Patent Number: 5,815,608
[45] Date of Patent: Sep. 29, 1998

[54] APPARATUS AND METHOD FOR SENSING AND PROCESSING IMAGES

[75] Inventors: Eberhard Lange; Kunihiko Hara; Eiichi Funatsu; Jun Ohta; Shuichi Tai; Yoshikazu Nitta; Yuichi Koshiba; Takashi Toyoda; Kazuo Kyuma, all of Hyogo, Japan

[73] Assignee: Mitsubishi Denki Kabushiki Kaisha, Tokyo, Japan

[21] Appl. No.: 688,684

[22] Filed: Jul. 29, 1996

Related U.S. Application Data

[63] Continuation of Ser. No. 432,704, May 2, 1995, abandoned, which is a continuation of Ser. No. 36,271, Mar. 24, 1993, abandoned.

[30] Foreign Application Priority Data

| Mar. 25, 1992 | [JP] | Japan | 4-067499 |
| Jun. 24, 1992 | [JP] | Japan | 4-188899 |
| Aug. 28, 1992 | [JP] | Japan | 4-251848 |
| Sep. 14, 1992 | [JP] | Japan | 4-269100 |
| Dec. 11, 1992 | [JP] | Japan | 4-352395 |

[51] Int. Cl.$^6$ .................................................. G06K 9/20
[52] U.S. Cl. ............................................................ 382/312
[58] Field of Search ................................. 382/312, 100, 382/155, 156; 395/22, 25; 437/3; 348/311; 250/208.1; 350/96.15; 358/41

[56] References Cited

U.S. PATENT DOCUMENTS

| 4,450,484 | 5/1984 | Terakawa et al. | 348/311 |
| 4,658,431 | 4/1987 | Yokota | 348/311 |
| 4,660,090 | 4/1987 | Hynecek | 348/311 |
| 4,985,618 | 1/1991 | Inada et al. | 250/208.1 |
| 4,988,891 | 1/1991 | Mashiko | 395/25 |
| 4,997,249 | 3/1991 | Berry et al. | 350/96.15 |
| 5,014,219 | 5/1991 | White | 364/513 |
| 5,025,282 | 6/1991 | Nakamura et al. | 395/22 |
| 5,053,974 | 10/1991 | Penz | 395/22 |
| 5,063,439 | 11/1991 | Tabei | 358/41 |
| 5,067,164 | 11/1991 | Denker et al. | 395/22 |
| 5,091,965 | 2/1992 | Kobayashi et al. | 395/22 |
| 5,113,365 | 5/1992 | Yang | 348/311 |
| 5,129,040 | 7/1992 | Hanazato et al. | 382/14 |
| 5,129,041 | 7/1992 | Pernick et al. | 395/25 |
| 5,138,695 | 8/1992 | Means et al. | 395/22 |
| 5,140,670 | 8/1992 | Chua et al. | 395/22 |
| 5,227,886 | 7/1993 | Efron et al. | 348/311 |
| 5,244,818 | 9/1993 | Jokerst et al. | 437/3 |
| 5,251,037 | 10/1993 | Busenberg | 348/311 |

OTHER PUBLICATIONS

Y. Nitta et al., "Variable–Sensitivity Photodetector That Uses a Metal–Semiconductor–Metal Structure for Optical Neural Networks" *Optics Letters* (1991) 16(8):611–613.

C.C. Sun et al., "A New Semiconductor Device—The Gate–Controlled Photodiode: Device Concept and Experimental Results" *IEEE Journal of Quantum Electronics* (1989) 25(5):896–903.

M.A. Mahowald, Carver Mead, "Silicon Retina" *Edit Carver Mead* (1989) pp. 257–278.

M. A. Mahowald et al., "The Silicon Retina", *Scientific American*, May 1991, pp. 76–82.

T. Tsukamoto, "The Beginning of CCD", *Foundation of CCD*, Ohm Sha, 1980, Chapter 4, pp. 191–195.

(List continued on next page.)

*Primary Examiner*—Jose L. Couso
*Attorney, Agent, or Firm*—Burns, Doane, Swecker & Mathis, LLP

[57] ABSTRACT

An apparatus for sensing and processing images is provided with a photo detector array arranged in a matrix form, a control circuit for feeding a row of the array with voltage for sensitivity control, and a neural network for processing current flowing from a column of the array to the ground in order to obtain an apparatus for sensing and processing images having a simple configuration, a high frame speed, the capability of forming a focus of attention, and high throughput of data and possibility of connecting to the neural network.

79 Claims, 41 Drawing Sheets

OTHER PUBLICATIONS

M.A. Mahowald et al., "Silicon Retina", Analog VLSI and Neural System: Addison–Wesley, Reading, Mass., 1989, Chapter 15.

C.C. Sun et al., "A New Semiconductor Device—The Gate–Controlled Photodiode: Device Concept and Experimental Results", *IEEE Journal of Quantum Electronics*, 25:5, May 1989, pp. 896–903.

"Neuro–Computer Engineering", Kogyo Chasakai Publishing Co., 1992, pp. 153–155.

OMITTED

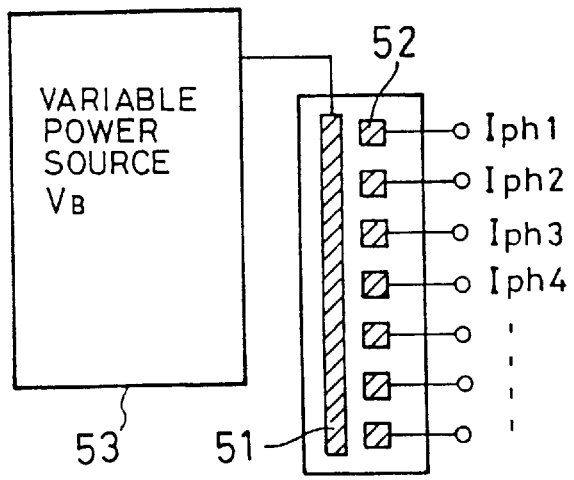
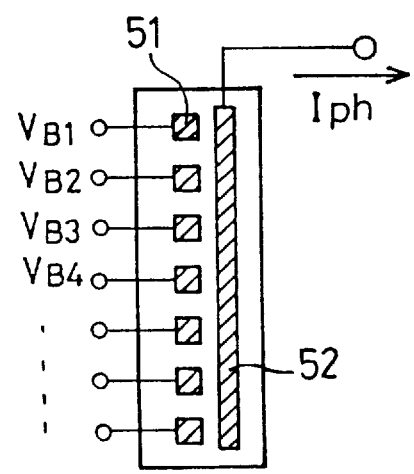
FIG. 35A FIG. 35B
FIG. 36
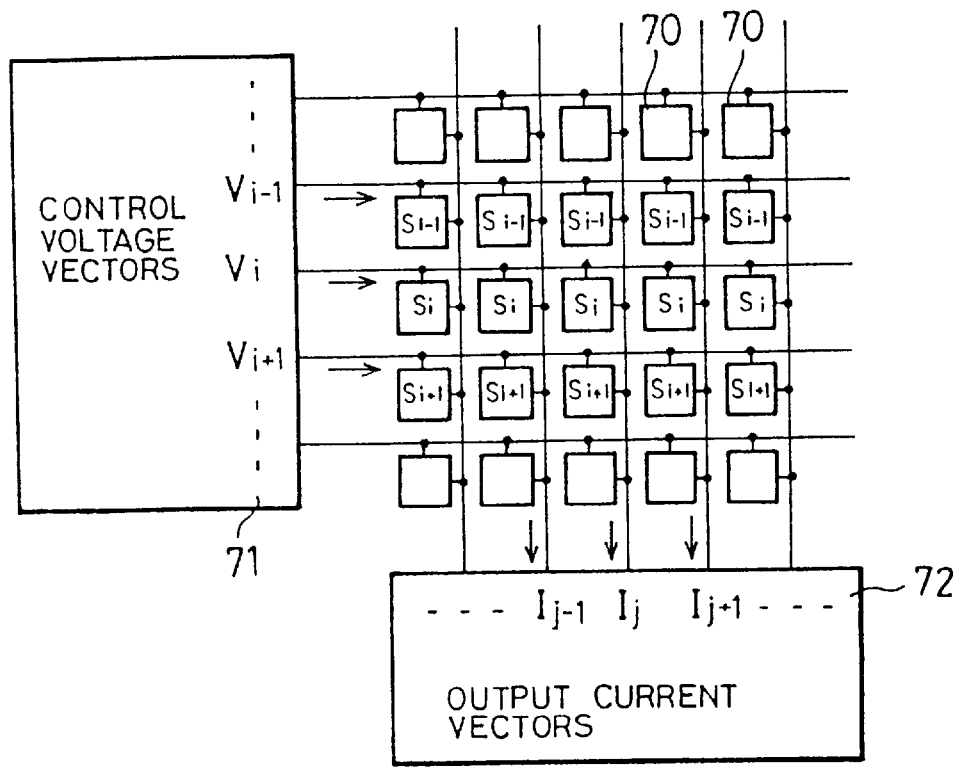

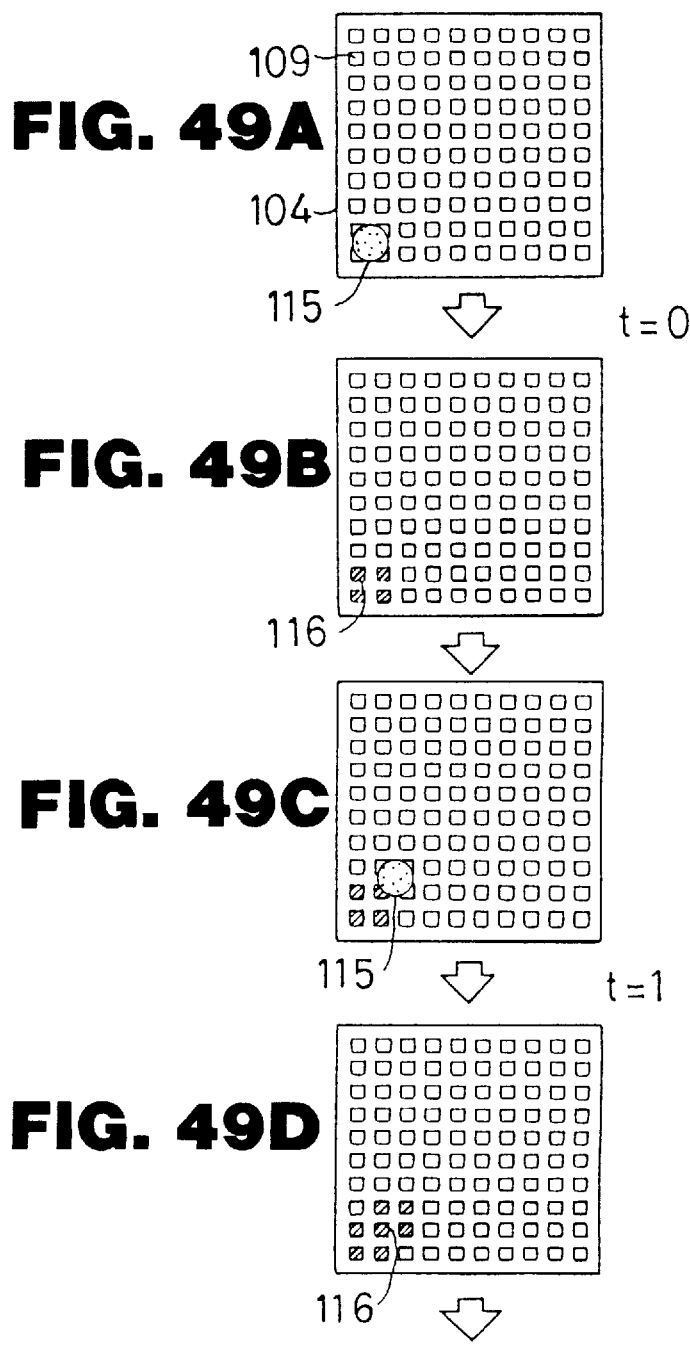

t=2 t=3 t=T t = 0 t = T

APPARATUS AND METHOD FOR SENSING AND PROCESSING IMAGES

This applicatin is a continuation of application Ser. No. 08/432,704, filed May 2, 1995, now abandoned, which is a continuation of Ser. No. 08/036,271, filed Mar. 24, 1993now abandoned.

BACKGROUND OF THE INVENTION

1. Field of the Invention

The present invention relates to an apparatus and a method for sensing and processing images employing an array of photo detectors (hereafter referred to as variable sensitivity photo detecting device, VSPD, photo detector or the like), a control circuit and a neural network.

2. Description of the Prior Art

FIG. 1 shows a typical image processing system in the prior art, including a CCD camera 520, a frame buffer 521, a computer 522 and an optional and special hardware 523.

According to another prior art, image processing systems are provided so as to imitate operative principles of a biological retina. The image processing systems are described in, for example, an article by M. A. Mahowald and C. Mead entitled 'The Silicon Retina' in Scientific American (May 1991), pp.76–82, and M. A. Mahowald and C. Mead 'SILICON RETINA' in Analog NLSI and Neural System: Addison-Wesley, Reading, May, 1989, Chapter 15.

In the prior art image processing system as shown in FIG. 1, the CCD camera 520 senses an image input into the system. Subsequently, the image is sequentially transferred to the frame buffer 521. In the image information stored in the frame buffer 521, the image is processed by either the computer 522 or the optional special hardware, or both of them.

The silicon retina is provided to implement several properties of biological retina. First, a photo detector including logarithmic response curve is employed. Secondly, a resistive network is employed in order to implement a connection of adjacent photo detectors. Thirdly, a light intensity adaption mechanism is employed whose behavior is similar to that of the biological retina.

FIG. 2 is a structural view of a CCD image sensor shown in, for example, Tetsuo Tsukamoto, Foundation of CCD, (Ohm Co., 1980), p.193. The CCD image sensor is suitable for the image processing system. In FIG. 2, reference numeral 531 is a photoreceptive element, 532 is a CCD register in a non-irradiated area, 533 is an output register, 534 is a floating diffusion area used for output, 535 is an output terminal, 536 is a terminal for resetting the floating diffusion area 534 used for output, 537 is a discharge terminal when resetting, 538 is a clock A, and 539 a clock B.

The conventional CCD image sensor constructed as set forth above is provided with the photoreceptive elements 531 vertically and linearly provided in parallel with each other, and parallel arrays of the CCD registers 532 in the non-irradiated area. All of output from the respective vertical arrays of the CCD registers 532 are introduced in parallel with each other to the single output register 533. In the respective photoreceptive elements 531, an optical image is detected by a MOS capacitor having a translucent poly-Si gate. In a typical TV mode, a light integrating time of 1/60 sec. is provided for each field so as to integrate outputs from two adjacent photoreceptive elements and transfer the output as a single signal charge to a pair of elements of the vertical array of the registers 532. Thereafter, the signal charges of the entire optical image are transferred through the clock A, and are input in parallel with each other into a horizontal array of the output register 533. Through the clock B which is faster than the clock A, the signal charges are transferred to the floating diffusion area 534 used for output until the next signal is input, and are serially read out from the output terminal 535. In such a way, the CCD image sensor shown in FIG. 53 can read out images projected to a photoreceptive portion.

FIG. 3 is a sectional view of a conventional variable sensitivity photo detector shown in, for example, C. C. Sun et al. 'Quantum Electronics', Vol. 25, No. 5, pp. 896–903, (1989). The variable sensitivity photo detector is suitable for the image processing system. In FIG. 3, reference numeral 541 is a transparent poly-silicon electrode, 542 is silicon oxide insulating film, 543 is a metallic output electrode, 544 is a P$^+$-type silicon layer, 545 is a n-type silicon substrate, and 546 is a depletion layer.

A description will now be given of the operation of the variable sensitivity photo detector.

As set forth hereinbefore, the conventional variable sensitivity photo detector is formed in MIS (Metal-Insulator-Semiconductor) structure including lamination of poly-silicon electrode 541-silicon oxide insulating film 542-n-type silicon substrate 545. Therefore, when negative bias voltage $V_G$ is applied to the poly-silicon electrode 541, the depletion layer 546 is generated in the vicinity of an interface of the silicon oxide insulating film 542 and the n-type silicon substrate 545.

An incident ray (hv) is vertically projected with respect to the variable sensitivity photo detector so as to transmit in the order of the silicon oxide insulating film 542, the poly-silicon electrode 541 and the silicon oxide insulating film 542, and pass through the depletion layer 546. In case the incident lay has a shorter wavelength than that of an absorption edge of a semiconductor forming the n-type silicon substrate 545, photoelectric current $I_{ph}$ (electron-hole pair) is generated in the depletion layer 546. The generating electron is collected in a p-n junction between p-type semiconductor (the p$^+$-type silicon layer 544) and n-type semiconductor (n-type silicon substrate 545), and is drawn of an output electrode 3.

Magnitude of the photoelectric current $I_{ph}$ generated from the photo detector is proportional to the thickness of the depletion layer 546. Hence, the photoelectric current $I_{ph}$ is increased as the thickness of the depletion layer 546 is increased. The thickness of the depletion layer 546 is proportional to the magnitude of the bias voltage $V_G$ applied to the poly-silicon electrode 541. Accordingly, in the photo detector shown in FIG. 3, the magnitude of the photoelectric current in the photo detector, i.e., sensitivity to the incident ray can be variable by adjusting the bias voltage $V_G$ applied to the poly-silicon electrode 541.

FIG. 4 is a block diagram showing a configuration of a conventional artificial retinal device which is disclosed in, for example, 'Neuro-Computer Engineering' Kogyo Chosa-kai Publishing Co., 1992, p.154. The artificial retinal device is used as devices for image preprocessing, and is suitable for extraction of characteristics of an input image such as detection of time-varying images. In FIG. 4, reference numeral 551 refers to a laser for projecting laser beam having a plane wave, 552 is a half mirror for reflecting and transmitting light, 553 is a mirror for reflecting light, 554 is a phase conjugating mirror having wave front reflecting function, 555 is a television camera output image of object, 556 is a liquid crystal for modulating phase of light, and 557 is an output screen.

The operation of the artificial retinal device will now be described. The liquid crystal 556 is provided by, for example, removing a polarizer and a detector from a liquid crystal television so as to display image signal from the television camera 555. The laser beam having the plane wave is output from the laser 551 to pass through the liquid crystal 556 and enter the phase conjugating mirror 554. The wave front reversing function of the phase conjugating mirror 554 serves to reflect light waves having opposite phases. The reflected light passes through the liquid crystal 556 again so that the wave front is compensated and there is no effect of the liquid crystal on output light with respect to static image. That is, the output light becomes a plane wave. However, since a response time of the phase conjugating mirror 554 is typically in a range of milliseconds to seconds, the wave front can not be compensated with respect to the time-varying image. Accordingly, the effect of the liquid crystal 556 remains in the time-varying image. As a result, only the time-varying image is displayed on the output screen 557.

FIG. 5 is a block diagram showing a schematic configuration of a conventional visual information processor. In FIG. 5, reference numeral 561 refers to a CCD camera for imaging images, 562 is a preparing portion for preparing the imaged image, 563 is a processing image displaying computer for displaying the image, 564 is a signal line for transmitting signals between the CCD camera 561 and the preparing portion 562, and 565 is a signal line for transmitting signals between the preparing portion 562 and the computer 563.

Further, reference numeral 556 refers to an image memory for storing the image, 567 is a signal line for transmitting signals between the preparing portion 562 and the image memory 566, 568 is an image pattern which is initially input, and 569 is an image pattern which will be input next.

The operation of the visual information processor will now be described. The image pattern imaged by the CCD camera 561 is output time sequentially as an output voltage value from each pixel of CCD according to the intensity of light. The output values are stored in the image memory 566 through the preparing portion 562. Similarly, the output values associated with the next image pattern 569 are also stored in the image memory 566.

For example, in order to obtain exclusive OR (EXOR) of two image patterns, the preparing portion 562 is operated to read signals of the two image patterns 568 and 569 from the image memory 556 to execute an EXOR operation with respect to each pixel so as to output the result to the computer 563. Accordingly, the computer 563 displays a result of the operation in the preprocessor 562.

FIG. 6 is a sectional view showing a structure of an electrically erasable/programmable ROM (EEPROM) which is one of conventional memory devices. In FIG. 6, reference numeral 570 refers to a source electrode, 571 is a drain electrode, 572 is an n-type source area provided on a 2-type silicon substrate 573, 574 is an n-type drain area provided on the P-type silicon substrate 573, 575 is a silicon oxide film having a size of the order of several tens nm, 576 is a poly-silicon floating gate for storing charge, and 577 is a control gate electrode.

The operation will now be described. Positive high voltage is applied between the control gate electrode 577 and the drain electrode 571 during writing. Consequently, hot electrons are generated at the drain, and are injected into the poly-silicon floating gate 576 through the silicon oxide film 575 from the side of the drain. Hence, the threshold voltage changes to a high voltage condition (i.e., in "0" condition) as seen from the control gate electrode 577. If the gate voltage is equal to or less than the threshold value, drain current can not flow smoothly.

During erasing, electrons are drawn from the side of the source due to F-N (Flower-Nordheim) tunnelling so that the threshold voltage is in a low voltage condition (i.e., in "1" condition). Further, during reading, a cell is selected by applying voltage to the control gate electrode 577, and a sufficiently low voltage is applied to the drain electrode 571 so as not to generate the hot electrons. Thus, "1" or "0" is read out according to the difference between the threshold voltage in the cell.

The conventional apparatus for sensing and processing images is constructed as set forth above. Therefore, there are several drawbacks of complexity of system, its large-sized dimension, high price, a low frame speed caused by a bottleneck of serial data processing, and absence of attention concentrating mechanism enabling sensing and processing of the only small portion of image in the system. Further, there are other problems that the response time is poor, only a few kinds of processing can be performed with respect to the image, and the kind to be processed is fixed in the method using the silicon retina.

Since the conventional image sensor is constructed as set forth above, the image sensor serves only to detect the image as it is, and it is necessary to connect the image sensor to a special circuit or a computer in order to perform image processing. Hence, it is difficult to obtain a small-sized apparatus which enables real-time processing. Further, an output from the photoreceptive element is transferred in multistage transfers to an output terminal. Accordingly, there is a problem that the image sensor is not suitable for high speed image processing since high clock frequency is required for reading in principal.

The conventional variable sensitivity photo detector is constructed as set forth above. In the variable sensitivity photo detector, the flow direction of the photoelectric current $I_{ph}$ is always constant, and the sensitivity is variable only in the positive direction corresponding to the direction of the photoelectric current $I_{ph}$ Hence, there is a problem that the variable sensitivity photo detector can not have negative sensitivity or negative weight when applied to an optical image processing system and an optical computing.

The conventional artificial retinal device is constructed as set forth above. That is, the laser 21 is required as the light source, and the liquid crystal 556 and the expensive phase conjugating mirror 554 are also required. Thus, there are drawbacks of large-sized dimension, increased power consumption, and higher price.

The conventional visual information processor is constructed as set forth above. That is, in order to process the image, it is necessary to store the visual information in the image memory 566 once, thereafter sequentially transfer the visual information to the preparing portion 562 so as to process by pixel. Hence, there is a problem that longer processing time is required as the number of pixels is increased.

Further, the conventional memory device is constructed as set forth above. Therefore, it is necessary to provide the silicon oxide film 575 in an extremely thin and uniform formation so as to efficiently perform carrier injection. Hence, there are problems that, for example, yield on the silicon oxide film is reduced in manufacture, and complicated structure of the device results in complicated manufacturing process.

SUMMARY OF THE INVENTION

In view of the forgoing, it is an object of the present invention to provide an apparatus for sensing and processing images, which has a simple structure, a small-sized dimension and is inexpensive, and further has a high frame speed, a capability of forming a focus of attention, high throughput of data, and the possibility of connection to a neural network so as to select a wide variety of image processing though the kinds of image processing is limited.

It is another object of the present invention to provide a method of sensing and processing images, in which various visual information can be processed at a high speed.

It is a further object of the present invention to provide an apparatus for sensing and processing images, employing an image sensor which enables various image processing concurrently with a detection of the images.

It is a further object of the present invention to provide an apparatus for sensing and processing images, employing a photosensitive device having sensitivity which can be continuously varied in a range of negative sensitivity to positive sensitivity.

It is a further object of the present invention to provide an apparatus for sensing and processing images, employing a small-sized and inexpensive artificial retinal device which is available as, for example, a preparing device for the image processing.

It is a further object of-the present invention to provide an apparatus for sensing and processing images, which can be accelerated by performing the image processing in parallel.

It is a further object of the present invention to provide an apparatus for sensing and processing images, which can control sensitivity of each line of an array so as to process the array output row by row in the neural network, and can process the visual information at a high speed.

It is a further object of the present invention to provide an apparatus for sensing and processing images, which can periodically circulate an element of a voltage vector (a control vector).

It is a further object of the present invention to provide an apparatus for sensing and processing images, which can obtain any number of processing cycles by using data stored in a control circuit.

It is a further object of the present invention to provide an apparatus for sensing and processing images, which enables one-dimensional or two-dimensional transform.

It is a further object of the present invention to provide an apparatus for sensing and processing images, which can process time-dependent visual information.

It is a further object of the present invention to provide an apparatus for sensing and processing images, which can process color information.

It is a further object of the present invention to provide an apparatus for sensing and processing images, which can process the visual information as in a biological retina.

It is a further object of the present invention to provide an apparatus for sensing and processing, in which the results of multiplication of an image matrix by a first matrix or a second matrix or both of them are output as an image projected onto a photo detector array, and the first or the second matrix can be set according to a formation of at least one focus of attention, horizontal and/or vertical one-dimensional convolution of kernel, and contents of one-dimensional or two-dimensional orthogonal and non-orthogonal transformation.

It is a further object of the present invention to provide an apparatus for sensing and processing images, which classify the visual information to process in a high speed process.

It is a further object of the present invention to provide an apparatus for sensing and processing images, which enables setting of photosensitivity in each row of photosensitive devices, the sum of photoelectric current executed by output electrodes connected for each column, and the sum of current from a plurality of output electrodes executed by a shift function or a variable connecting function in a memory on the side of the output.

It is a further object of the present invention to provide an apparatus for sensing and processing images, in which a switching gate in each photoreceptive element serves to apply voltage applied to each row to a predetermined column, and a magnitude of the voltage applied to each photoreceptive element can be stored in a capacitor.

It is a further object of the present invention to provide an apparatus for sensing and processing images, in which output from the variable sensitivity photo detector can be stored in each photoreceptive element, the results of a plurality of image processing can be synthesized, and the sensitivity can be substantially enhanced by accumulating output in the capacitor while voltage is applied to the variable sensitivity photo detector.

It is a further object of the present invention to provide an apparatus for sensing and processing images, which can simultaneously execute vertical and horizontal one-dimensional sum of product.

It is a further object of the present invention to provide an apparatus for sensing and processing images, which can perform an operation between two images or two-dimensional signals.

It is a further object of the present invention to provide an apparatus for sensing and processing images, which has a good resistance to fluctuation of voltage when a power-supply voltage is equal to zero.

It is a further object of the present invention to provide an apparatus for sensing and processing images, which has a high response speed and a good resistance to the fluctuation of the voltage.

It is a further object of the present invention to provide an apparatus for sensing and processing images, which can enhance utilization factor of light without a transparent electrode.

It is a further object of the present invention to provide an apparatus for sensing and processing images, which can employ a compact variable sensitivity photo detector having high utilization factor of light.

It is a further object of the present invention to provide an apparatus for sensing and processing images, which can employ a variable sensitivity photo detector so as to adjust a wavelength sensitivity characteristic by the power-supply voltage.

It is a further object of the present invention to provide an apparatus for sensing and processing images, which can employ a single input multiple output type of variable sensitivity photo detector array.

It is a further object of the present invention to provide an apparatus for sensing and processing images, which can draw a pair of output current in parallel according to a set of power-supply voltage with respect to a predetermined input pattern.

It is a further object of the present invention to provide an apparatus for sensing and processing images, which can change a set of current values injected into a light emitting diode so as to adjust sensitivity pattern of incident ray by the light emitting diode, and concurrently can draw the set of output current in parallel according to the pair of power-supply voltage.

It is a further object of the present invention to provide an apparatus for sensing and processing images, which can surely detect a moving object even if an image pattern is extremely fine.

It is a further object of the present invention to provide an apparatus for sensing and processing images, which can perform demand processing with respect to a plurality of visual information sequentially input, and can easily process the visual information without a special memory device.

It is a further object of the present invention to provide an apparatus for sensing and processing images, which can easily output results of processing of two image patterns at a high speed.

It is a further object of the present invention to provide an apparatus for sensing and processing images, which can detect movement of the image easily.

It is a further object of the present invention to provide an apparatus for sensing and processing images, which can control a direction of photoelectric current output according to a wavelength of uniform light, and facilitates addition or subtraction between one visual information and another.

It is a further object of the present invention to provide an apparatus for sensing and processing images, which has a nonvolatile storage function, and can modulate a carrier at a high speed.

According to the first aspect of the present invention, for achieving the above-mentioned objects, there is provided an apparatus for sensing and processing images, including a control circuit for feeding a row of the photo detector array arranged in a matrix form with voltage for sensitivity control, and a neural network for processing current from the array.

According to the second aspect of the present invention, there is provided an apparatus for sensing and processing images including a control circuit having a shift register for shifting analog voltage.

According to the third aspect of the present invention, there is provided an apparatus for sensing and processing images including an analog voltage shift register having a charge coupled device.

According to the fourth aspect of the present invention, there is provided an apparatus for sensing and processing images including an analog voltage shift register having a chain of sample/hold circuits.

According to the fifth aspect of the present invention, there is provided an apparatus for sensing and processing images employing a digital shift register having a width of 1 bit as an analog voltage shift register so as to cooperate with a set of D/A convertors having a width of 1 bit.

According to the sixth aspect of the present invention, there is provided an apparatus for sensing and processing images employing a chain of digital shift registers having a length of 1 and a width of one bit as an analog voltage shift register so as to obtain 1+1 PCM encoding analog voltage levels.

According to the seventh aspect of the present invention, there is provided an apparatus for sensing and processing images wherein an output terminal of a digital shift register is connected to an input terminal thereof so as to obtain a closed loop operation mode.

According to the eighth aspect of the present invention, there is provided an apparatus for sensing and processing images wherein a shift register receives input from a function generator.

According to the ninth aspect of the present invention, there is provided an apparatus for sensing and processing images wherein a neural network includes a resettable integrator.

According to the tenth aspect of the present invention, there is provided an apparatus for sensing and processing images wherein each photo detector in an array is provided with a color filter.

According to the eleventh aspect of the present invention, there is provided an apparatus for sensing and processing images wherein photo detectors disposed on alternate rows in an array are shifted by a distance equal to half distance between two adjacent photo detectors in the row so as to provide a hexagonal configuration of the photo detectors.

According to the twelfth aspect of the present invention, there is provided an apparatus for sensing and processing images wherein an array is provided with a hexagonal configuration of photo detectors by partially eliminating the photo detectors.

According to the thirteenth aspect of the present invention, there is provided an apparatus for sensing and processing images wherein a photo detector has a hexagonal form.

According to the fourteenth aspect of the present invention, there is provided a method of sensing and processing images wherein an element (a set) of a control voltage from a control circuit represents a first matrix, a neural network represents a second matrix, and results of multiplication of the image matrix by the first or the second matrix or both of them are output as an image projected onto a photo detector array.

According to the fifteenth aspect of the present invention, there is provided a method of sensing and processing images wherein a time dependent image can be processed by using a neural network having a resettable integrator.

According to the sixteenth aspect of the present invention, there is provided a method of sensing and processing images wherein the projected image is classified into a class by using a classifier actuated according to current output from each column of an array.

According to the seventeenth aspect of the present invention, there is provided a method of sensing and processing images wherein a merit function is processed according to an optimizing algorithm so as to vary a value of the control voltage according to results of the processing.

According to the eighteenth aspect of the present invention, there is provided an apparatus for sensing and processing images, employing an image sensor. In the image sensor, wherein one terminal of each photo detector is connected to a common control electrode for each row, and the other terminal is connected to a common output electrode for each column. Further, a control circuit is connected to the control electrode, and a one-dimensional memory is fixedly or variably connected to the output electrode.

According to the nineteenth aspect of the present invention, there is provided an apparatus for sensing and processing images, employing an image sensor. In the image sensor, one terminal of a photo detector is directly connected to an output terminal, the other terminal is grounded via a capacitor and is connected to a control terminal via a switching gate. The control terminal is connected to a common control electrode for each row, and the output terminal connected to the other terminal is connected to a common output electrode for each column. A control circuit having a terminal for outputting any voltage is connected to the control electrode. Further, the image sensor employs an output circuit having a mechanism for applying current from any one of the output electrodes.

According to the twentieth aspect of the present invention, there is provided an apparatus for sensing and processing images, employing an image sensor. In the image sensor, one terminal of a photo detector is grounded via a capacitor and is connected via a switching gate to an output terminal, the other terminal is directly connected to a control terminal. Further, the control terminal is connected to a common control electrode for each row, the output terminal is connected to a common output electrode for each column. In addition, a control circuit having a terminal for outputting any voltage is connected to the control electrode. The image sensor includes an output circuit having a mechanism for applying current from any one of the output electrodes.

According to the twenty-first aspect of the present invention, there is provided an apparatus for sensing and processing images, employing an image sensor. In the image sensor, one terminal of one of two photo detectors is connected to a common control electrode for each row, the other terminal thereof is connected to a common output electrode for each column. Further, one terminal of the other photo detector is connected to a common control electrode for each column, and the other terminal thereof is connected to a common output terminal for each row.

According to the twenty-second aspect of the present invention, there is provided an apparatus for sensing and processing images, employing an image sensor. In the image sensor, a photo detector has conversion efficiency from light to current, which is varied depending upon magnitude of voltage between two terminals. Further, light signal is input through both sides of a surface formed by a two-dimensional array of the photo detectors.

According to the twenty-third aspect of the present invention, there is provided an apparatus for sensing and processing images, employing an image sensor. In the image sensor, one terminal of a photo detector is connected to a common control electrode for each row, the other terminal is connected to a common output electrode for each column. A control circuit optionally varies a position of voltage vector having voltage other than zero volts with respect to voltage vectors in which only one voltage vector has voltage other than zero volts and other voltage vectors are all equal to zero volts. Further, the image sensor includes the control circuit connected to the control electrode.

According to the twenty-fourth aspect of the present invention, there is provided an apparatus for sensing and processing images, employing a photo detector. The photo detector includes a common n-type semiconductor layer, two p-type semiconductor layers formed on the common n-type semiconductor layer, and two electrodes respectively mounted on the two p-type semiconductor layers through ohmic contact. Further, the photo detector includes a power source providing an output connected to one of the two electrodes, which is variable in a range from negative voltage to positive voltage.

According to the twenty-fifth aspect of the present invention, there is provided an apparatus for sensing and processing images, employing a photo detector. The photo detector includes a common p-type semiconductor layer, two n-type semiconductor layers formed on the common p-type semiconductor layer, and two electrodes respectively mounted on the two n-type semiconductor layers through ohmic contact. Further, the photo detector includes a power source providing an output connected to one of the two electrodes, which is variable in a range from negative voltage to positive voltage.

According to the twenty-sixth aspect of the present invention, there is provided an apparatus for sensing and processing images, employing a photo detector. The photo detector has a structure in which an i-type semiconductor layer is interposed between the n-type semiconductor layer and the p-type semiconductor layer.

According to the twenty-seventh aspect of the present invention, there is provided an apparatus for sensing and processing images, employing a photo detector. The photo detector includes two $n^+$ semiconductor layers formed on a common $n^-$ semiconductor layer, $p^+$ semiconductor layers respectively formed o- the two $n^+$ semiconductor layers, and two electrodes respectively mounted on the two $p^+$ semiconductor layers through ohmic contact. Further, the photo detector includes a power source providing an output connected to one of the two electrodes, which is variable in a range from negative voltage to positive voltage.

According to the twenty-eighth aspect of the present invention, there is provided an apparatus for sensing and processing images, employing a photo detector. The photo detector includes two i-type semiconductor layers formed on a common n semiconductor layer, an $n^+$ semiconductor layer formed on the two i-type semiconductor layers, $p^+$ semiconductor layers respectively formed on the two $n^+$ semiconductor layers, and two electrodes respectively mounted on the two $p^+$ semiconductor layers through ohmic contact. Further, the photo detector includes a power source providing an output connected to one of the two electrodes, which is variable in a range from negative voltage to positive voltage.

According to the twenty-ninth aspect of the present invention, there is provided an apparatus for sensing and processing images, employing a photo detector. In the photo detector, a pair of semiconductor layers formed on a common semiconductor layer are provided so as to rise in an interdigital form. Further, teeth portions of the pair of interdigital semiconductor layers are combined with each other so as to form the photo detector.

According to the thirtieth aspect of the present invention, there is an apparatus for sensing and processing images, employing a photo detector. In the photo detector, two electrodes are formed on an only part of the p-type semiconductor layer or the n-type semiconductor layer.

According to the thirty-first aspect of the present invention, there is provided an apparatus for sensing and processing images, employing a photo detector. In the photo detector, an n-type semiconductor layer is integrated with a p-type semiconductor layer to form a plane structure.

According to the thirty-second aspect of the present invention, there is provided an apparatus for sensing and processing images, employing a photo detector. In the photo detector, an interdigital portion is embedded in the common semiconductor layer, and the electrode is also provided only for a wiring portion.

According to the thirty-third aspect of the present invention, there is provided an apparatus for sensing and processing images, employing a photo detector. In the photo detector, impurities doped semiconductors in an n-type semiconductor layer and a p-type semiconductor layer are made of different materials, and semiconductor materials forming a common semiconductor layer have a narrower band gap than that of semiconductor materials formed on the common semiconductor layer.

According to the thirty-fourth aspect of the present invention, there is provided an apparatus for sensing and processing images, employing a photo detector. The photo detector includes a common n⁻ GaAs semiconductor layer, two n⁻ AlGaAs semiconductor layers formed on the common n⁻ semiconductor layer, p⁺ AlGaAs semiconductor layer respectively formed on the two n⁻ AlGaAs semiconductor layer, and two electrodes mounted on the two p⁺ AlGaAs semiconductor layer through ohmic contact. Further, the photo detector includes a power source providing an output connected to one of the two electrodes, which is variable in a range from negative voltage to positive voltage.

According to the thirty-fifth aspect of the present invention, there is provided an apparatus for sensing and processing images in which a plurality of photo detectors are adjacently arranged while an electrode connected to a power source is defined as a common electrode.

According to the thirty-sixth aspect of the present invention, there is provided an apparatus for sensing and processing images in which a plurality of photo detectors are adjacently arranged while an electrode not connected to a power source is defined as a common electrode.

According to the thirty-seventh aspect of the present invention, there is provided an apparatus for sensing and processing images in which a plurality of photo detectors are arranged in a matrix form while two electrodes are defined as common electrodes.

According to the thirty-eighth aspect of the present invention, there is provided an apparatus for sensing and processing images in which a plurality of photo detectors are arranged in a matrix form while two electrodes are defined as common electrodes, and an array of light emitting diodes is arranged on the plurality of photo detectors.

According to the thirty-ninth aspect of the present invention, there is provided an apparatus for sensing and processing images, employing an artificial retinal device. The artificial retinal device includes an X data driver feeding an even row with a data signal after feeding an odd row of a photo detector array with a data signal, and a Y data driver performing processing with respect to all columns of the photo detector array. The processing comprises the steps of feeding the odd column with a control signal such that sensitivity of photo detector becomes positive and feeding an even column immediately after the odd column with the control signal such that sensitivity is equal to zero while the X data driver feeds the odd row with the data signal, and feeding the odd column with the control signal such that the sensitivity of the photoreceptive is equal to zero and feeding the even column immediately after the odd column with the control signal such that the sensitivity becomes negative while the X data driver feeds the even row with the data signal. Further, the artificial retinal device includes a signal processing circuit for inputting each output signal, i.e., each sum of signal output from each odd row and signal output from an even row immediately after the odd row in the photo detector array for each time when performing each processing of the Y data drive, and for sorting the output signals so as to form an output image.

According to the fortieth aspect of the present invention, there is provided an apparatus for sensing and processing images, employing an artificial retinal device. The artificial retinal device includes an X data driver feeding an even row with a data signal after feeding an odd row of a photo detector array with a data signal, and a Y data driver performing processing with respect to all columns of the photo detector array. The processing comprises the steps of feeding the odd column with a control signal such that sensitivity of photo detector becomes positive and feeding an even column immediately after the odd column with the control signal such that sensitivity is equal to zero while the X data driver feeds the odd row with the data signal, and feeding the odd column with the control signal such that the sensitivity of the photoreceptive is equal to zero and feeding the even column immediately after the odd column with the control signal such that the sensitivity becomes positive while the X data driver feeds the even row with the data signal. The artificial retinal device further includes each differential amplifier finding each difference between a signal output from each odd row of the photo detector array and a signal output from the even row immediate after the odd row, and a signal processing circuit for inputting each output signal output from each differential amplifier for each time when performing each processing of the Y data driver, and for sorting the output signals so as to form an output image.

According to the forty-first aspect of the present invention, there is provided an apparatus for sensing and processing images, employing an artificial retinal device. The artificial retinal device includes a differentiating circuit for differentiating an output signal fed to a signal processing circuit.

According to the forty-second aspect of the present invention, there is provided an apparatus for sensing and processing images, including a photoreceptive portion control device. The photoreceptive portion control device serves to control a trap carrier in a trap level of each photo detector so as to adjust a photoreceptive sensitivity distribution of a photoreceptive portion having the integrated photo detectors. Further, the photoreceptive portion control device serves to perform processing of visual information irradiated to a photoreceptive device by using photoelectric current output from the respective photo detectors.

According to the forty-third aspect of the present invention, there is provided an apparatus for sensing and processing images, including a photoreceptive portion control device. The photoreceptive portion control device serves to apply voltage to each photo detector so as to generate a first photoreceptive sensitivity distribution when a first image pattern is irradiated to a photoreceptive portion having integrated photo detectors having a trap level. Further, the photoreceptive portion control device serves to draw a photoelectric current output from each photo detector according to a second photoreceptive sensitivity distribution generated when a second image pattern is irradiated to the photoreceptive portion.

According to the forty-fourth aspect of the present invention, there is provided an apparatus for sensing and processing images, including a photoreceptive portion control device. The photoreceptive portion control device serves to apply a first voltage to each photo detector so as to generate a first photoreceptive sensitivity distribution when a first image pattern is irradiated to a photoreceptive portion having integrated photo detectors having a trap level. Further, the photoreceptive portion control device serves to apply a second voltage to each photo detector so as to generate a second photoreceptive sensitivity distribution when a second image pattern is irradiated. In addition, the photoreceptive portion control device draws a photoelectric current output of each photo detector according to the second photoreceptive sensitivity distribution.

According to the forty-fifth aspect of the present invention, there is provided an apparatus for sensing and processing images, including a photoreceptive portion control device. The photoreceptive portion control device serves to apply voltage to each photo detector for a period between a start of detecting a movement of an image pattern irradiated to a photoreceptive portion having integrated photo detectors having a trap level, and an end of detecting the movement thereof. Further, the photoreceptive portion control device serves to detect a movement locus of the image pattern irradiated to the photo detector by using photoelectric current output of each photo detector.

According to the forty-sixth aspect of the present invention, there is provided an apparatus for sensing and processing images, including a photoreceptive portion and a photoreceptive portion control device. The photoreceptive portion includes integrated photo detectors respectively having the trap level, and the photo detector is provided with two devices having wave length ranges for providing the photosensitivity, which are deviated from each other. The photoreceptive portion control device applies each different voltage to the two devices of the respective photo detectors so as to generate a first photoreceptive sensitivity distribution when irradiating a first image pattern having a wavelength for generating the photoreceptive sensitivity of the two devices. Further, the photoreceptive portion control device serves to draw photoelectric current generated at a time when uniform light is irradiated to the photoreceptive portion.

According to the forty-seventh aspect of the present invention, there is provided an apparatus for sensing and processing images, employing an information processing device. In the information processing device, a control electrode is provided on a semiconductor so as to have a trap level, and a signal electrode is provided on the semiconductor so as to accumulate carrier in the trap level of the control electrode when writing information.

According to the forty-eighth aspect of the present invention, there is provided an apparatus for sensing and processing images, employing an information processing device. In the information processing device, a control electrode is provided on a semiconductor so as to have a trap level, a signal electrode is provided on the semiconductor so as to accumulate a carrier in the trap level of the control electrode when writing information, and a second control electrode is further provided on the semiconductor so as to have no trap level.

As stated above, according to the first aspect of the present invention, the apparatus for sensing and processing images includes the photo detector array in which a plurality of VSPDs are arranged in a matrix form, a control circuit feeding a row of the array with voltage, and a neural network for processing current from the row of the array. Thus, the array output is processed row by row through the neural network by controlling sensitivity of each row of the array. Therefore, it is possible to process visual information at a high speed.

Furthermore, in the apparatus for sensing and processing images according to the second to the sixth aspects of the present invention, the control circuit includes the analog voltage shift register. Accordingly, it is possible to periodically circulate an element of a voltage vector (a control vector).

Further, in the apparatus for sensing and processing images according to the seventh aspect of the present invention, the control circuit is provided with the analog voltage shift register having the input terminal and the output terminal which are connected to each other. Hence, it is possible to obtain any number of processing cycle by using data stored in the control circuit.

Further, in the apparatus for sensing and processing images according to the eighth aspect of the present invention, the control circuit is provided with the analog voltage shift register which can be connected to the function generator. Consequently, it is possible to perform a one-dimensional or two-dimensional transform.

Further, in the apparatus for sensing and processing images according to the ninth aspect of the present invention, the neural network has the resettable integrator. Therefore, it is possible to process a time dependent visual information.

Further, in the apparatus for sensing and processing images according to the tenth aspect of the present invention, VSPD has the color filter so that color information can be processed.

Further, in the apparatus for sensing and processing images according to the eleventh to the thirteenth aspects of the present invention, VSPD is provided so as to form a hexagonal configuration. Hence, it is possible to process visual information in the case of the biological retina.

Further, in the method for sensing and processing images according to the fourteenth aspect of the present invention, the set of the control voltages from the control circuit represents the first matrix, and the neural network represents the second matrix. Consequently, the results of multiplication of the image matrix by the first matrix or the second matrix or both of them are output as the image projected to the photo detector array. Further, the first or the second matrix can be set according to contents of the formation of at least one focus of attention, the horizontal and/or vertical one-dimensional convolution of the kernel, and the contents of the one-dimensional or two-dimensional orthogonal and non-orthogonal transformation.

Further, in the method of sensing and processing images according to the fifteenth aspect of the present invention, there is provided the resettable integrate. Hence, it is possible to perform the image processing of the time dependent image.

Further, the method of sensing and processing images according to the sixteenth aspect of the present invention, includes the step of processing according to the merit function for classifying visual information. Therefore, it is possible to classify and process the visual information at a high speed.

Further, in the method of sensing and processing images according to the seventeenth aspect of the present invention, there are employed the merit function for classifying visual information, and the optimizing algorithm wherein the merit function is processed according to the optimizing algorithm. Hence, it is possible to process the visual information at a high speed in an optimized process.

Further, in the apparatus for sensing and processing images according to the eighteenth aspect of the present invention, voltage data stored in the control circuit can be partially applied to the control electrode. Therefore, it is possible to set the photosensitivity of the photo detector for each row. In the apparatus for sensing and processing images, the output electrodes connected for each column enable the sum of photoelectric current, and the shift function or the variable connecting function in the memory on the side of an output enables the sum of current from the plurality of output electrodes.

Further, in the apparatus for sensing and processing images according to the nineteenth aspect of the present invention, a switching gate in each photoreceptive element serves to apply voltage applied for each row only to a predetermined column, and the magnitude of the voltage applied to each photoreceptive element can be stored in the capacitor.

Further, in the apparatus for sensing and processing images according to the twentieth aspect of the present invention, since one terminal of the photo detector is grounded via the capacitor and is connected via the switching gate to the output terminal, it is possible to store output from the photo detector in each photoreceptive element, and to synthesize results of the plurality of image processes. Further, it is possible to substantially enhance the sensitivity by accumulating output in the capacitor while the voltage is applied to the photo detector.

Further, the apparatus for sensing and processing images according to the twenty-first aspect of the present invention employs two photo detectors for one photoreceptive element so as to simultaneously execute vertical and horizontal one-dimensional sums of product.

Further, the apparatus for sensing and processing images according to the twenty-second aspect of the present invention is provided with the surface formed in the two-dimensional array to pass the light signal through both sides thereof so as to perform the operation between two images or two-dimensional signals.

Further, the apparatus for sensing and processing images according to the twenty-third aspect of the present invention, includes the control circuit for applying a voltage other than zero volts to only one control electrode, and applying voltage of zero volts to the other control electrodes so as to output the visual information in a row having the applied voltage other than zero volts as photoelectric current in parallel.

Further, the apparatus for sensing and processing images according to the twenty-fourth and the twenty-fifth aspects of the present invention, includes depletion layers provided in two pn junctions which are formed between the common semiconductor layer and the two semiconductor layers formed thereon. Either of the depletion layers can be adjusted in thickness and expansion since the output of the power source connected to one of the electrode is variable in a range from negative voltage to positive voltage. Hence, it is possible to sequentially adjust the sensitivity in the range from negative sensitivity to positive sensitivity.

Further, the apparatus for sensing and processing images according to the twenty-sixth aspect of the present invention, can have a broader depletion layer with the aid of the i-type semiconductor layer, resulting in higher response speed.

Further, the apparatus for sensing and processing images according to the twenty-seventh aspect of the present invention, can have a good resistance to the fluctuation of voltage when the power voltage is equal to zero with the aid of an $n^-$–$n^+$–$p^+$ semiconductor laminated structure.

Further, the apparatus for sensing and processing images according to the twenty-eighth aspect of the present invention, can have higher response speed and a good resistance to the fluctuation of voltage with the aid of an $n^-$–i–$n^+$–$p^+$ semiconductor laminated structure.

Further, the apparatus for sensing and processing images according to the twenty-ninth aspect of the present invention can have higher sensitivity with the aid of the interdigital structures which are combined with each other.

Further, in the apparatus for sensing and processing images according to the thirtieth aspect of the present invention, incident rays can transmit through the p-type semiconductor layer or the n-type semiconductor layer having an uncovered electrode so as to reach the depletion layer. Therefore, it is possible to improve utilization factor of light without a transparent electrode.

Further, the apparatus for sensing and processing images according to the thirty-first aspect of the present invention can employ a compact photo detector because of a plane structure thereof.

Further, the apparatus for sensing and processing images according to the thirty-second aspect of the present invention can employ a compact photo detector having higher sensitivity with the aid of an interdigital structure, and having high utilization factor of light because of a plane structure thereof.

Further, the apparatus for sensing and processing images according to the thirty-third aspect of the present invention can employ a photo detector having higher sensitivity since the incident ray is not absorbed or damped because of a wide band gap of the semiconductor layer extending to the depletion layer.

Further, the apparatus for sensing and processing images according to the thirty-fourth aspect of the present invention can employ a photo detector having a wavelength sensitivity characteristic which is adjustable by a power supply voltage with the aid of a laminated structure of $n^-$ GaAs layer-$n^-$ AlGaAs layer-$p^+$ AlGaAs layer.

Further, the apparatus for sensing and processing images according to the thirty-fifth aspect of the present invention can employ a single input multiple output type of photo detector array.

Further, the apparatus for sensing and processing images according to the thirty-sixth aspect of the present invention can employ a multiple input single output type of photo detector array.

Further, in the apparatus for sensing and processing images according to the thirty-seventh aspect of the present invention, a photo detector array can draw a set of output current in parallel according to a set of power supply voltage with respect to a predetermined input pattern.

Further, the apparatus for sensing and processing images according to the thirty-eighth aspect of the present invention, employs a photo detector array which can change a set of current values injected into the light emitting diodes so as to adjust the intensity pattern of incident ray generated by the light emitting diode, and concurrently can draw the set of output current in parallel according to the set of power supply voltage.

Further, in the apparatus for sensing and processing images according to the thirty-ninth aspect of the present invention, each photo detector of the photo detector array outputs a signal such that the sum of output from the photo detector in a predetermined block is equal to zero in case an image signal irradiated to the photo detector array is a static image.

Further, in the apparatus for sensing and processing images according to the fortieth aspect of the present invention, the differential amplifier outputs a signal such that the sum of output of the photo detector in a predetermined block is equal to zero in case an image signal irradiated to the photo detector array is a static image.

Further, in the apparatus for sensing and processing images according to the forty-first aspect of the present invention, the differentiating device enables recognition of the moving object in the image signal even if the contents of the image signal irradiated are extremely fine.

Further, in the apparatus for sensing and processing images according to the forty-second aspect of the present invention, a photoreceptive portion holds visual information according to the amount of trap carrier in the trap level of each photoreceptive device.

Further, in the apparatus for sensing and processing images according to the forty-third aspect of the present invention, the photoreceptive portion inputs the second image pattern in a condition where there is the first photoreceptive sensitivity distribution, and outputs result of processing of the first image pattern generated in response to the input and the second image pattern as the photoelectric current output.

Further, in the apparatus for sensing and processing images according to the forty-fourth aspect of the present invention, the photoreceptive portion inputs the second image pattern in a condition where there is the first photoreceptive sensitivity distribution, and outputs the result of processing of the first image pattern generated in response to the applied voltage and the second image pattern as the photoelectric current output.

Further, in the apparatus for sensing and processing images according to the forty-fifth aspect of the present invention, the photoreceptive portion outputs the movement locus of the irradiated image as the photoelectric current output.

Further, in the apparatus for sensing and processing images according to the forty-sixth aspect of the present invention, the photoreceptive portion outputs each different photoelectric current output in two cases, i.e., one case where the uniform light has a wavelength such that sensitivity can be generated in the two devices, and the other case where the uniform light has a wavelength such that sensitivity can be generated in only one of the two devices.

Further, in the apparatus for sensing and processing images according to the forty-seventh aspect of the present invention, the control electrode holds information according to magnitude of an internal electric field formed by the carrier in the trap level.

Further, in the apparatus for sensing and processing images according to the forty-eighth aspect of the present invention, the second electrode controls the carrier in the semiconductor based on an external control, and controls a spatial distribution of a depletion layer by using amount of accumulated charge so as to provide a modulated conductance.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 35 (a) is a plane block diagram showing a single input multiple output type of variable sensitivity photo detector array, and FIG. 35 (b) is a plane block diagram showing a multiple input single output type of variable sensitivity photo detector array;

FIG. 36 is a plane block diagram showing a variable sensitivity photo detector array applied to the apparatus of the present invention;

DETAILED DESCRIPTION OF THE PREFERRED EMBODIMENTS

Figure 1:
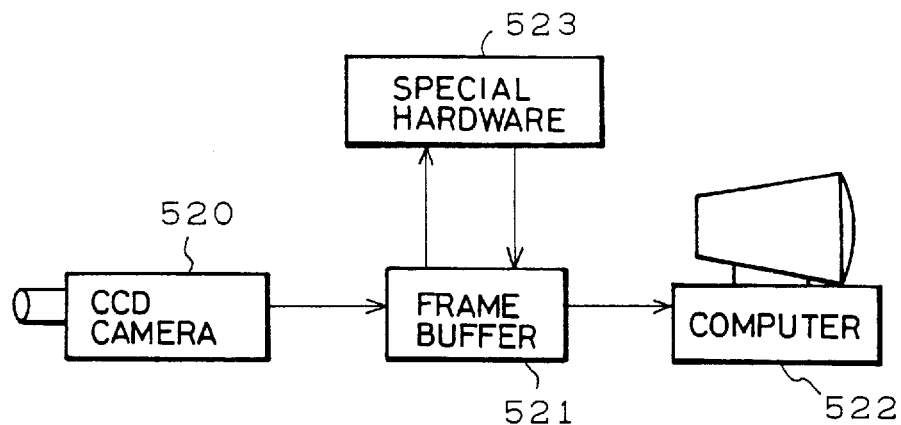
FIG. 1 is a diagram showing a prior art image processing system.
Figure 2:
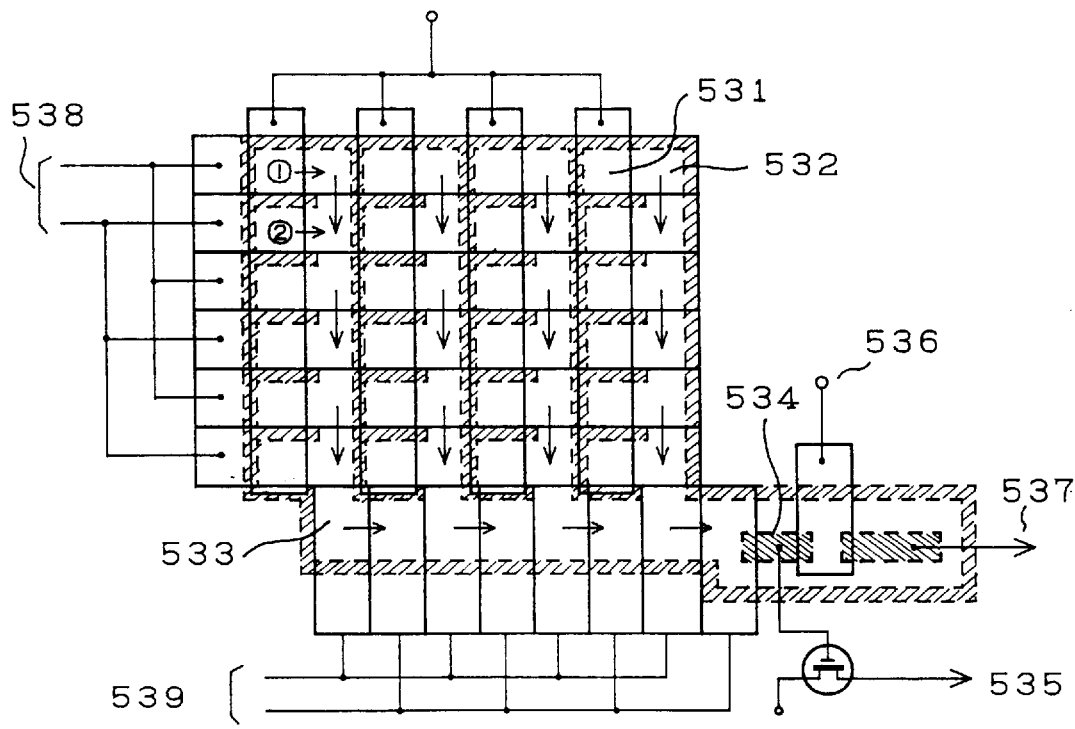
FIG. 2 is a block diagram of a conventional image sensor.
Figure 3:
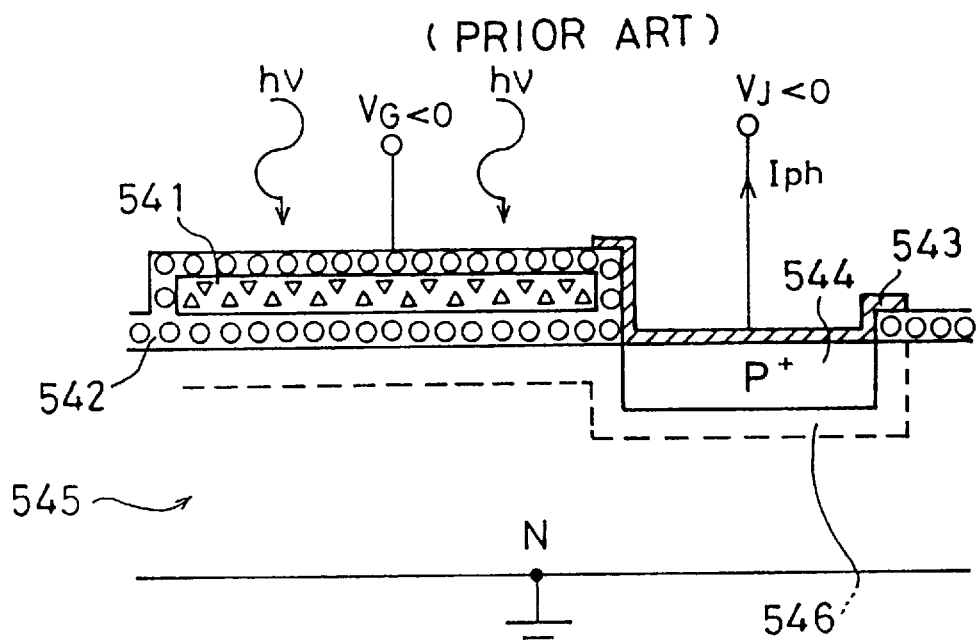
FIG. 3 is a sectional view showing a conventional variable sensitivity photo detector.
Figure 6:
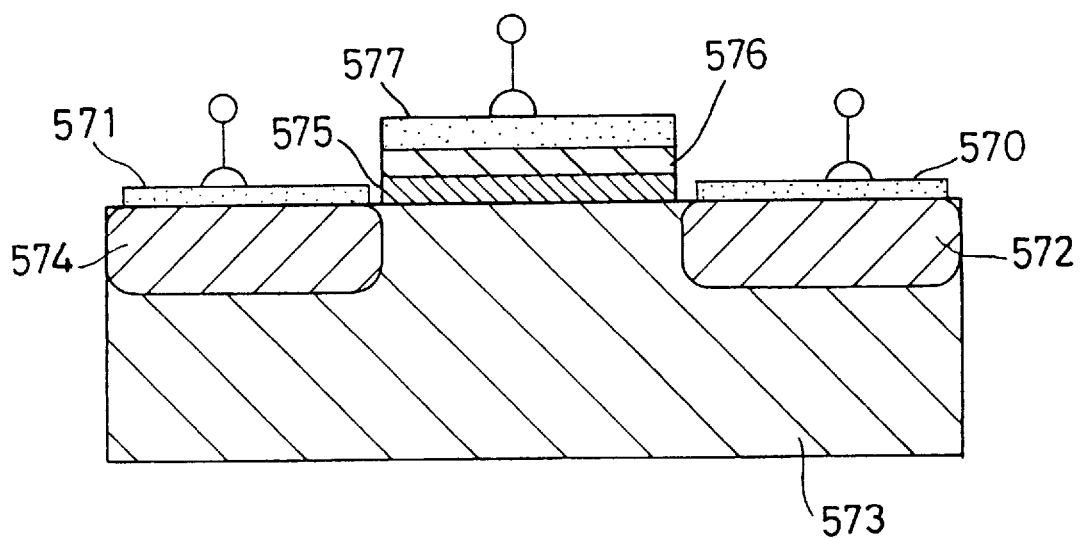
FIG. 6 is a sectional view showing a structure Of EEPROM which is one of conventional memory devices.
Figure 4:
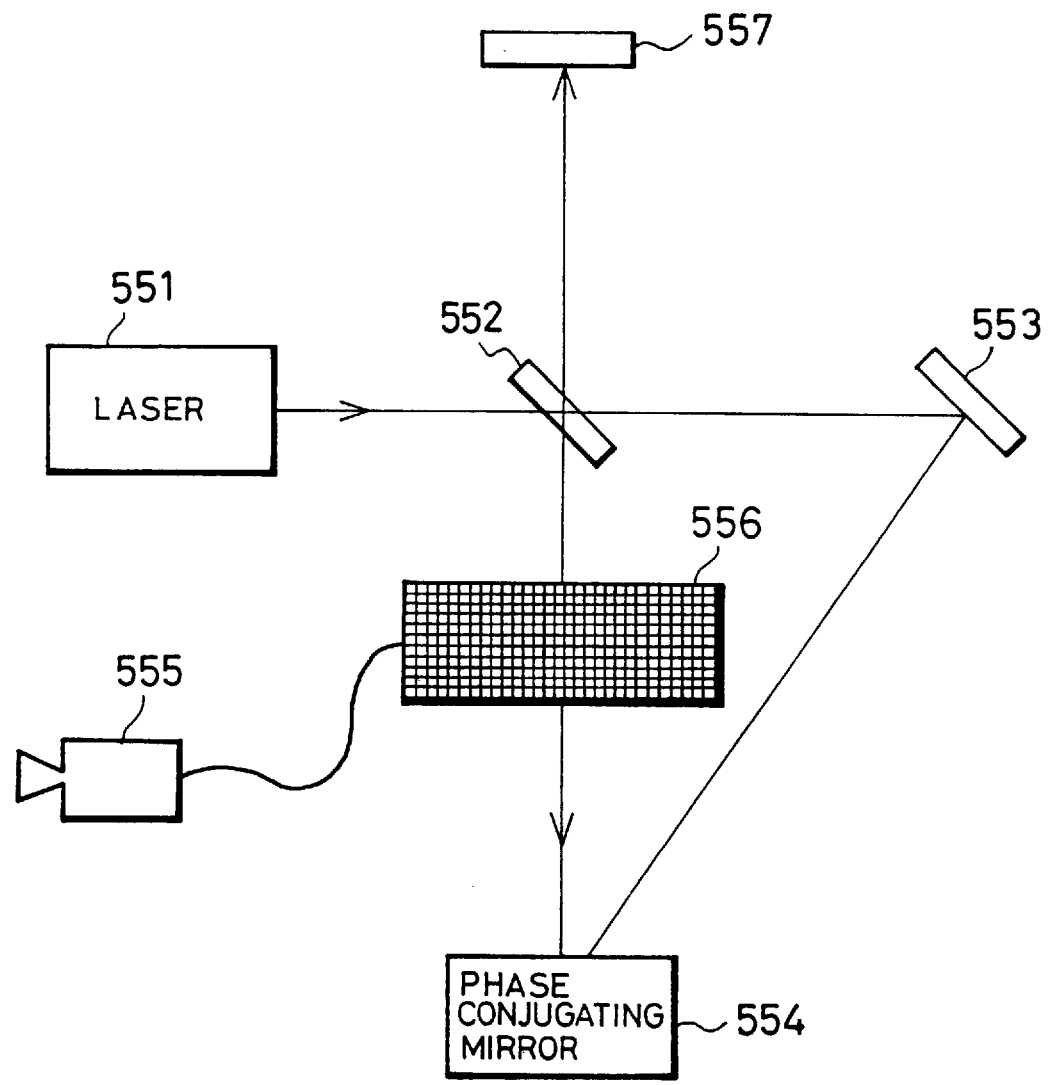
FIG. 4 is a block diagram showing a configuration of a conventional artificial retinal device.

Preferred embodiments of the invention will now be described in detail referring to the accompanying drawings, in which the component parts common to FIG. 1 are designated by common reference numerals. The descriptions of the common component parts are omitted here to avoid unnecessary repetition.

Embodiment 1

Figure 7:
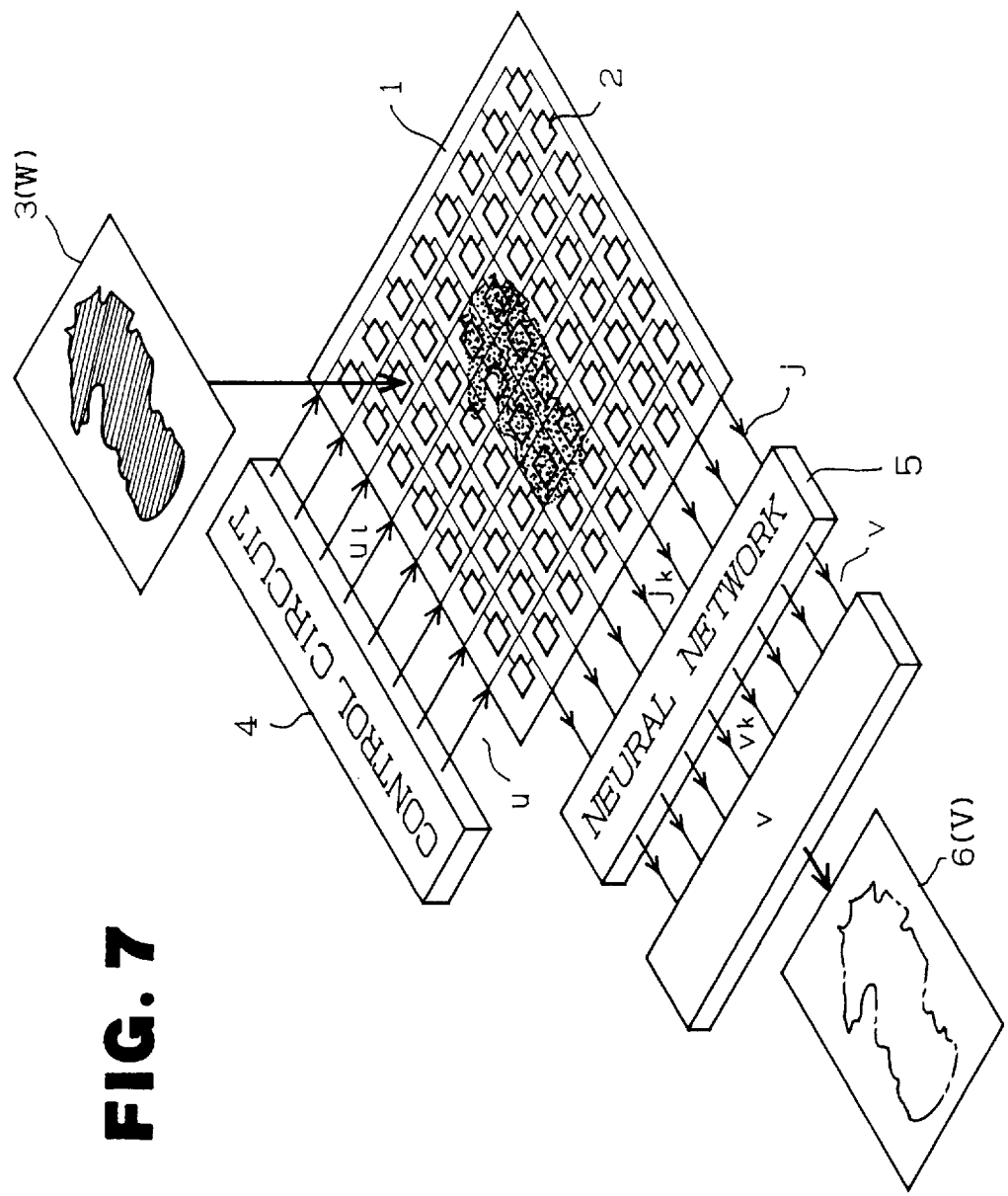
FIG. 7 is a diagram illustrating an operating principle of the present invention.

FIG. 7 is a diagram illustrating an operating principle of the present invention. In FIG. 7, reference numeral 1 represents VSPD array including VSPDs, 2 is one of VSPDs, 3 is an image projected on the VSPD array 1, 4 is a control circuit feeding the VSPD array 1 with control voltage $u_i$, 5 is a network for processing output current $j_k$ from the VSPD array, and 6 is a processed image.

The subject matter of the present invention is the VSPD array 1 of the VSPD 2. The VSPD 2 includes, for example, an MSM (metal-semiconductor-metal) type of photo detector. The MSM type of photo detector has a sensitivity s which can be varied from negative sensitivity to positive sensitivity by applying voltage u to a control port. The sensitivity s can be expressed as follows:

$$s = f(u) \qquad (1)$$

Further, the sensitivity s is defined as current j traveling from the output port of the VSPD 2 to the ground divided by irradiation flux $\Phi e$ on the VSPD 2 as follows:

$$s = j/\Phi e \qquad (2)$$

A common voltage $u_i$ is applied to a control port in the ith row of the VSPD array 1. Output ports of the VSPD 2 are connected for each column. Therefore, current from the respective VSPDs 2 in the kth column is summed up, resulting in total current $j_k$.

Each column of the VSPD array 1 has the capability to provide an output current $j_k$ that represents a weighted sum of the irradiation fluxes of the VSPD's 2 in the column. If current flowing in the VSPD 2 in the ith row and the jth column is proportional to the sensitivity of the VSPD 2 in the ith row and irradiation flux $W_{jk}$ on a surface of the VSPD 2, the weighted sum can be expressed as vector-matrix product as follows:

$$j = Ws, \qquad (3)$$

where $W = (W_{jk})$ shows a matrix representation of the image 3 projected on the VSPD array 1, s is a vector of sensitivities of the VSPD rows, and j is a vector of the output current $j_k$ traveling from the column of the VSPD's 2 to the ground. An element $s_i$ of the sensitivity vector s can be controlled by the voltage $u_i$ of a control vector u as defined in the expression (1). Thus, $$S_i = f(u_i) \tag{4}$$

Based on a basic operation of the vector-matrix product, it is possible to implement a matrix multiplication as follows:

$$J = WS, \tag{5}$$

This expression can be implemented by feeding a matrix S line by line into the VSPD array 1 by using the control circuit 4, and recording an output vector j in a matrix J in a time-sharing multiplex operation mode.

If a simple neural network 5 having a connection matrix T is added to process the output vector j, an image matrix W can be multiplied by matrixes from both sides as follow:

$$V = TWS, \tag{6}$$

where V is a matrix to record the following output vector from the neural network line by line in the time-sharing multiplex operation mode:

$$v = Tj = TWs \tag{7}$$

The matrix V represents the processed image 6.

It is possible to perform a variety of image processing operation by using this type of matrix multiplication. For example, various characteristics can be extracted so as to perform an orthogonal transformation such as a sine transformation or a cosine transformation. Several possibilities will be described and illustrated later in the following embodiment of the present invention.

A neural network 5 having some type of resettable integrator is employed in order to enable processing of the time-varying image.

$$V(t_o) = \int_o^{t_o} T(t) W(t) s(t) d \tag{8}$$

where $[O, t_o]$ is a time interval for integration. For example, it is possible to detect movement by using the following settings:

$$T(t) = T_o, \tag{9}$$

$$W1 = \int_o^{t_o/2} W(t) dt, \tag{10}$$

$$W2 = \int_{t_o/2}^{t_o} W(t) dt, \tag{11}$$

$$S(t) = \begin{cases} s_0: 0 \leq t < t_0/2 \\ -s_0: t_0/2 \leq t < t_0 \end{cases} \tag{12}$$

This is because the expression (8) can be rewritten as follows:

$$v(t_o) = T_o(W_2 - W_1) S_o \tag{13}$$

Output vector v depends upon only a difference between two image matrixes in the time interval defined in the expressions (10) and (11). If there is no motion in the projected image (i.e., $W_1 = W_2$), the system does not respond (i.e., $v(t_o) = 0$).

A focus of attention in vertical direction can be formed by making only certain rows of VSPD's sensitive and setting all other sensitivities to zero. In the horizontal direction a focus of attention can be formed by simply ignoring those elements of the output vectors j or v that are of no interest. Multiple foci of attention can be implemented in the same way, and it is even possible to read out the image pixels in an arbitrary sequence.

The operation rate of the system, that is, the number of the control vectors u to be processed per second depends upon the VSPD 2 and the performance of an electronic circuit. For example, GaAs metal-semiconductor-metal VSPD's (MSM-VSPD's) can be operated at a very high speed of 1 GHz and more. In this case, the performance is limited mainly by the rate of the electronic circuit. In an embodiment in which a complicated electronic circuit is not required, the system can be typically operated at a speed of about 1 MHz. If the system includes the neural network 5, the performance is also limited by a rate of a hardware device of the network. At present, an available neural network can be operated at a rate of about 1 Mhz (see "ETANN-chip having 64 neurons" Intel).

Embodiment 2

Figure 8:
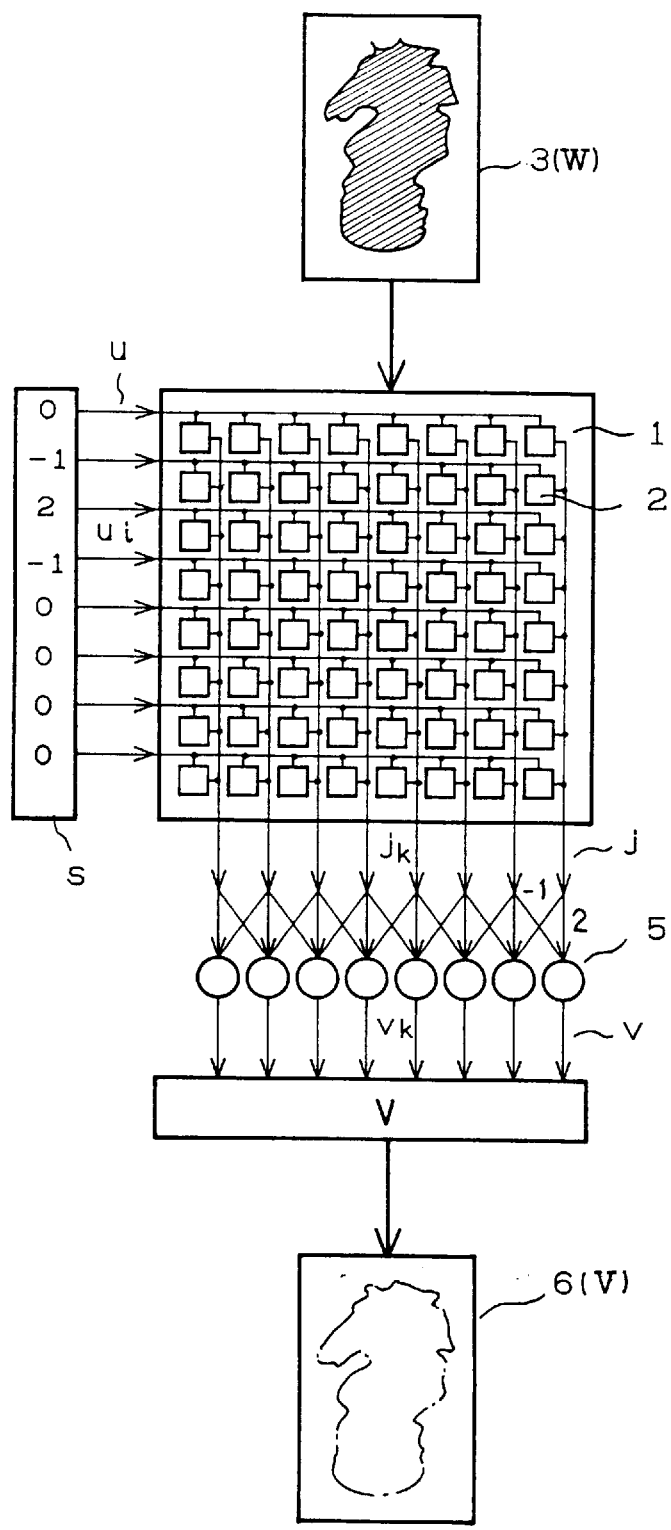
FIG. 8 is a diagram illustrating an edge extract process.

FIG. 8 is a diagram illustrating an edge extract process. In FIG. 8, reference numeral 1 refers to an array including VSPDs, 2 is one of the VSPDS, 3 is an image projected on the VSPD array 1, 5 is a neural network for processing an output current $j_k$ of the VSPD array 1, and 6 is a processed image.

FIG. 8 shows how an oblique edge is extracted by a simple setup. The image 3 is projected on the VSPD array 1. Elements of a control vector u are set so as to have a value resulting in sensitivity vector $s = (2, -1, 0, \ldots 0, -1)$. The elements of the control vector are circularly-shifted periodically. In the matrix representation of the expression (5), the substantially tridiagonal matrix represents a sequence of sensitive vectors.

$$S_{ik} = \begin{cases} 2: i = K \\ -1: i = (K \pm 1) mod N, \ 0 \leq i, k < N \\ 0: \text{OTHERS} \end{cases} \tag{14}$$

In the expression (14), N refers to a length of the sensitive vector, that is, the number of rows of the VSPD array 1. Output from the VSPD array 1 is processed by the neural network 5 through a connection matrix $T = S$. Each output vector v from the neural network 5 represents a line of the processed image. The processed image 6 only includes an inclined edge which is simply extracted.

The matrixes S and T are Toeplitz matrixes. Therefore, a multiplication of the image matrix W with the two matrixes from both sides is also expressed as circular convolution with respect to kernel K as follows:

$$K = \begin{bmatrix} -1 \\ 2 \\ -1 \end{bmatrix} (-1 \ 2 \ -1) = \begin{bmatrix} 1 & -2 & 1 \\ -2 & 4 & -2 \\ 1 & -2 & 1 \end{bmatrix} \tag{15}$$

In order to facilitate appreciation of the operational principle, simple matrixes S and T are selected on purpose in the expression. If using optional Toeplitz matrixes expressed as follows:

$$S_{jk} = a_{(j+k) mod N} \tag{16}$$

and $$T_{jk} = b_{(j+k) mod N} \tag{17}$$

it is possible to implement convolution having a kernel in the following form:

$$K = ab^T \quad (18)$$

where a and b are optional vectors having a length of N. Two-dimensional convolution using the kernel in this form can be divided into two one-dimensional convolutions a such as a = $(-1, 0, 1, 0, 0 \ldots)^T$, b = $(1, 0, 0, \ldots)$ (for extraction of vertical edges), a = $(1, 0, 0, \ldots)^T$, b = $(-1, 0, 1, 0, 0, \ldots)$ (for extraction of horizontal edges), and a = $(-1, 0, 1, 0, 0, \ldots)^T$, b = $(-1, 0, 1, 0, 0, \ldots)$ (which is another possibility for the extraction of oblique edges).

As set forth above, the elements of the control vector are circularly-shifted periodically. This kind of shift operation can be easily implemented in hardware by using an analog voltage shift register. For example, a charge coupled device (CCD) or a chain of sample and hold circuits can serve as a shift register for analog voltage. Further, a shift register for analog voltage can be digitally implemented by using a digital shift register having a width of 1 bit for cooperating with a set of 1 bit D/A convertors. Alternatively, a shift register can be digitally implemented so as to obtain analog voltage level modulated in 1+1 (L+1)pulse code modulation (PCM modulation) by using a chain of digital shift registers having a length of 1 and a width of 1 bit each.

The digital implementation of the analog voltage shift register can provide an advantage in that a terminal portion of the register can be connected to an input terminal thereof in order to obtain a closed loop operation mode. This means that control voltage should be fed into the loop only once. Thus, the voltage is stored in the loop, and any number of image processing cycles can be performed by using the stored data.

The convolution and the characteristic extract operation as set forth above can be all combined with a focus of attention mechanism and processing for a time dependent image described in the embodiment 1 of the present invention. This means that it is possible to construct a system for detecting moving oblique edges in some area of the image.

Embodiment 3

According to the present invention, it is also possible to perform one-dimensional and two-dimensional transformations such as a sine transformation, a cosine transformation, Walsh transformation, or a wavelet transformation, with respect to an input image W. This is achieved by using base vectors of a one-dimensional base system both as sensitivity vectors and as row vectors of a coupling matrix T of the neural network. For example, a two-dimensional cosine transformation is performed by using a condition as follows:

$$S_{ik} = T_{ik} = \cos 2\pi ik/N, \ 0 \leq i, \ k < N \quad (19)$$

where N refers to the number of rows and columns of the VSPD array. This can be ensured by rewriting the expression (6) in the following obvious form:

$$V_{\mu\nu} = \sum_{ik} T_{\mu i} W_{ik} S_{k\nu} = \sum_{ik} T_{\mu i} W_{ik} \cos 2\pi i\mu/N \cos 2\pi k\nu/N \quad (20)$$

Aside from normalized constant, the expression (20) is a definition of the two-dimensional cosine transformation. The cosine function in the expressions (19) and (20) may be replaced by a sine function. If replaced by the sine function, a two-dimensional sine transformation can be obtained.

Embodiment 4

Figure 9:
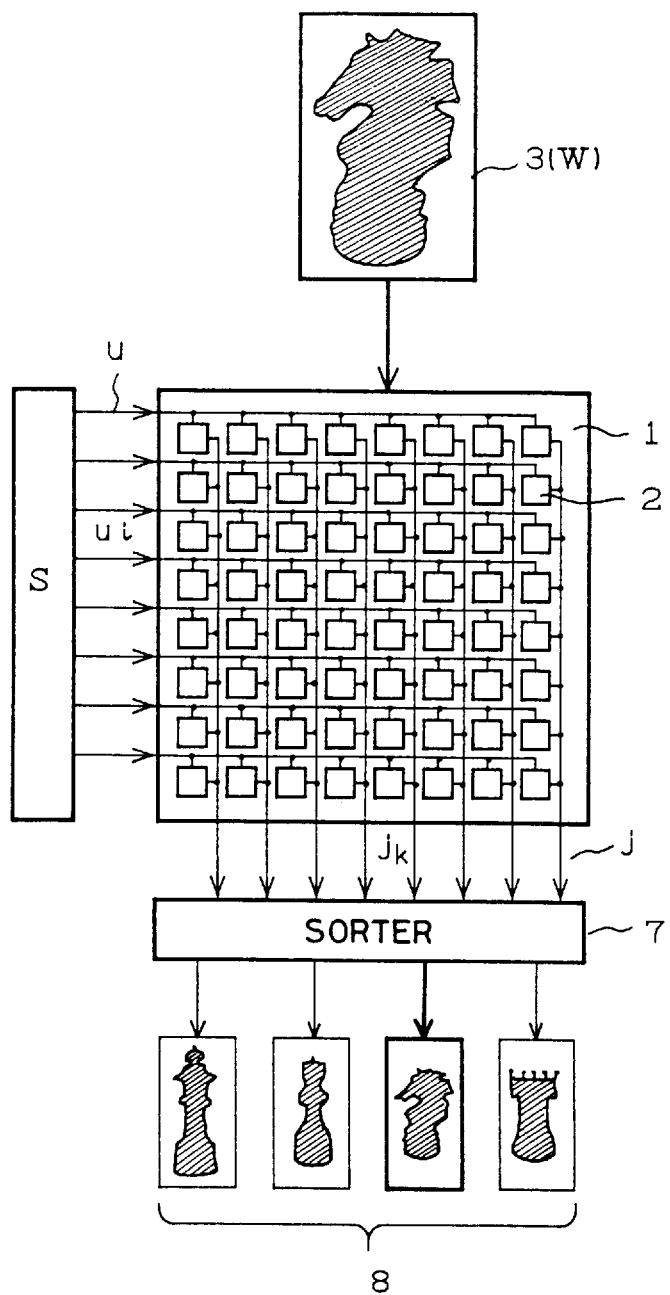
FIG. 9 is a diagram showing another embodiment of the present invention.

FIG. 9 is a diagram illustrating a direct image recognition process of the present invention. In FIG. 9, reference numeral 1 refers to an array of VSPDs, 2 is one of the VSPDs, 3 is an image projected on the VSPD array 1, and 7 is a classifier for classifying the projected images into one of some classes 8.

Figure 10:
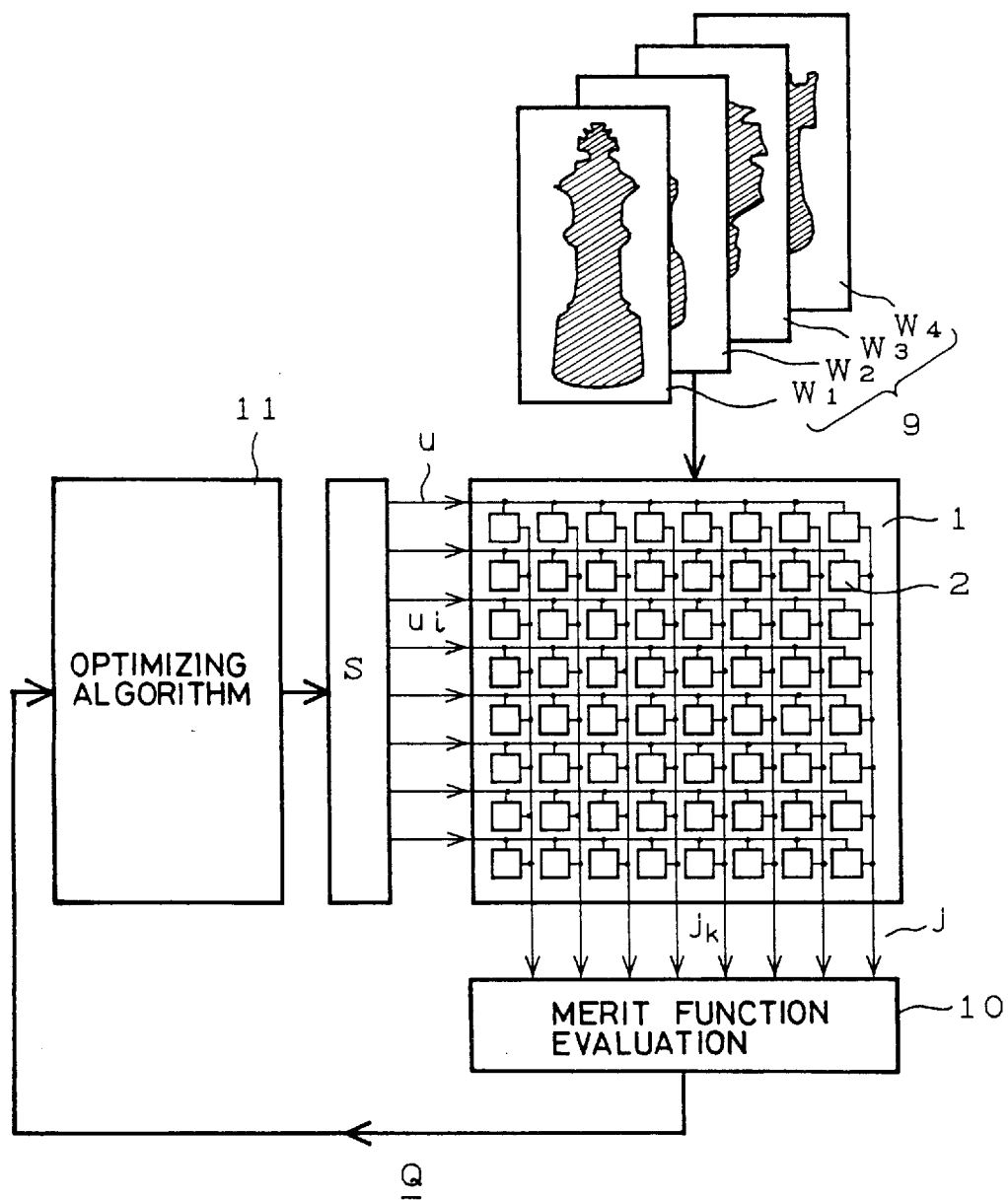
FIG. 10 is a diagram illustrating algorithm for optimizing an image recognition process.

FIG. 10 is a diagram illustrating algorithm for optimizing an image recognition process. In FIG. 10, reference numeral 1 refers to an array of VSPDs, 2 is one of VSPDs, 9 is the set of images projected on the VSPD array 1, 10 is a merit function evaluation, and 11 is an optimizing algorithm.

Referring now to FIG. 9 showing the fourth embodiment of the present invention, the output vector j (see the expression (3)) is provided to form a lower dimensional representation of the image W. Instead of the original image, this representation can be used to classify and recognize images.

For example, the representation can be fed into the classifier 7 for the purpose of direct recognition of many images 9. This means that only the low dimensional representation of images rather than the original image classification, an amount of data to be processed is extremely reduced. As a result, it is possible to dramatically reduce a complexity and a classifying time of the classifier 7.

Further, it is possible to enhance the quality of image classification/selection by selecting the optimal sensitivity vector s as desired. This is a significant point of the present invention, because it is often more difficult to classify the low-dimensional representations of the images than to classify the image itself.

Referring now to FIG. 10 showing a selecting process, the sensitivity vector s is set to any value for initialization. In Step 1, the images 9 are projected on the chip. Merit function Q reflecting the quality of image separation is calculated by using the output vector j. The calculation is executed by using current sensitivity vector (merit function evaluation 10). In Step 2, the merit function Q is transmitted to an optimizing algorithm 11 (such as random search, simulated annealing, genetic algorithm, or gradient descent). The optimizing algorithm 11 serves to suitably vary the sensitivity vector s so as to optimize the merit function Q. Steps 1 and 2 are repeated until the merit function Q is optimized or the image separation having sufficient quality is achieved.

Using correlation based classifiers, an exemplary definition of the merit function Q will be given now. In the following description, it is assumed that M input images $W^1$ (0<1<M) is projected on the VSPD array 1, $j^1$ is the resultant output vector, and the image W having the resultant output vector should be recognized. In the classifier on the correlation basis, a class is defined as vector stored in the classifier (herein, corresponding to vector $j^0$ to vector $j^{M-1}$) .is assigned to one of classes, that is, to the vector $j^1$ having the minimum angular distance by using the angle between the vector j and stored vectors as a basis of distance.

If the angle between the stored vectors $j^\circ$ to $j^{M-1}$ is large, ambiguity in the classifying process is reduced. In an ideal case, all of vectors are orthogonal with each other. Accordingly, the minimum angle between any two vectors in the vectors $j^0$ to $j^{M-1}$ can serve as a good merit function Q. Subsequently, the optimizing process as set forth above is performed to select the sensitivity vector s which maximize the minimum angle between the vectors $j^1$.

A description will now be given of a modified optimizing process. The merit function Q is not calculated again after offering all the images, but updated after offering the respective images. Advantages of this system will be appreciated by using the typical definition of the merit function as given hereinbefore. During the optimizing process, the merit function does not depend upon all the images at one time, but depends upon two images in which the output vectors instantaneously have the minimum angular distance, that is, two images having the worst degree of separation. Therefore, it is significant to frequently offer the two images to the system. It is not necessary to so frequently offer the remaining images. This is because these images are easily separated, and the merit function does not depend upon these images. As a result, it is possible to perform the optimizing process at a high speed since the merit function can be calculated extremely faster.

It must be noted that variation of entire illuminance of the projected images has no effect on the classification process in the classifier on a correlation basis. This is because such a variation varies only the length of the vector $j^1$, and does not vary the angle between the vectors $j^1$. If the vector $j^1$ is standardized before the classification, it is ensured that any classifier is not affected by the variation of the illuminance.

Further, if the sum of all the elements of the sensitivity vector is equal to zero, the classification process in any classifier is constant with respect to uniform background light. This is because current generated by the uniform irradiation are offset with each other in each column of the VSPD.

If the optimizing process fails, that is, if sufficient quality of image separation can not be achieved, it is highly possible that the information content of the output vector j is not sufficient, or the dimension of the output vector j is too low. In this case, the matrix J and/or V (see the expressions (5) and (6)) may be used as lower dimensional representation of the input image, and the optimizing process as set forth above can be performed with respect to the matrixes S and T. It is possible to freely adjust the dimension of the resultant representation by varying the size of the matrixes S and T. Further, it is possible to form a focus of attention during the optimizing process.

Embodiment 5

Figure 11:
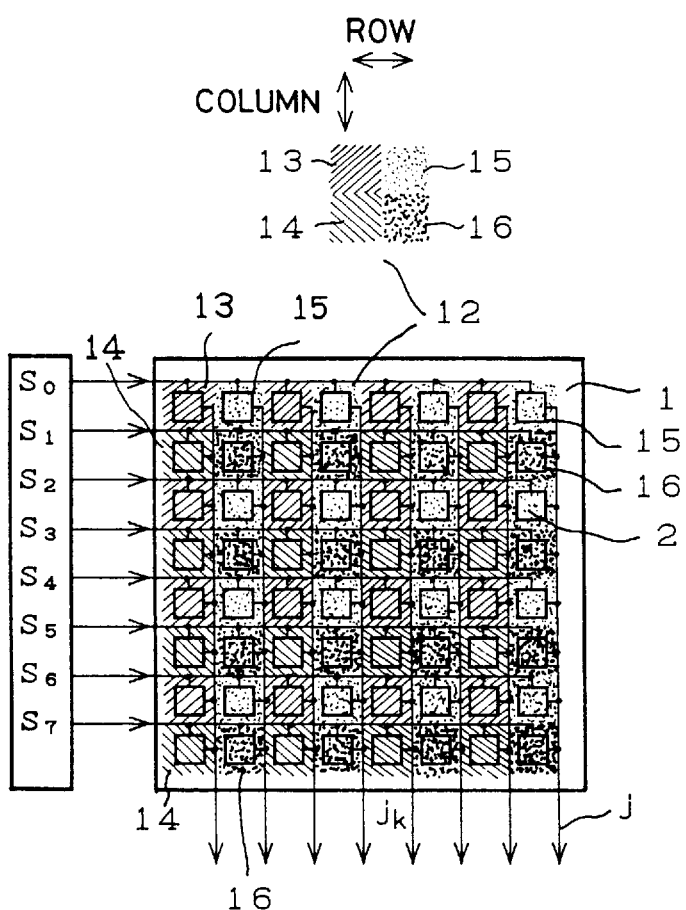
FIG. 11 is a diagram illustrating processing of color information.

FIG. 11 is a diagram illustrating processing of color information. In FIG. 11, reference numeral 1 represents an array of VSPDs, 2 is one of the VSPDs, 12 is a color filter mounted on the VSPD array 1, 13 is a transparent portion with respect to red light of the color filter 12, 14 is a transparent portion with respect to green light of the color filter 12, 15 is a transparent portion with respect to yellow light of the color filter 12, and 16 is a transparent portion the respect to blue light of the color filter 12.

Figure 12A:
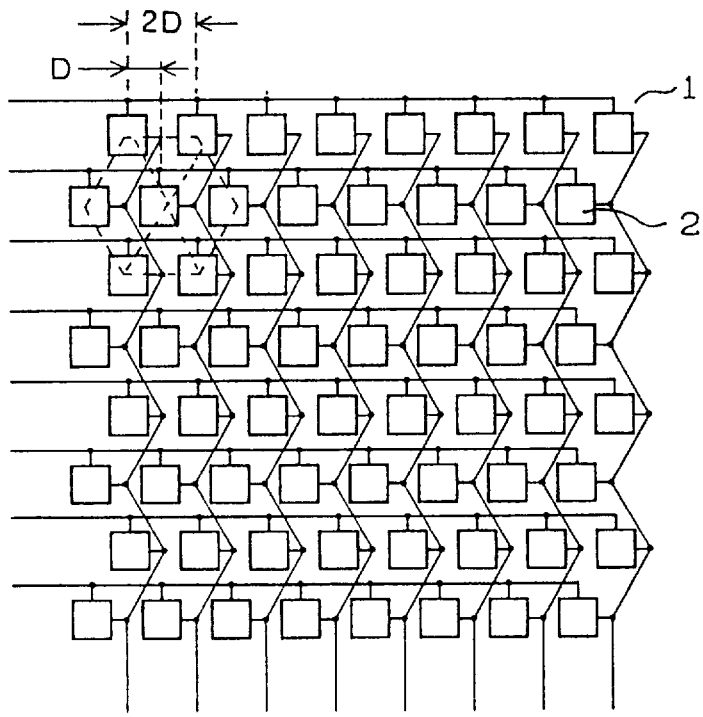
FIG. 12A and B are diagrams showing VSPD array having a modified VSPD arrangement.
Figure 12B:
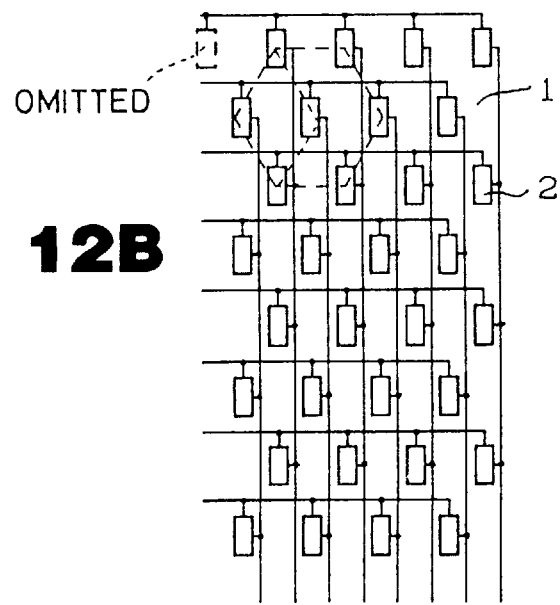

FIG. 12 is a diagram showing VSPD array having a modified VSPD arrangement. In FIG. 12, reference numeral 1 refers to VSPD array including VSPDs, and 2 is one of the VSPDs.

FIG. 11 shows the color filter 12 which is used in a simple setup according to the present invention so as to enable processing of the color information as in the biological retina. The color filter 12 is mounted on a surface of the VSPD array 1. The color filter 12 is divided into cells. Each cell is matched with each VSPD cell of the VSPD array 1 under each cell. Depending upon the position, a filter cell selects one of the following transparent portions so as to transfer only one color among colors in the transparent portion 13 with respect to red light, the transparent portion 14 with respect to green light, the transparent portion 15 with respect to yellow light, and the transparent portion 16 with respect to blue light. In colors in adjacent columns of the filter, the transparent portion 13 and the transparent portion 14, or the transparent portion 15 and the transparent portion 16 are alternately and repeatedly arranged. Further, in colors in adjacent rows of the filter, red and yellow, or green and blue are alternately and repeatedly arranged.

This arrangement of the filter simulates a structure of human retina. The human retina encodes signals from sensors for red light, green light and blue light as a difference signal of red minus green and a difference signal of yellow minus blue before transmitting them to the brain. This encoding system causes a human to have a subjective impression that there are especially strong color contracts between red and green, and between yellow and blue.

According to the present invention, it is possible to implement the entirely same encoding. For this, sensitivity is set as follows:

$$S_{2i+1} = -S_{2i}, S_{2i} \geq 0, \ 0 \leq i < N/2 \tag{21}$$

This means that the sensitivities si are grouped in pairs. In each pair, the sensitivity having even index of $2i$ serves to control rows of the VSPD having the filter of the transparent portions 13 and 15, and is set to a positive value. On the other hand, the sensitivity having odd index of $2i+1$ serves to control rows of the VSPD having the filter of the transparent portions 14 and 16, and is set to the inverted value of the sensitivity with the index $2i$, that is, a negative value. It is possible to combine all other image processing operations of the present invention with the color encoding technique. In this case, processing is performed not on the original image, but on the difference signals, i.e., the difference signal of red minus green, and the difference signal of yellow minus blue.

Sensors in the biological retina are not arranged in an array configuration as in the sensors in the VSPD array 1. Rather a hexagonal arrangement of the VSPDs is similar to the structure of the biological retinal sensors. FIG. 12(A) and (B) show two possibilities in implementation of the hexagonal arrangements of the VSPDs 2. In FIG. 12 (A), the hexagonal arrangement is implemented by moving the VSPDs 2 by a distance of D every other row. In FIG. 12 (B), the hexagonal arrangement is implemented by removing the VSPDs 2 every other row. Reference numeral 2D means a distance between adjacent VSPDs 2 in the row direction. Optionally, the hexagonal configuration of the VSPDs 2 may be used instead of a rectangular configuration.

Embodiment 6

Figure 13:
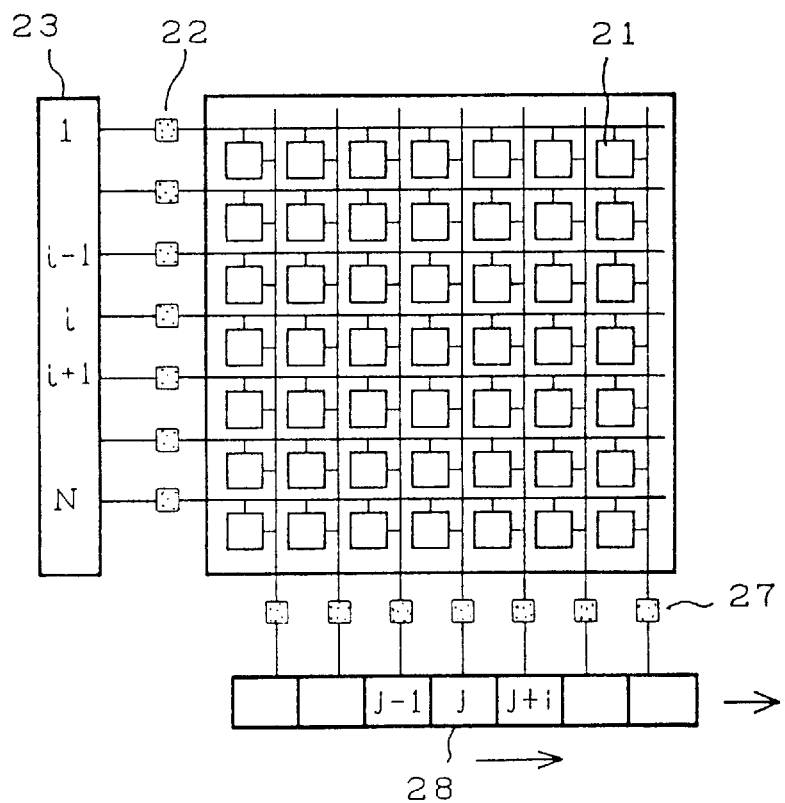
FIG. 13 is a block diagram of an image sensor employed in an apparatus of the present invention.

The sixth embodiment of the present invention will now be described with reference to the drawings. FIG. 13 shows a structure of a two-dimensional array of variable sensitivity photo detectors. In FIG. 13, reference numeral 21 refers to a photoreceptive element including the variable sensitivity photo detector in which conversion efficiency from light to current is varied depending upon the magnitude of the voltage across two terminals. Reference numeral 22 represents a control electrode, and 23 is a control circuit in which a plurality of voltage data can be stored so as to transfer the data, and the stored voltage data is partially connected to the control electrode. Reference numerals 24, 25 and 26 show voltage vectors which respectively serve as a part of the voltage data stored in the control circuit 23. Reference numeral 27 refers to an output electrode, and 28 is a one-dimensional memory having a function which enables shift of the stored data.

Figure 14:
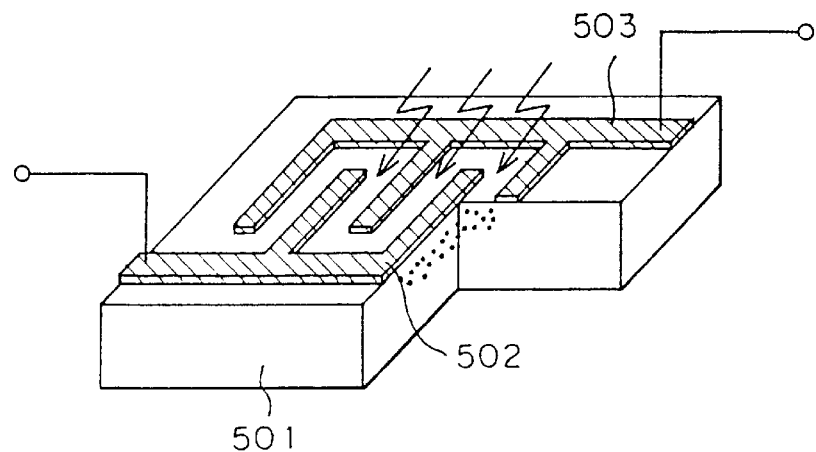
FIG. 14 is a structural diagram of a variable sensitivity photo detector having a metal-semiconductor-metal structure.

Specifically, the variable sensitivity photo detector may include a structure as shown in FIG. 14. A pair of Schottky electrodes 502, 503 are provided on a semiconductor substrate 501. The conversion efficiency from light to current is proportional to the magnitude of voltage across the terminals. Further, a direction of the current may be reversed according to the polarity of the voltage.

A description will now be given of a 3 by 3 filter matrix, and the operation of the sum of the product of images.

It is assumed that three voltage vectors 24, 25 and 26 are stored in the control circuit 23, and the voltage vectors are respectively applied to three control electrodes, that is, the i−1th control electrode, the ith control electrode, and the i+1th control electrode. An input image is represented as a matrix as follows:

$$G = \{g(i, j)\} \tag{22}$$

Accordingly, when the first voltage vector 24 is connected to the control electrode 22, an output of the j−1th column is expressed as follows:

$$\sum_{x=-1}^{1} a(x, y)g(i+x, j-1) \tag{23}$$

Further, the contents of the one-dimensional memory 28 are shifted to the right one by one. Hence, a value of the above expression (23) is stored in the jth column of the memory. Subsequently, in case the second voltage vector 25 is connected to the control electrode 22, the contents of the jth column of memory are added to the result of the expression (23), resulting in as follows:

$$\sum_{x=-1}^{1} \sum_{y=-1}^{0} a(x, y)g(i+x, j+y) \tag{24}$$

Similarly, in case the third voltage vector 26 is connected to the control electrode 22 after shifting the contents of the one-dimensional memory 28 to the right one by one, the contents of the j+1th memory are expressed as follows:

$$f(i, j) = \sum_{x=-1}^{1} \sum_{y=-1}^{1} a(x, y)g(i+x, j+y) \tag{25}$$

Where f(i, j) corresponds to the result of the sum of the products which is performed around pixel g(i, j) by using a matrix A = {a(x, y)}. The entirely same operation is performed to the other columns. Thus, it is possible to perform any two-dimensional sum of the products. In the embodiment, an intermediate row having the applied voltage vector is the ith row. However, if there is provided a scan array with N by N pixels, an output image with (N−2) by (N−2) pixels can be obtained by 3(N−2) repetitive operations.

Further, if similar operations are performed when there is provided a filter having a size of (2n+1) by (2n+1), the output image with (N−2n) by (N−2n) pixels can be obtained by (2n+1)(N−2n) repetitive operations in the following expression:

$$f(i, j) = \sum_{x=-n}^{n} \sum_{y=-n}^{n} a(x, y)g(i+x, j+y) \tag{26}$$

Two (i.e., two kinds of) serial processing of the sum of the product in a mask size of (2n+1) by (2n+1) can be reduced to processing using a (4n+1) by (4n+1) filter matrix. Further multistage processing can be also reduced as before.

Figure 15:
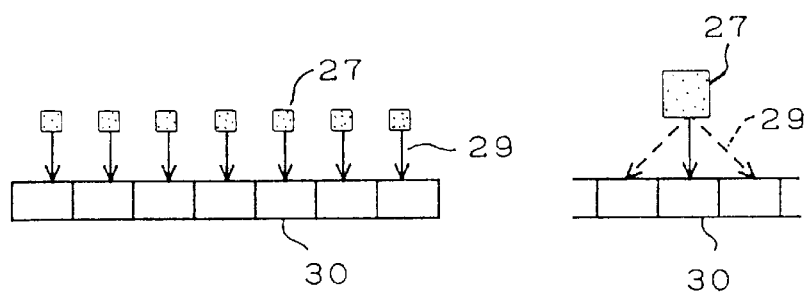
FIG. 15 is a diagram showing a one-dimensional memory having a variable connecting portion to an output electrode.

An output portion using a change-over switch 29 may be employed as shown in FIG. 15. In this case, there may be provided a one-dimensional memory 30 without the data shifting function.

Figure 16:
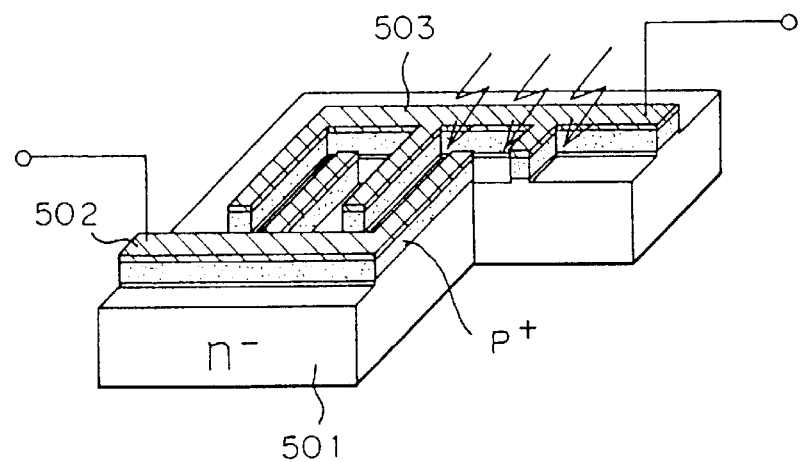
FIG. 16 is a structural diagram of a variable sensitivity photo detector having p-type semiconductor-n-type semiconductor-p-type semiconductor structure.

The photo detector should not be limited to the photo detector having MSM structure shown in FIG. 14, and may include any type of photo detector in which the conversion efficiency from light to current is varied depending upon the voltage across the terminals. For example, a pnp-type photo detector shown in FIG. 16 or a photoconductor may be employed as photo detectors. Further, the photo detector may be made of any material such as silicon, amorphous silicon, or gallium arsenide.

Embodiment 7

Figure 17:
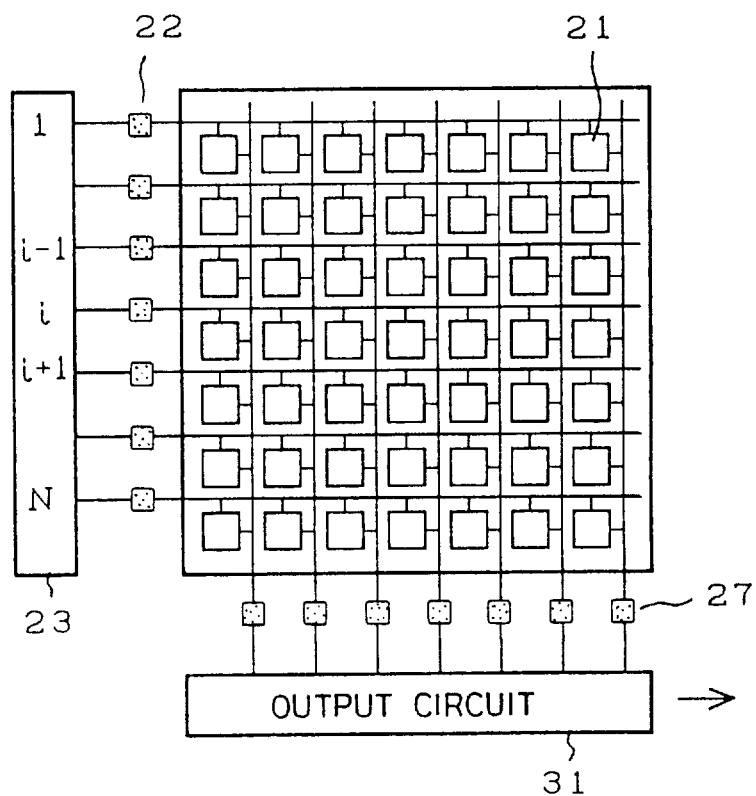
FIG. 17 is another block diagram of the image sensor applied to the apparatus of the present invention.
Figure 18:
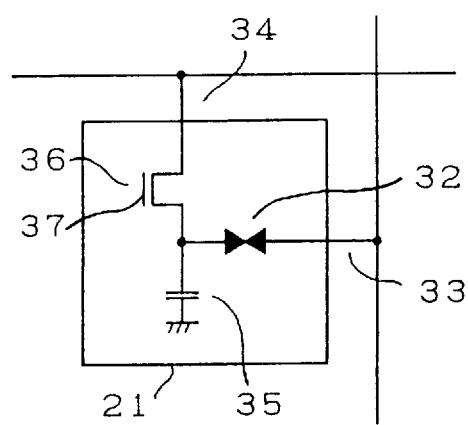
FIG. 18 is a structural diagram of a photoreceptive element.

FIGS. 17 and 18 show an embodiment of each photoreceptive element 21 including a built-in switching gate and a built-in capacitor. Reference numeral 31 represents an output circuit having a mechanism supplying current from any output electrode. One terminal of a variable sensitivity photo detector 32 is directly connected to an output terminal 33, and the other terminal is grounded via a capacitor 35, and is connected to a control terminal 34 via a switching gate 36. Reference numeral 37 means a gate signal. The variable sensitivity photo detector 32 may include various types of photo detectors as in the embodiment 1.

A description will now be given of the operation of sum of the product of the 3 by 3 filter matrix a (x, y) and an image. With regard to a pixel (i, j), photosensitivity of the photoreceptive element in the vicinity of the pixel is set before irradiating light. For example, in order to set a pixel (i−1, j−1), element of the filter is applied to the i−1th control electrode so that a switching gate of the pixel (i−1, j−1) is turned ON. Hence, the voltage is stored in the capacitor. The switching gate is turned OFF after setting the photosensitivity. Similarly, 3 by 3 photosensitivity is set. Subsequently, an image g (i, j) is irradiated while applying current from output electrodes in the j−1th column, the jth column and the j+1th column. As a result, $$f(i, j) = \sum_{x=-1}^{1} \sum_{y=-1}^{1} a(x, y)g(i+x, j+y) \tag{27}$$

That is, f (i, j) is the sum of the products of the matrix a (x, y) around the pixel g (i, j). If such an operation is performed with respect to all the pixels, it is possible to obtain the sum of the products of any two-dimensional filter matrix and the image. At the time, N/3 can be simultaneously calculated with respect to columns.

Similarly, it is also possible to perform the sum of product of a larger filter matrix than the 3 by 3 filter matrix and the image.

Embodiment 8

Figure 19:
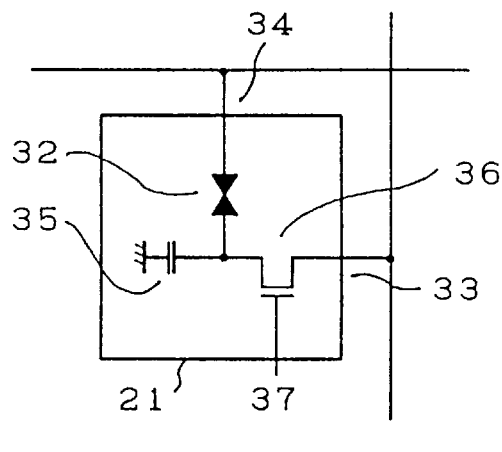
FIG. 19 is a structural diagram of the photoreceptive element.

FIG. 19 shows another embodiment of a photoreceptive element 21 including a built-in switching gate and a built-in capacitor. In the embodiment, one terminal of a variable sensitivity photo detector 32 is grounded via a capacitor 35, and is connected to an output terminal 33 via a switching gate 36, and the other terminal is directly connected to a control terminal 34.

The operation will be described hereinafter. In a first clock, voltage is applied to the control terminal 34 while the switching gate 36 is closed. Thus, photoelectric current from the variable sensitivity photo detector 32 is stored in the capacitor 35. The switching gate 36 is opened when next voltage is applied to the common control terminal 34. Consequently, the photoelectric current from the variable sensitivity photo detector 32 and current discharged from the capacitor 35 are output as a single current to the output terminal 33. If such an operation is performed in each pixel, it is possible to once store an image and thereafter obtain the sum of the stored image and an image in a frame or the difference between the images. Further, if various voltage are applied to a plurality of control terminals 34 before opening the switching gate 36, a plurality of results of the image processing can be added with each other.

In addition, it is possible to substantially enhance the sensitivity by performing the following operation. First, the voltage is applied to the control electrode with the switching gate 36 closed. Hence, the photoelectric current from the variable sensitivity photo detector 32 is stored in the capacitor 35. When the switching gate 36 is opened in some clock, the charge stored for an irradiation interval is discharged. Accordingly, a larger current value can be obtained than current value obtained by accessing the variable sensitivity photo detector 32 in a short clock.

Figure 20:
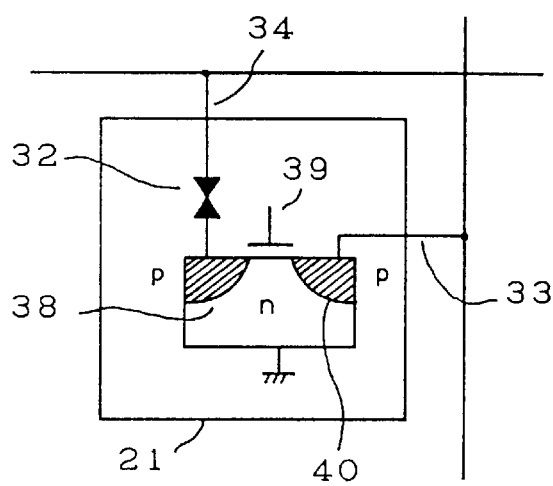
FIG. 20 is a structural diagram of the photoreceptive element.

Operation similar to the operation show in FIG. 19 can be implemented by using the operation like CCD as shown in FIG. 20 as well as the combination of the capacitor and the switching gate. In this case, one terminal of the variable sensitivity photo detector 32 is directly connected to the control terminal 34, the other terminal is connected to an input diode 38 which is provided by using diffusion. In case the transferred charge is, for example, a hole, the input diode 38 and an output diode 40 are p-type diodes, and the substrate is n-type. Reference numeral 39 refers to an input gate.

In this case, the p layer is at a lower potential when no voltage is applied to the input gate 39. Therefore, the hole is first stored in the input diode 38. If sufficiently large voltage is applied to the input gate 39 at some moment so as to decrease a surface potential, the charge flows from the input diode 38 to the output diode 40, and is drawn of the output terminal 33.

Embodiment 9

Figure 21:
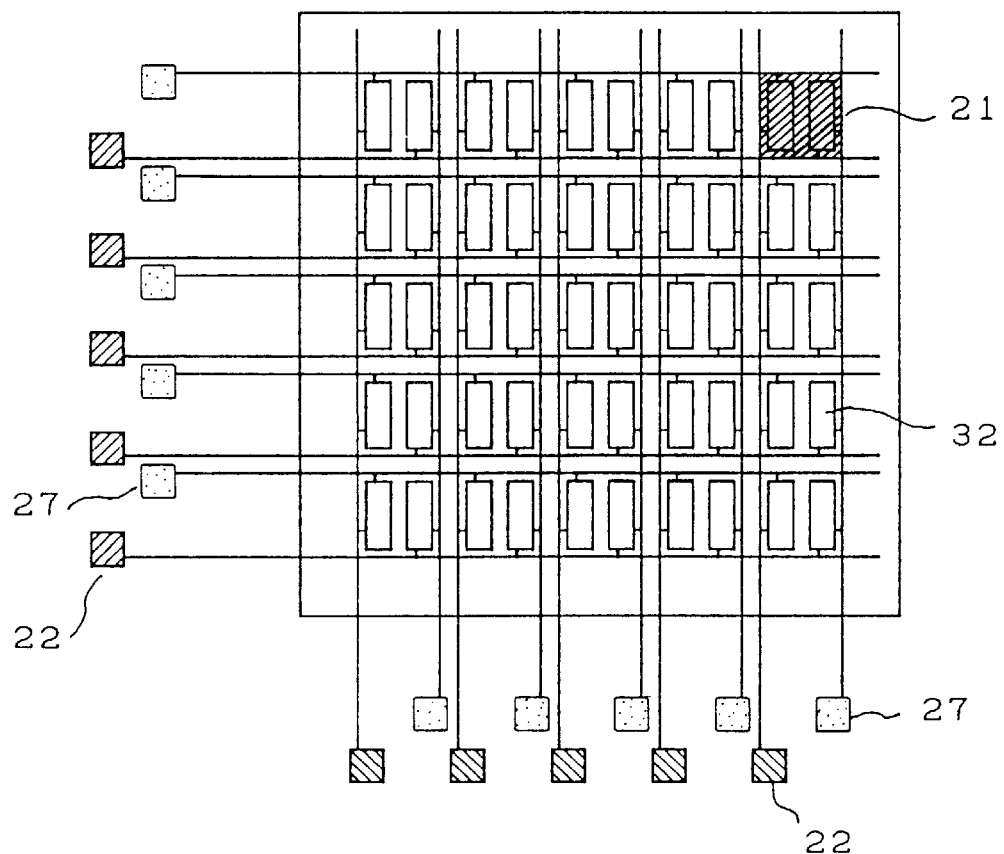
Fig. 21, is another block diagram of the image sensor applied to the apparatus of the present invention.

FIG. 21 shows an embodiment of each photoreceptive element 21 including two variable sensitivity photo detectors 32. In one photo detector, one terminal is connected to the common control terminal 22 for each row, and the other terminal is connected to the common output electrode 27 for each column. In the other photo detector, one terminal is connected to the common control terminal 22 for every column, and the other terminal is connected to the common output terminal 27 for each row.

The operation will now be described. First, a description will be given of the photo detector having one terminal connected to the common control terminal for every row. When control voltage is applied to each control electrode, photosensitivity is set for every row. At the time, if an image is irradiated, each photoelectric current is applied for every row and is drawn of the output electrode. In such a way, the one-dimensional sum of product is performed with respect to the vertical control voltage vector and the image. Similarly, in the photo detector having the other terminal connected to the common control electrode for every column, the one-dimensional sum of the products is performed with respect to horizontal control voltage vector and the image. The results of the vertical and horizontal processing can be simultaneously obtained.

Further, it is also possible to perform two-dimensional image processing by synthesizing the resultant output signals in both directions by using an external circuit.

Embodiment 10

Figure 22:
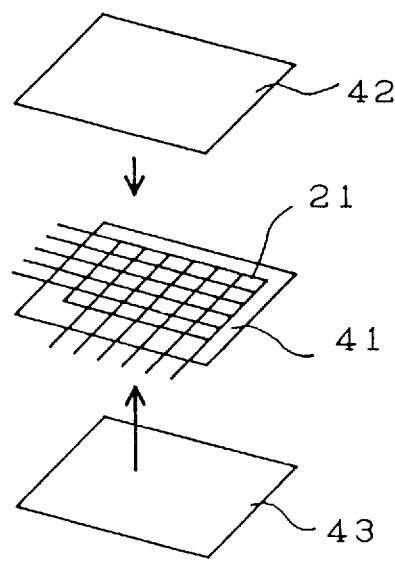
FIG. 22 is a still another exploded perspective view of the image sensor applied to the apparatus of the present invention.

FIG. 22 illustrates a configuration of an embodiment wherein an incident ray passes through both sides of a two-dimensional array of variable sensitivity photo detectors. In FIG. 22, reference numeral 41 refers to the two-dimensional array of the variable sensitivity photo detectors. The two-dimensional array may be an array including each independent element, or an image sensor having a configuration as shown in the above-mentioned embodiment. Reference numerals 42 and 43 are respectively light input which may be uniform light, a linear one-dimensional pattern or a two-dimensional pattern.

In case input images are respectively fed by the light on the both sides, image processing is performed with respect to the sum of the two images.

In case one light is the input image and the other light is a control signal, the image processing is performed after applying an offset to each pixel.

Embodiment 11

Figure 23:
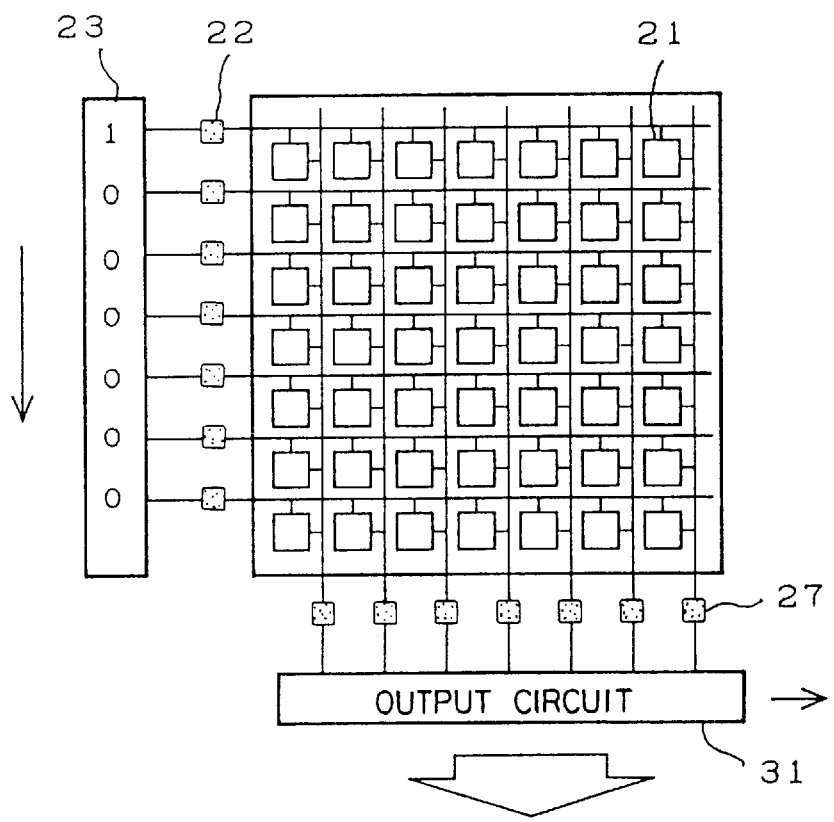
FIG. 23 is a block diagram of the image sensor of FIG. 22.

FIG. 23 illustrates an embodiment of a configuration in which only one voltage vector has voltage other than zero volts and other voltage vectors are all equal to zero volts, and a control circuit is provided to optionally vary a position of the voltage vector having the voltage other than zero volts with respect to the voltage vectors. In FIG. 23, the same reference numerals are used for structures identical with those in the embodiment of FIG. 17, and description of similar structure is omitted.

A description will be given of the operation of an image detection using the image sensor. First, 1 volt is applied only to the first row of control electrode so that each pixel of the first row can have the same photosensitivity. In this condition, if the image is irradiated, current proportional to light power in each pixel of the first row is drawn of an output electrode. This means that the first row of the input image has been detected. Subsequently, if 1 volt is applied to rows in the order of the second row, the third row, ..., the input image can be detected for every row. Since the image is detected in parallel in one row, a high speed image detection can be realized if image signal is drawn of the output circuit in parallel. In view of matching with conventional image signal, the image signal from the output circuit may be a serial signal.

When the applied voltage of 1 volt is varied to a voltage other than 1 volt, the photosensitivity is also varied. That is, it may be possible to hold an output level constant by correction by the control voltage even if a range of input light power is varied.

Alternatively, it is possible to detect only a partial image of the input image if the voltage other than zero volts is applied to a specific row instead of applying the voltage to all the rows.

Similarly, if voltage is applied to constant intervals, it is possible to detect the image with any resolution. If rough image information is only required, the high speed processing is obtained by reducing the resolution.

Embodiment 12

Figure 24:
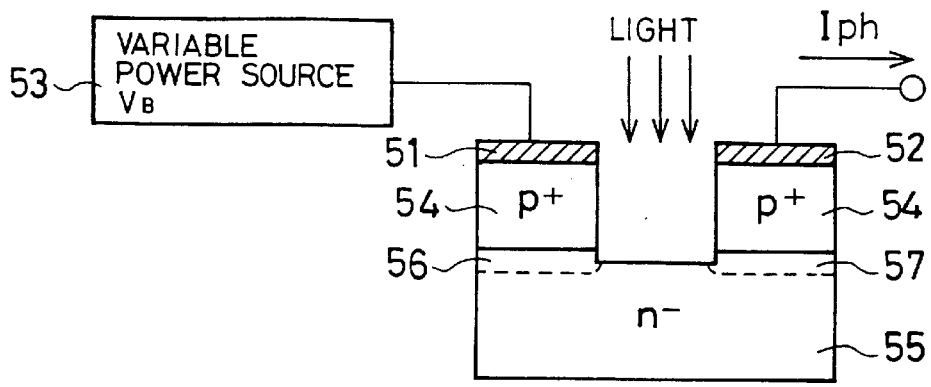
FIG. 24 is a sectional view showing a variable sensitivity photo detector applied to the apparatus of the present invention.

One embodiment of the present invention will now be described with reference to the drawings. FIG. 24 is a sectional view showing a variable sensitivity photo detector according to the embodiment 12 of the present invention. The variable sensitivity photo detector has a symmetrical structure where two $p^+n^-$ junctions are coupled to each other with their $n^-$ layers shared in common. Reference numeral 51 refers to an electrode on the side applying control voltage $V_B$ (hereafter referred to as control electrode), and 52 is an electrode on the side drawing output current $I_{ph}$ (hereafter referred to as output electrode). Reference numeral 53 is a power supply providing output which is variable in a range of negative voltage to positive voltage. Reference numeral 54 is a $p^+$-type semiconductor layer (hereafter referred to as $p^+$ layer), and 55 is an $n^-$-type semiconductor layer (hereafter referred to as $n^-$ layer). Further, 56 is a depletion layer which is provided at a pn junction on the side of the control electrode 51, and 57 is a depletion layer which is provided at a pn junction on the side of the control electrode 52. The control electrode 51 and the output electrode 52 are in contact with the $p^+$ layer 54 through ohmic contact. The $p^+$ layer 54 and the $n^-$ layer 55 may be made of any semiconductor material absorbing incident ray, such as GaAs, AlGaAs, InGaAs, or Si.

The operation will now be described. As shown in FIG. 24, the input light vertically enters the variable sensitivity photo detector. In case the voltage $V_B$ applied to the control electrode 51 is equal to zero, r charge photo-generated in the vicinity of the depletion layers 56, 57 can not overcome a potential barrier of the pn junction. Further, the charge photo-generated at a place other than the depletion layers is also offset by the symmetric property of the photo detector. As a result, the output current $I_{ph}$ is equal to zero.

If the control voltage $V_B$ applied to the control electrode 51 is positive, the depletion layer 57 on the side of the output electrode 52 is extended, and the charge generated in the vicinity of the depletion layer 57 is attracted by a potential difference across the electrodes 51 and 52 to generate the output current $I_{ph}$. At the time, the charge mainly contributing to generation of the output current $I_{ph}$ is the charge generated in a range of inside of the depletion layer 57 and diffusion length of the depletion layer 57. Thickness of the depletion layer 57 depends upon the control voltage $V_B$ so that the output current $I_{ph}$ eventually depends upon the control voltage $V_B$.

If the control voltage $V_B$ is negative, the depletion layer 56 on the side of the control electrode 51 is extended, and the negative output current $I_{ph}$ depending upon the control voltage $V_B$ can be similarly obtained. With the process as set forth above, the variable sensitivity photo detector of FIG. 24 can be operated to vary the output current $I_{ph}$ by the control voltage $V_B$ in a range of negative voltage to positive voltage, that is, to continuously vary the sensitivity in a range of negative sensitivity to positive sensitivity. Concentration of impurities in the two p$^+$ layers 54 is variable with each other. Further, the p$^+$ layers 54 may be made of each different semiconductor material so as to reply with asymmetrical sensitivity.

Embodiment 13

Figure 25:
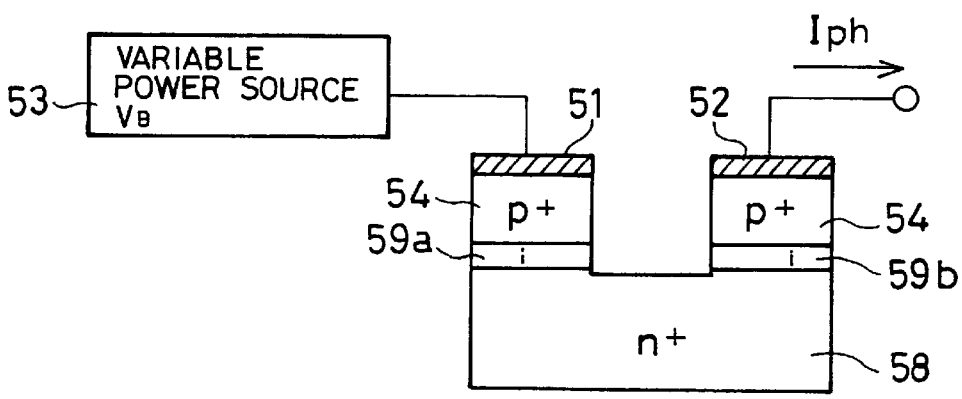
FIG. 25 is a sectional view showing a variable sensitivity photo detector applied to the apparatus of the present invention.

FIG. 25 is a sectional view showing a variable sensitivity photo detector according to the embodiment 13 of the present invention. In FIG. 25, structures represented by reference numerals 51 to 54 correspond to those represented by the same reference numerals in FIG. 24. Reference numeral 58 refers to an n$^+$-type semiconductor layer (hereafter referred to as n$^+$ layer), 59a is an i (intrinsic)-type semiconductor layer (hereafter referred to as i layer) interposed between the p$^+$ layer 54 on the side of the control electrode 51 and the n$^+$ layer 58, and 59b is an i-type semiconductor layer (hereafter referred to as i layer) interposed between the p$^+$ layer 54 on the side of the output electrode 52 and the n$^+$ layer 58. That is, a depletion layer in the embodiment is provided in a p-i-n structure.

The operation process of the variable sensitivity photo detector in the embodiment is the same as that in the above-mentioned embodiment 12. However, since the i layer 59 has a wider depletion layer than that in the n layer 58, a junction capacitance is reduced so as to provide a more quick response. It is also possible to obtain the same effect as set forth before by using a structure where the p$^+$ layer is directly mounted on a semi-insulated substrate.

Embodiment 14

Figure 26:
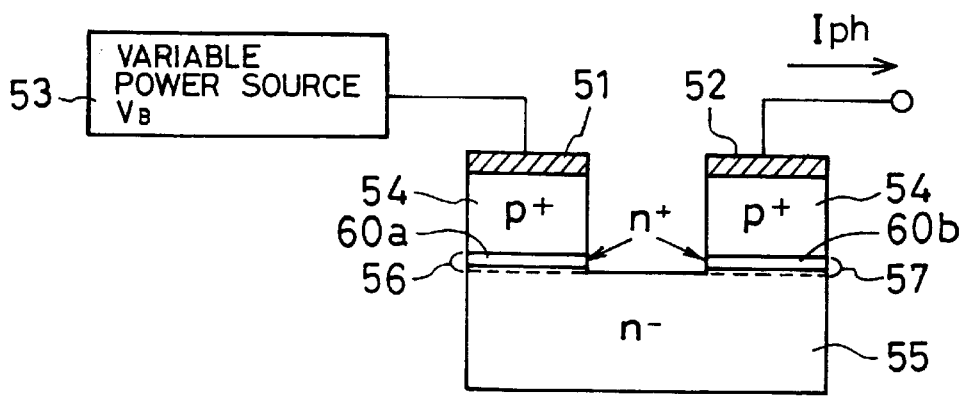
FIG. 26 is a sectional view showing a variable sensitivity photo detector applied to the apparatus of the present invention.

FIG. 26 is a sectional view showing a variable sensitivity photo detector according to the embodiment 14 of the present invention. In FIG. 26, structures represented by reference numerals 51 to 57 correspond to those represented by the same reference numerals in FIG. 24. Reference numeral 60a refers to a thin n$^+$-type semiconductor layer (hereafter referred to as n$^+$ layer) interposed between the p$^+$ layer 54 on the side of control electrode 51 and the n$^-$ layer 55, and 60b is a thin n$^+$-type semiconductor layer (hereafter referred to as n$^+$ layer) interposed between the p$^+$ layer 54 on the side of the output electrode 52 and the n$^-$ layer 55 (hereafter referred to as n$^+$ layer).

The operation process of the variable sensitivity photo detector in the embodiment is identical with those of the embodiments 12 and 13. However, the depletion layer in the n$^+$ layers 60a, 60b can not extend larger than that in the n$^-$ layer 55. Accordingly, there is a small variation of extension of the depletion layer with respect to variation of voltage when the control voltage $V_B$ is small. However, when the control voltage $V_B$ is increased to some extent, the depletion layer extends in a range of the n$^+$ layers 60a, 60b to the n$^-$ layer 55. As a result, the variation in the extension of the depletion layer with respect to the variation of the voltage becomes large.

Therefore, in the variable sensitivity photo detector, variation of the sensitivity is small while the control voltage $V_B$ is small, and the variation of the sensitivity becomes larger as the control voltage $V_B$ is increased. Hence, according to the variable sensitivity photo detector of the embodiment, when the control voltage $V_B$ is set to zero, it is possible to restrict output current $I_{ph}$ irrespective of offset, fluctuation of the voltage or the like. As a result, it is possible to enhance resistance with respect to the fluctuation and the like.

Embodiment 15

Figure 27:
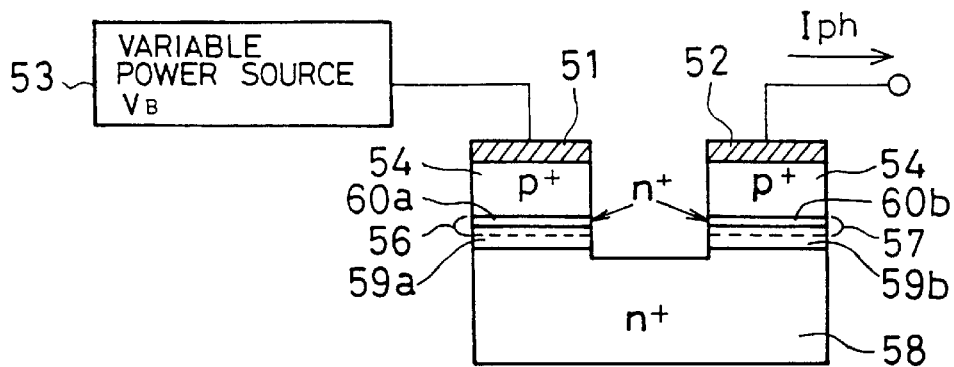
FIG. 27 is a sectional view showing a variable sensitivity photo detector applied to the apparatus of the present invention.

FIG. 27 is a sectional view showing a variable sensitivity photo detector according to the embodiment 15 of the present invention. In FIG. 27, structures represented by reference numerals 51 to 57 correspond to those in FIG. 24, structures represented by 59a, 59b correspond to those in FIG. 25, and structures represented by 60a, 60b correspond to those in FIG. 26. The variable sensitivity photo detector of the embodiment is basically provided in a p$^+$-i-n$^-$ structure in regards to a depletion layer as in the case of the embodiment 13. On the other hand, in the variable sensitivity photo detector of the embodiment, thin n$^+$ layers 60a, 60b are respectively interposed between the p$^+$ layer 54 and the i layer 59a, and between the p$^+$ layer 54 and the i layer 59b as in the case of the embodiment 14.

The operation process of the variable sensitivity photo detector of the embodiment is identical with those of the embodiments 12 to 14. However, since the p$^+$-n$^+$-i-n$^-$ structure is provided in regard to the depletion layer as set forth above, it is possible to obtain a good resistance to fluctuation of voltage as described in the embodiment 14, as well as a quick response as described in the embodiment 13. These effects can be also obtained by using a structure where the n$^+$ layer and the p$^+$ layer are mounted on a semi-insulated substrate.

Embodiment 16

Figure 28:
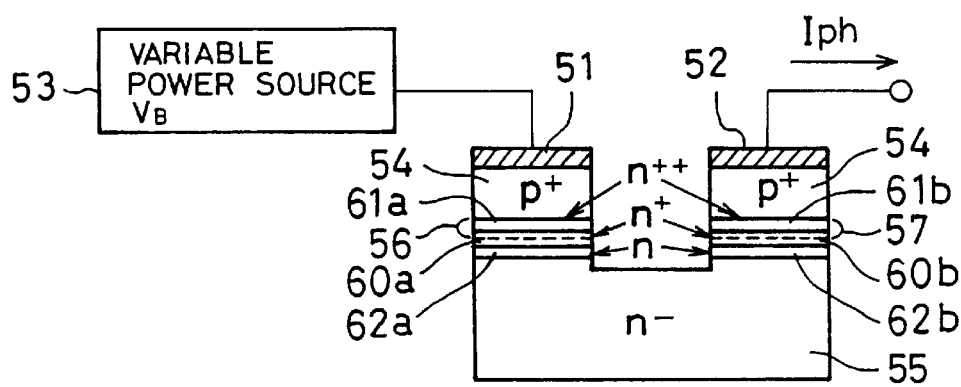
FIG. 28 is a sectional view showing a variable sensitivity photo detector applied to the apparatus of the present invention.

FIG. 28 is a sectional view showing the variable sensitivity photo detector according to the embodiment 16 of the present invention. In FIG. 28, structures represented by reference numerals 51 to 57 correspond to those in FIG. 24, and structures represented by 60a and 60b correspond to those in FIG. 26. Further, reference numerals 61a and 62a refer to an n$^{++}$-type semiconductors (hereafter referred to as n$^{++}$ layer) disposed above the n$^+$ layer 60a, and an n-type semiconductor layer (hereafter referred to as n layer) disposed under the n$^+$ layer 60a, respectively. Reference numerals 61b and 62b refer to an n$^{++}$ layer disposed above the n$^+$ layer 60b, and an n layer disposed under the n$^+$ layer 60b, respectively. That is, the variable sensitivity photo detector of the embodiment is provided with a structure similar to the structure of the embodiment 14. Besides, in the embodiment, the n-type layers are interposed between the p$^+$ layer 54 and the n$^-$ layer 55, and impurity concentrations of the n-type layers are gradually reduced in the order of the n$^{++}$ layers 61a, 61b, the n$^+$ layers 60a, 60b, the n layer 62a, 62b. As a result, it is possible to provide a linear variation of sensitivity with respect to voltage.

Embodiment 17

Figure 29:
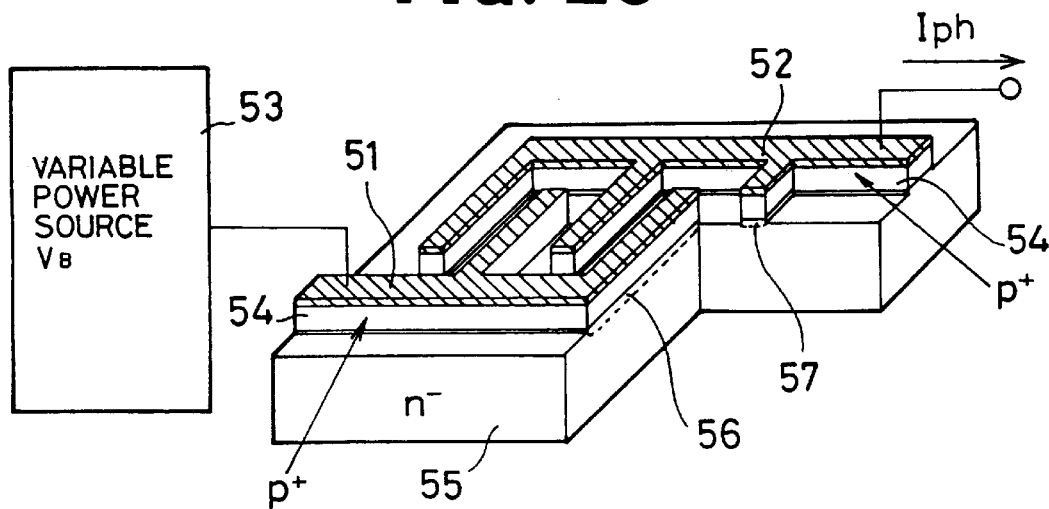
FIG. 29 is a notched sectional view showing a variable sensitivity photo detector applied to the apparatus of the present invention.

FIG. 29 is a notched perspective view showing a variable sensitivity photo detector according to the embodiment 17 of the present invention. In FIG. 29, structures represented by reference numerals 51 to 57 correspond to those in FIG. 24. In the embodiment, a laminated structure is identical with the laminated structure of the embodiment 12. Besides, a control electrode 51, an output electrode 52 and the p+ layer 54 are provided to form an interdigital structure. Further, teeth portions of the respective interdigital portions are combined with each other.

The variable sensitivity photo detector of the embodiment is operated as in the case of that of the embodiment 12. In the embodiment, it is possible to substantially increase an area of a photoreceptive portion per unit area so that sensitivity can be improved. In the embodiment, the laminated structure of the variable sensitivity photo detector is identical with that of the embodiment 12. However, the structure of the variable sensitivity photo detector of the embodiment may be identical with any one of those of the embodiments 13 to 16 to have an interdigital structure so as to enhance the sensitivity.

Embodiment 18

Figure 30:
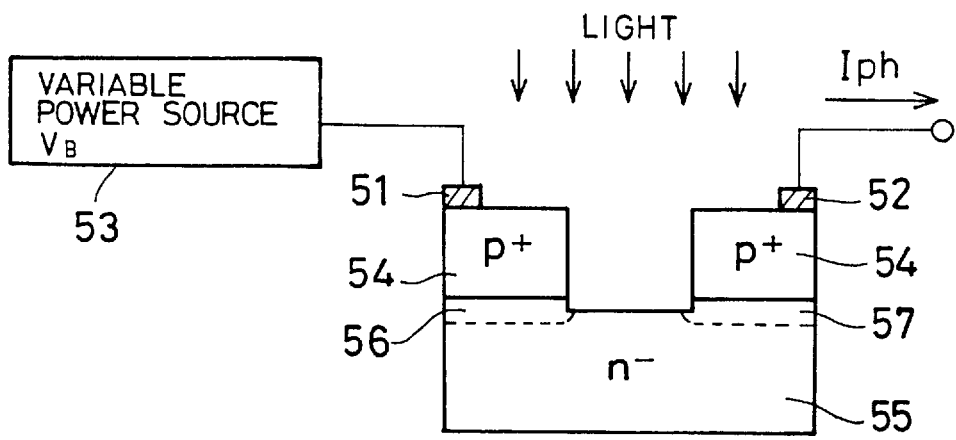
FIG. 30 is a sectional view showing a variable sensitivity photo detector applied to the apparatus of the present invention.

FIG. 30 is a sectional view showing a variable sensitivity photo detector according to the embodiment 18 of the present invention. In FIG. 30, structures represented by reference numerals 51 to 57 correspond to those in FIG. 24. In the embodiment, a laminated structure is provided as in the case of the embodiment 12. Besides, the control electrode 51 and the output electrode 52 have smaller areas than an area of the p+ layer 54.

The variable sensitivity photo detector of the embodiment is operated as in the case of the embodiment 12. However, since the p+ layers 54 are highly conductive, there is no problem with respect to travelling of photoelectric current $I_{ph}$ even if the electrodes 51 and 52 do not cover entire top surfaces of the p+ layers. Further, in the embodiment, the areas of the electrodes 51 and 52 are smaller than the area of the p+ layer 54 facing to the electrodes. Accordingly, incident ray can also transmit top surface portions of the p+ layers which are uncovered by the electrodes 51 and 52, and can directly reach the depletion layers 56 and 57. Therefore, according to the embodiment, it is possible to increase current output and improve utilization factor of light without a transparent electrode. In the embodiment, the variable sensitivity photo detector is provided with the same laminated structure as that of the embodiment 12, but may employ one of laminated structures of the embodiments 13 to 16.

Embodiment 19

Figure 31:
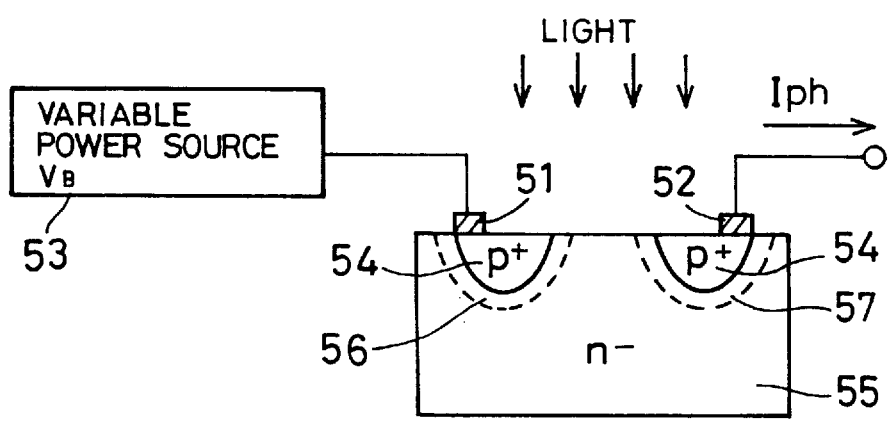
FIG. 31 is a sectional view showing a variable sensitivity photo detector applied to the apparatus of the present invention.

FIG. 31 is a sectional view showing a variable sensitivity photo detector according to the embodiment 19 of the present invention. In FIG. 31, structures represented by reference numerals 51 to 57 correspond to those in FIG. 24. A laminated structure of the embodiment is also identical with that of the embodiment 18. Besides, the p+ layer 54 is manufactured by using diffusion or ion implantation so as to obtain a compact and plane structure. It is possible to transform any one of laminated structures having stages between the electrodes 51 and 52 in the embodiments 13 to 17 into such a plane structure by diffusion or the like.

Embodiment 20

Figure 32:
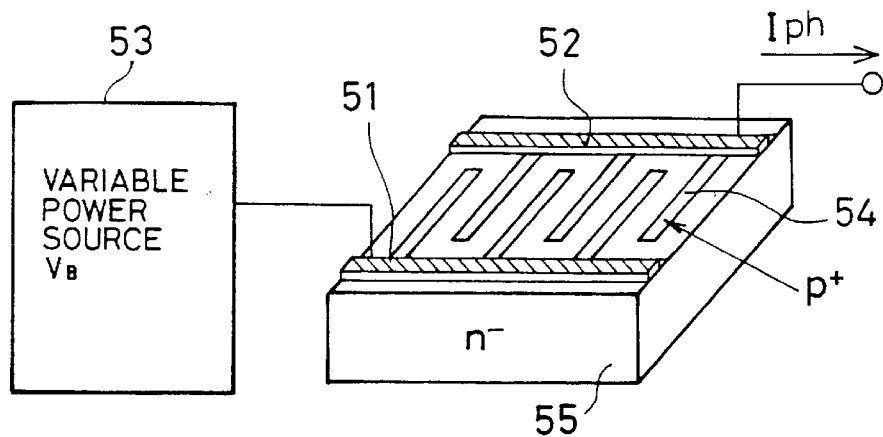
FIG. 32 is a perspective view showing a variable sensitivity photo detector applied to the apparatus of the present invention.

FIG. 32 is a sectional view showing a variable sensitivity photo detector according to the embodiment 20 of the present invention. In FIG. 32, structures represented by reference numerals 51 to 57 correspond to those in FIG. 24. The variable sensitivity photo detector of the embodiment is provided to have the interdigital structure of the embodiment 17 while employing a partially exposed structure of a p+ layer of the embodiment 18, and a plane structure of the embodiment 19.

The variable sensitivity photo detector of the embodiment is operated as in the case of the respective variable sensitivity photo detectors of the embodiments 17, 18 and 19. In the embodiment, the p+ layer 54 is provided so as to form the interdigital structure per se, and the control electrode 51 and the output electrode 52 are mounted only on wiring portions. According to the embodiment, it is possible to provide a compact photo detector as in the embodiment 19, and a photo detector having the same sensitivity and high utilization factor of light as in the photo detector of the embodiments 17 and 18.

Embodiment 21

Figure 33:
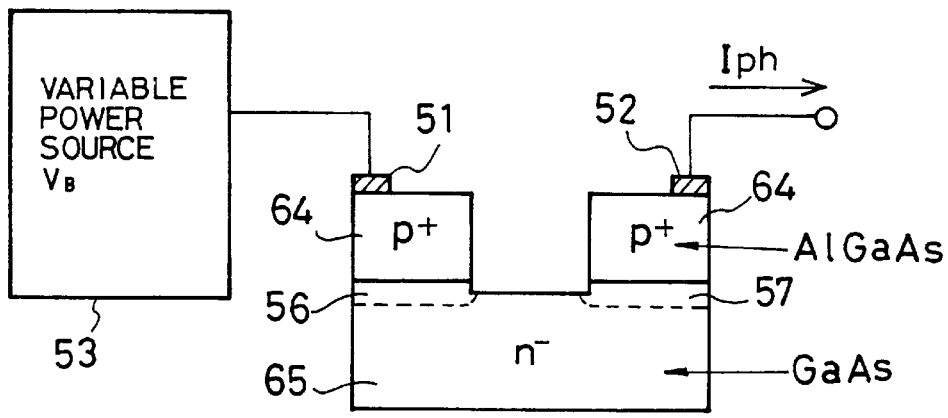
FIG. 33 is a sectional view showing a variable sensitivity photo detector applied to the apparatus of the present invention.

FIG. 33 is a sectional view showing a variable sensitivity photo detector according to the embodiment 21 of the present invention. In FIG. 33, structures represented by reference numerals 51, 53, 56 and 57 correspond to those in FIG. 24. Further, a p+ semiconductor layer 64 and an n− semiconductor layer 65 have absorption wave bands which are different from each other, and the p+ layer 64 is provided so as to have a larger band gap than that of the n− layer 65. The p+ layer 64 may employ AlGaAs or the like, and the n− layer 65 may employ GaAs.

The variable sensitivity photo detector of the embodiment is basically operated as in the case of the respective variable sensitivity photo detectors of the embodiment 12. A wavelength of incident ray vertically entering from an upper side of the photo detector is selected such that the incident ray is not absorbed in the p+ layer 64, but absorbed only in the n− layer 65. In this case, the incident ray is not attenuated and can directly reach depletion layers 56 and 57. As a result, it is possible to obtain high sensitivity.

Embodiment 22

Figure 34:
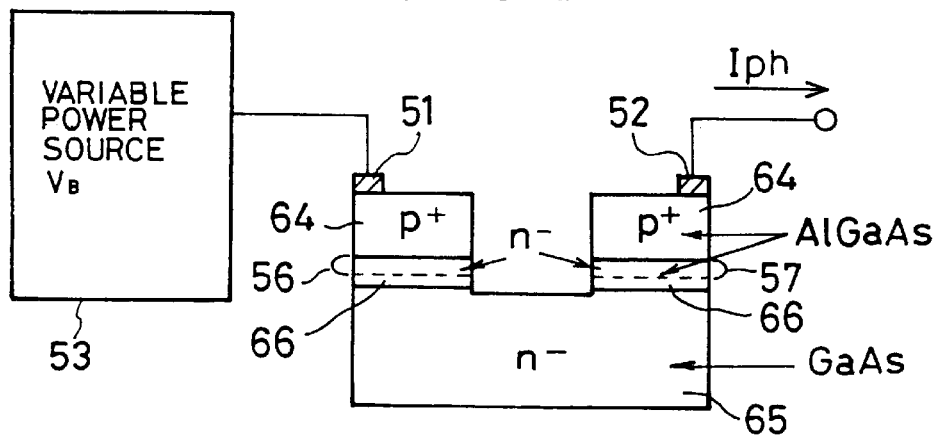
FIG. 34 is a sectional view showing a variable sensitivity photo detector applied to the apparatus of the present invention.

FIG. 34 is a sectional view showing a variable sensitivity photo detector according to the embodiment 22 of the present invention. In FIG. 34, structures represented by reference numerals 51 to 53, 56, 57, 64, 65 correspond to those in FIG. 33. In the embodiment, an n− layer 66 has a doped end including a semiconductor identical with the p+ layer 64, and is inserted between the p+ layer 64 and the n− layer 65.

The variable sensitivity photo detector of the embodiment is basically operated as in the case of the respective variable sensitivity photo detectors of the embodiment 21. A wavelength of incident ray is selected such that the incident ray is not absorbed in the p+ layer 64 and the n− layer 66, but absorbed only in the n− layer 65. In this case, the sensitivity is low since the depletion layers 56, 57 can extend only in the n− layer 66 when control voltage $V_B$ is small. On the other hand, the sensitivity is high since the depletion layers 56, 57 can extend from the n− layer 66 to the n− layer 65 when the control voltage $V_B$ is increased to some extent. Therefore, according to the embodiment, it is possible to vary the wavelength sensitivity characteristic by using the control voltage $V_B$.

Embodiment 23

FIGS. 35 (*a*) and (*b*) are plan block diagrams showing (a single input multiple output type and a multiple input single output type, respectively) variable sensitivity photo detectors according to the embodiment 23 of the present invention. In FIGS. 35 (*a*) and (*b*), structures represented by reference numerals 51 to 53 correspond to those in FIG. 24. In both the drawings, the laminated structure of the embodiment 12 is employed.

The variable sensitivity photo detectors shown in the drawings are basically operated as in the case of those in the embodiment 12. In the single input multiple output type of structure shown in FIG. 35 (a), a control voltage $V_B$ is varied by a single line so as to vary sensitivity of many photoreceptive portions at a time. In the multiple input single output type of structure shown in FIG. 35 (b), the sensitivity in the respective photoreceptive portions are varied according to each control voltage $V_{B1}$, $V_{B2}$, . . . , so as to receive light. Thus, the sum of the outputs from the respective photoreceptive portions can be drawn as an output of the entire photo detector. Further, the single input multiple output type of structure and the multiple input single output type of structure may be applied to any one of the photo detectors of the embodiments 12 to 22.

Embodiment 24

FIG. 36 is a plan block diagram showing a variable sensitivity photo detector array according to the embodiment 24 of the present invention. In FIG. 36, reference numeral 70 refers to each variable sensitivity photo detector arranged in the variable sensitivity photo detector array. Reference numeral 71 refers to a power source having output which is variable in a range from negative voltage to positive voltage. For the sake of displaying control voltage vectors ( . . . , $V_{i-1}$, $V_i$, $V_{i+1}$, . . . ), the power source is shown by a single block. Further, reference numeral 72 refers to an output electrode for drawing output current. As in the case of the power source 71, the output electrode is shown by a single block for the sake of displaying output current vectors ( . . . , $I_{j-1}$, $I_j$, $I_{j+1}$, . . . ). The variable sensitivity photo detectors 70 are respectively provided with the laminated structure of the embodiment 12.

In the variable sensitivity photo detector array of the embodiment, the multiple input single output type of structure of the embodiment 23 shown in FIG. 35 (b) is incorporated in the power source 71 and the variable sensitivity photo detector arrays in the vertical direction ( . . . , $S_{j-1}$, $S_j$, $S_{j+1}$, . . . ). That is, the sum of output current from each variable sensitivity photo detector array in the vertical direction is provided as follows: . . . , $I_{j-1}$, $I_j$, $I_{j+1}$, . . . . Further, the single input multiple output type of structure shown in FIG. 35 (a) is incorporated in each wiring (a line) in the lateral direction, and the variable sensitivity photo detector array in the lateral direction, which is connected to the wiring (and receives output from $S_j$ or the like).

In the variable sensitivity photo detector arrays, a common voltage is applied to the variable sensitivity photo detectors which are aligned in the lateral direction. Consequently, in case a predetermined optical input pattern is provided, a resulting of output current values from the respective variable sensitivity photo detectors 70 (i.e., the sum in the vertical direction) is drawn of each vertical line in the form of current output vectors ( . . . $I_{j-1}$, $I_j$, $I_{j+1}$, . . . ) in parallel according to a set of voltage applied to each line in the lateral direction, i.e., control voltage vectors ( . . . , $V_{i-1}$, $V_i$, $V_{i+1}$, . . . ). Therefore, according to the embodiment, it is possible to obtain the variable sensitivity photo detector which can provide negative sensitivity or negative weight, and is suitable for application to an optical image processing system and an optical computing. Further, the photo detector array of the embodiment may be applied to any one of the photo detectors in the embodiments 12 to 22.

Embodiment 25

Figure 37:
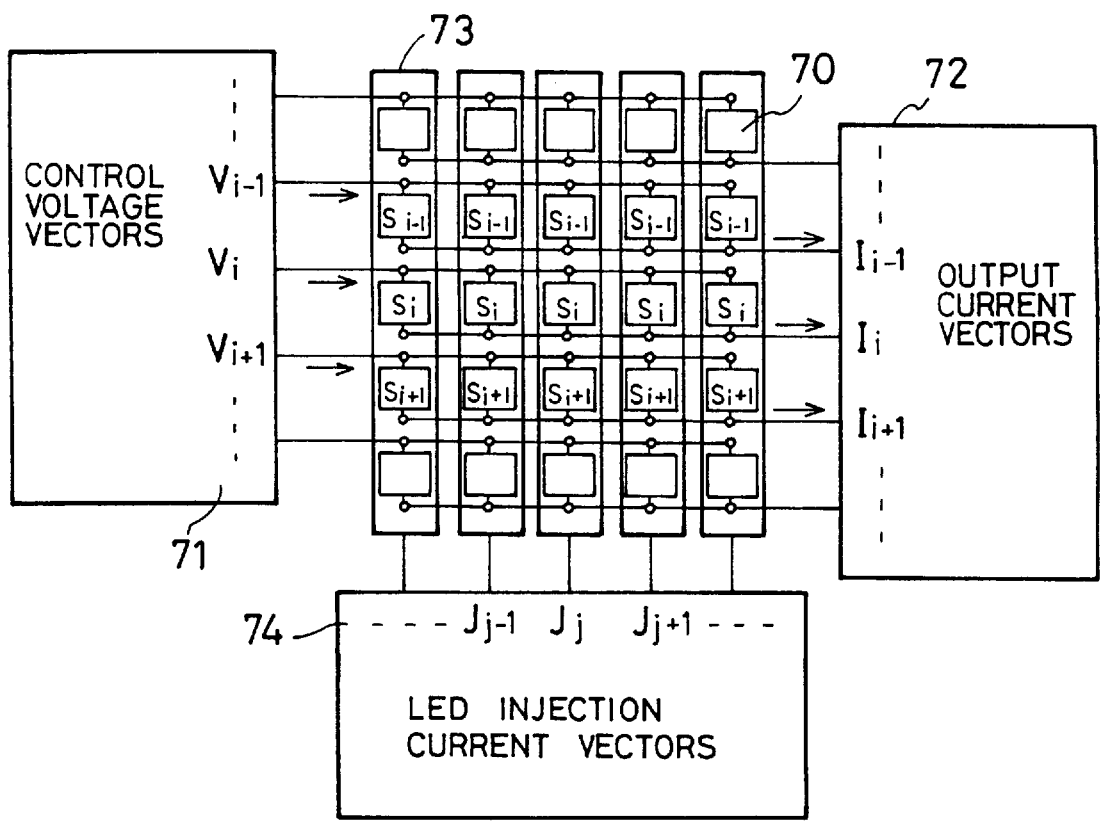
FIG. 37 is a plane block diagram showing the variable sensitivity photo detector array applied to the apparatus of the present invention.

FIG. 37 is a plan block diagram showing a variable sensitivity photo detector according to the embodiment 25 of the present invention. Structures represented by reference numerals 70 to 72 correspond to those in FIG. 36. Reference numeral 73 refers to LED (Light Emitting Diode) arranged in an array configuration in which the respective photo detectors in the lateral direction are aligned with the upper adjacent photo detector. Reference numeral 74 refers to an electrode for injecting current (LED injection current vectors ( . . . , $J_{j-1}$, $J_j$, $J_{j+1}$, . . . )) into the LED 73. For the sake of displaying the vectors, the electrode is shown by a single block.

The variable sensitivity photo detector array of the embodiment is basically operated as in the case of the variable sensitivity photo detector array of the embodiment 24. That is, the respective photo detectors 70 receive light having an intensity pattern according to the LED injection current vector from the respective LEDs 73 while various sensitivities are generated between the respective photo detectors 70 by the control voltage ( . . . , $V_{i-1}$, $V_i$, $V_{i+1}$, . . . ). Subsequently, the control voltage vectors and the LED injection current vectors cause to draw current output ( . . . , $I_{j-1}$, $I_j$, $I_{j+1}$, . . . ). This current output corresponds to resulting of a vector matrix operation with respect to the control voltage vectors serving as column vectors and the LED injection current vectors serving as row vectors. The photo detector array of the embodiment may be applied to any one of the photo detectors in the embodiments 12 to 22.

Embodiment 26

Figure 38:
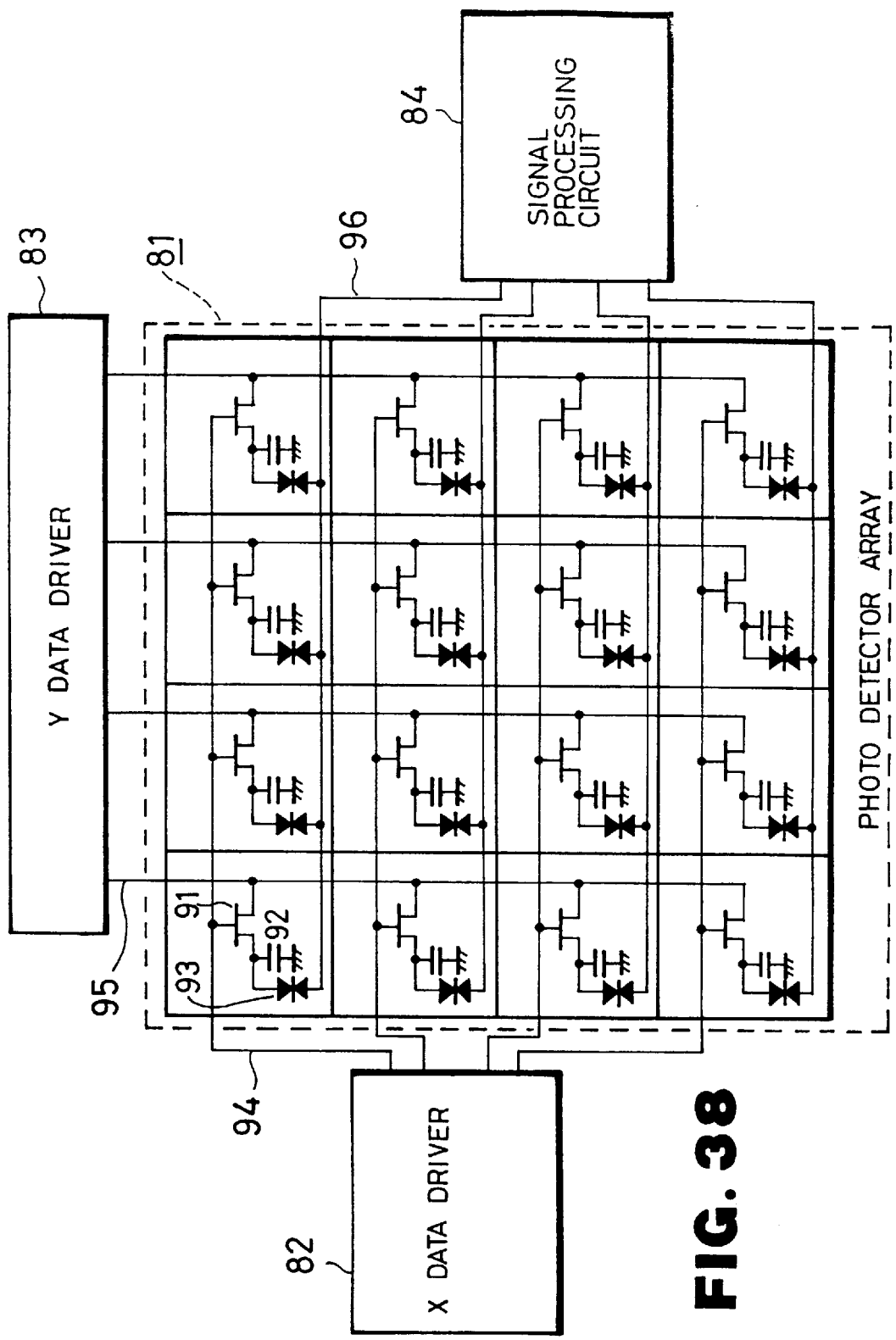
FIG. 38 is a block diagram showing a configuration of an artificial retinal device applied to the apparatus of the present invention.

FIG. 38 is a block diagram showing a configuration of an artificial retinal device according to the embodiment 26 of the present invention. In Fig. 38, reference numeral 81 refers to a photo detector array in which variable sensitivity photo detector units are arranged in an array configuration. When such a number of variable sensitivity photo detectors are arranged in the array, the way to apply voltage is difficult. However, it is possible to achieve application of the voltage in the configuration shown in FIG. 38 by using an active matrix driving method.

In FIG. 38, reference numeral 82 refers to an X data driver for supplying the photo detector array 81 with an X-data signal 94, 83 is a Y data driver for supplying the photo detector array 81 with a Y-data signal 95, and 84 is a signal processing circuit for processing an output signal 96 from the photo detector array 81.

In the respective variable sensitivity photo detector units, reference numeral 91 refers to field effect transistor (FET) integrated on GaAs, 92 is a capacitor, 93 is the variable sensitivity photo detector.

The variable sensitivity photo detector has a photo detecting sensitivity which is varied according to the applied control voltage. The variable sensitivity photo detector includes, for example, a variable sensitivity photo detector having MSM (metal-semiconductor-metal) structure provided on GaAs substrate. In the MSM structure, Schottky contact is provided on GaAs by using Al. In the structure, since an electrode is provided with a symmetrical structure, it is possible to control a flow direction of photoelectric current, that is, a polarity of sensitivity as well as detection of sensitivity by varying a polarity of the applied control voltage.

A description will now be given of the operation. First, the X data driver 82 is operated to supply the first row of the photo detector array 81 with the X-data signal (a gate signal of FET) 94 so as to turn the FET in the first row ON. Concurrently, the Y data driver 83 is operated to apply the Y-data signal 95 to the photo detector array 81. The Y-data signal 95 serve- as a sensitivity control signal with respect to the variable sensitivity photo detector 93. The sensitivity control signal is stored in the capacitor 92.

If the processing as set forth above is repeated by n, i.e., the number of array (n is equal to 4 in FIG. 32), the sensitivity control signal is stored in all the variable sensitivity photo detector units. In this condition, for example, when a light emitting device array (not shown) provided on the photo detector array 81 is emitted so as to draw the output signal 96, it is possible to perform a vector-matrix operation.

Figure 39:
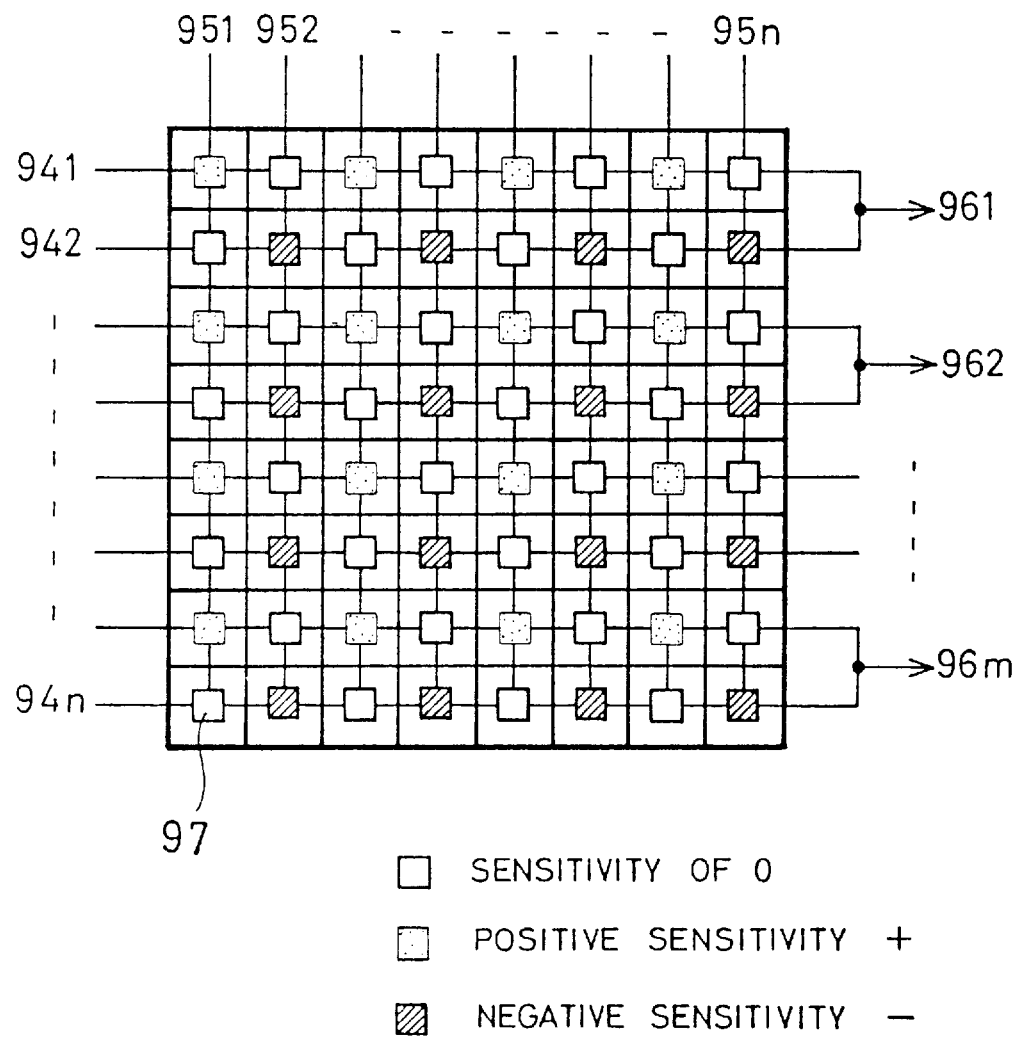
FIG. 39 is an explanatory diagram for illustrating one example of a sensitivity pattern and output processing in a photo detector array.

A description will now be given of a method for using such a photo detector array 81 as an artificial retinal device with reference to FIG. 39. In FIG. 39, reference numeral 97 refers to a variable sensitivity photo detector unit, and reference numerals 941 to 94*n* are X-data signals applied to each row of the photo detector array 81, 951 to 95*n* are Y-data signals applied to each column of the photo detector array 81, respectively. Further, reference numerals 961 to 96*m* mean output signals, respectively.

A description will now be given of the operation. The X data driver 82 is operated to apply the X-data signals 941, 943, . . . to the odd row of the photo detector array 81 at one time. Concurrently, the Y data driver 83 is operated to apply the only Y-data signals 951, 952. In this case, the Y-data signal 951 is a positive polarity signal, and the Y-data signal 952 is 0V (i.e., a signal having sensitivity of 0).

Next, the X data driver 82 is operated to apply the X-data signals 942, 944, . . . to the even row of the photo detector array 81 at one time. Concurrently, the Y-data driver 83 is operated to apply the only Y-data signals 951, 952. In this case, the Y-data signal 951 is equal to 0 volts, and the Y-data signal 952 is a negative polarity signal. The positive polarity signal has the same absolute value as that of the negative polarity signal. In such a way, the sensitivity is set in the first column and the second column of the photo detector array 81 as shown in FIG. 39.

At the time, if an image signal is irradiated to the photo detector array 81 from a television camera or the like, a signal is obtained from each variable sensitivity photo detector 93 in the first column and the second column. As shown in FIG. 39, outputs from the first row and the second row, outputs from the third row and the fourth row, . . . , outputs from the n−1th row and the nth row are respectively summed up, and thereafter the result is output. The respective outputs 961 to 96*m* are stored in the signal processing circuit 84.

An extraction of a moving object is performed as will be described. As an example, a description will be given of the output signal 961 which is the sum of outputs from the first row and the second row. An element at the intersection of the first row and the first column of the photo detector array 81 has a positive sensitivity, and elements at the intersections of the first row and the second column, and the second row and the first column have sensitivity of 0. Further, an element at the intersections of the second row and the second column has a negative sensitivity. Hence, if the image signal in a block provided by the four elements forms a static image, an output signal is equal to zero. If the image signal forms a time-varying image, the output signal is not equal to zero.

Figure 40:
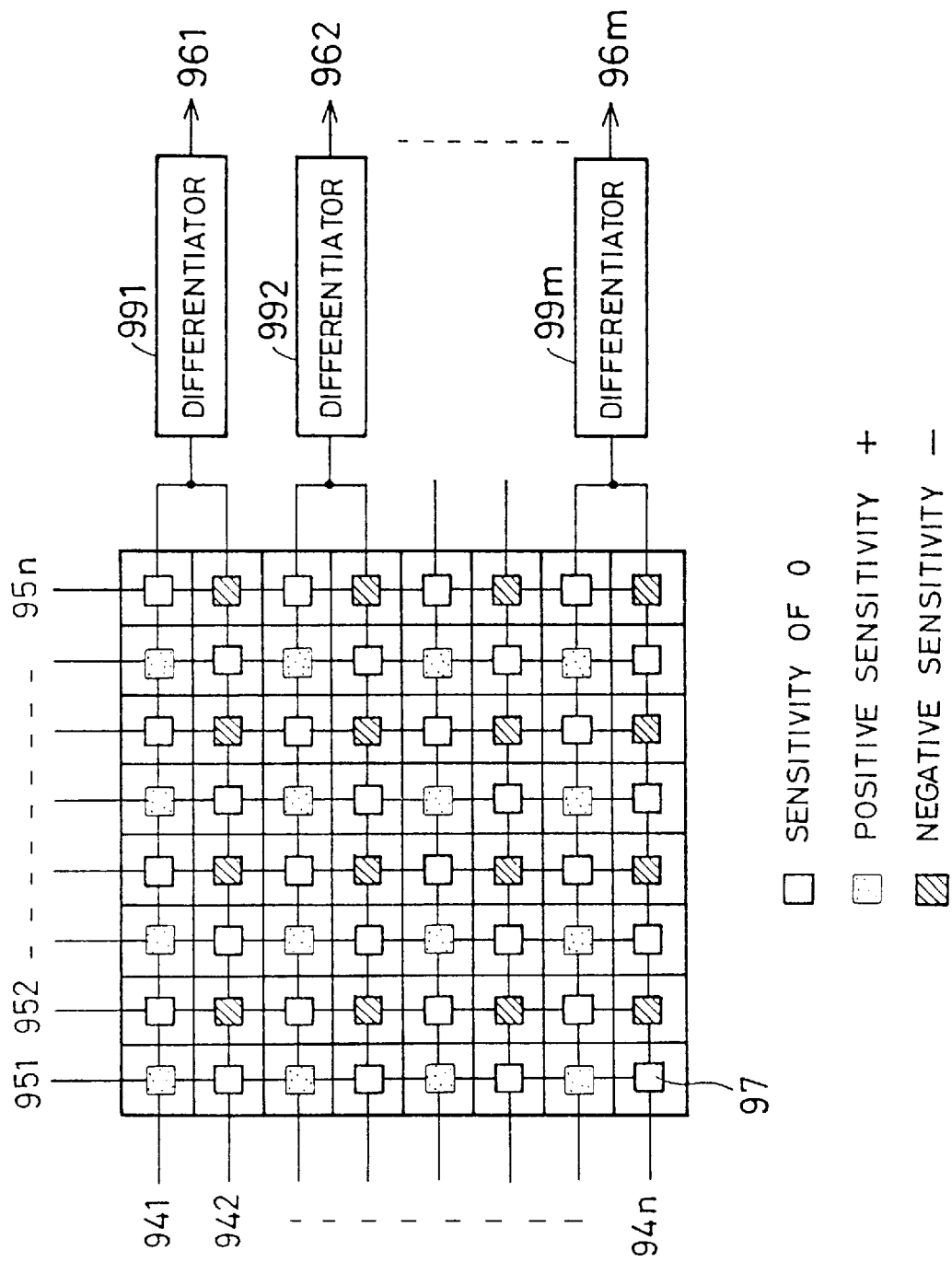
FIG. 40 is an explanatory diagram for illustrating another example of the sensitivity pattern and the output processing in the photo detector array.

The image has a variable density, and the sum is not equal to zero even if the image is the static image when each different quantity of light is irradiated to each photo detector. However, in general, the photo detector is highly integrated, and the adjacent photo detectors have a substantially same quantity of the irradiated light. Thus, it may be regarded that the same quantity of light is irradiated to each photo detector in some block. In case the image pattern is too fine to obtain the same quantity of light irradiated to each photo detector in the block, the output signal may be differentiated as shown in FIG. 40. In FIG. 40, reference numerals 991 to 99*m* refer to differentiators.

Next, the processing as set forth above is performed with respect to the third column and the fourth column. That is, the X data driver 82 is operated to apply the X-data signals 941, 943, . . . , to the odd row of the photo detector array 81 at one time. Concurrently, the Y data driver 83 is operated to apply the only Y-data signals 953 and 954. The Y-data signal 953 is the positive polarity signal, and the Y-data signal 954 is 0V.

Subsequently, the X data driver 82 is operated to apply the X-data signals 942, 944, . . . , to the even row of the photo detector array 81. Concurrently, the Y data driver 83 is operated to apply the only Y-data signals 953 and 954. In this case, the Y-data signal 953 is 0V, and the Y-data signal 954 is the negative polarity signal. The output signals 961 to 96*m* serving as added signals are output in the case of the processing with respect to the first column and the second column, and are stored in the signal processing circuit 84.

The processing as set forth above is performed with respect to the fifth column and the sixth column and subsequent columns to a final column. After the final column is processed, it is possible to obtain the output image including the only moving object by the signal processing circuit 84 sorting each stored signal sequentially.

Thus, it is possible to obtain a plurality of image illustrating a moving condition of the moving object by repeating the above processing. In the embodiment, the Y-data signal having the positive polarity is applied to the odd column, and the Y-data signal having the negative polarity is applied to the even column. However, the Y-data signal may have the reverse polarity with respect to the odd and even columns, respectively.

Embodiment 27

Figure 41:
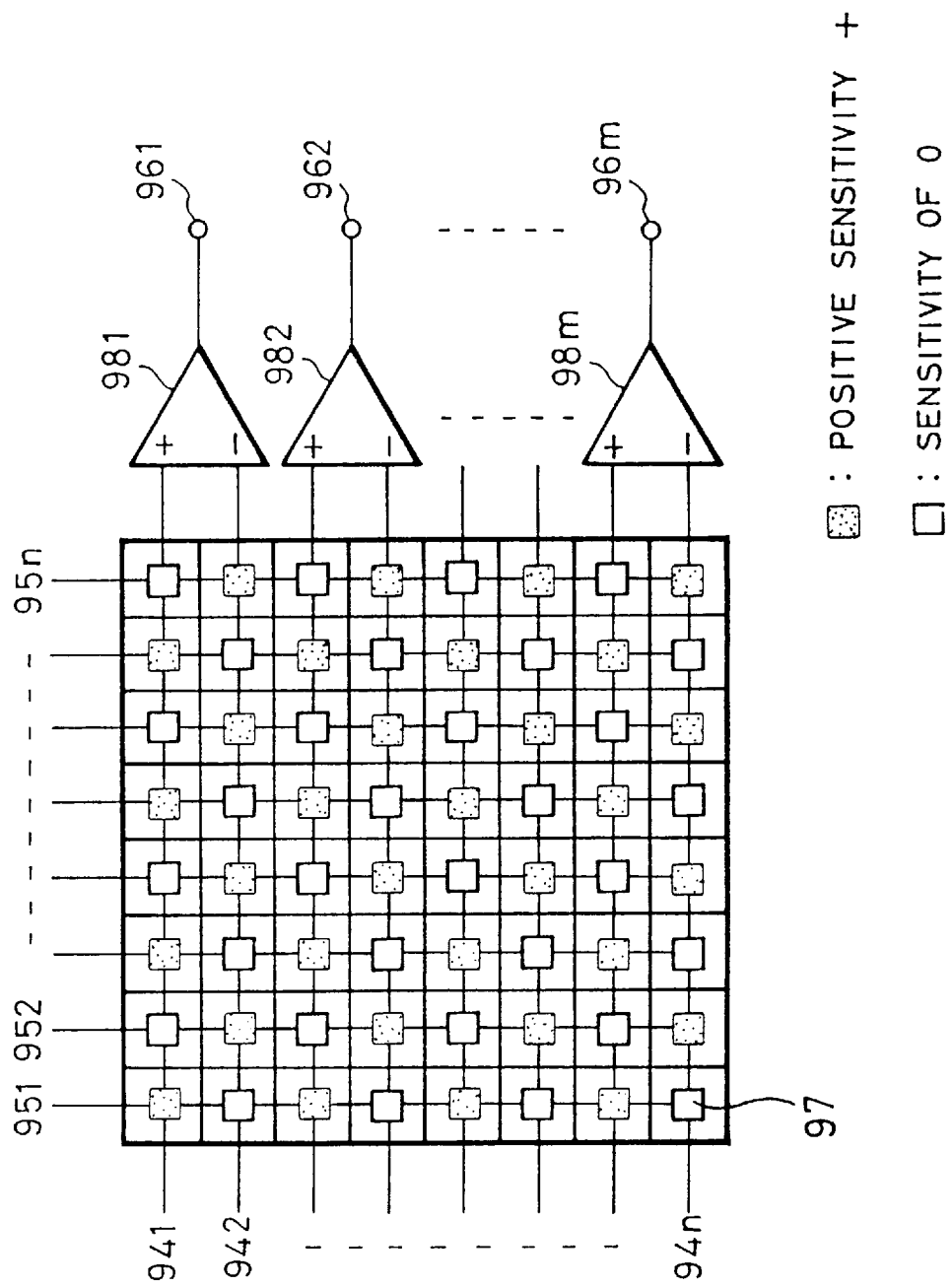
FIG. 41 is an explanatory diagram for illustrating the sensitivity pattern and the output processing of the photo detector array in the artificial retinal device applied to the apparatus of the present invention.

FIG. 41 is a block diagram showing a configuration of a photo detector array in an artificial retinal device according to the second embodiment of the present invention. The photo detector array is provided with an entire configuration identical with that shown in FIG. 38. In this case, the X data driver 82 is operated as in the case of the first embodiment. A Y data driver 83 has the same operation timing as in the case of the first embodiment, but is not operated to apply the negative polarity signal. That is, in the embodiment, the Y data driver 83 is operated to apply the positive polarity signal to the photo detector array in a timing corresponding to a timing to apply the negative polarity signal in the first embodiment. Thus, in this case, it is possible to set sensitivity as shown in FIG. 41.

Though the sum of output from two rows is calculated in the first embodiment, differential amplifiers 981 to 98m serve to calculate a difference between outputs from the respective rows of the embodiment. The signal processing circuit 84 is operated to perform the processing as in the first embodiment. According to the configuration as set forth above, it is possible to further facilitate drive of the photo detectors by the X data driver 82 and the Y data driver 83.

When the image pattern is fine, or the moving direction of the object must be recognized, the differential amplifiers 981 to 98*m* may be provided with a differentiating function.

Embodiment 28

Figure 5:
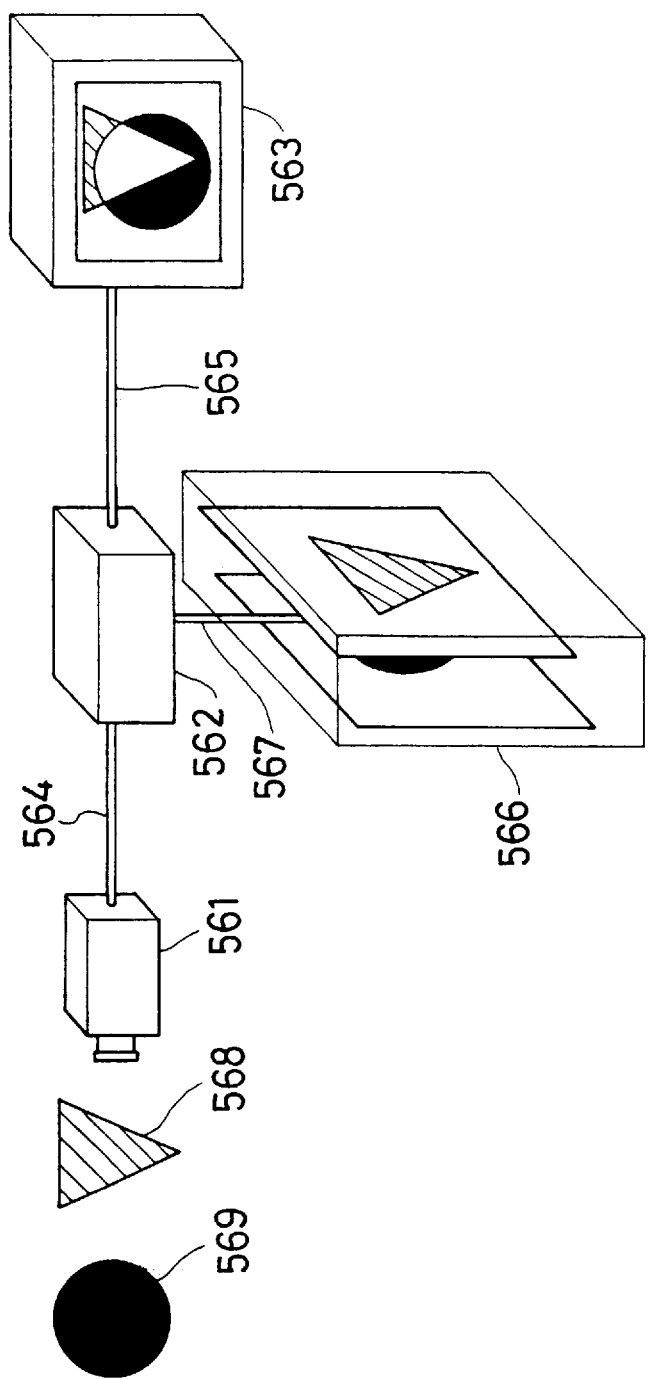
FIG. 5 is a block diagram showing a configuration of a conventional visual information processor.
Figure 42:
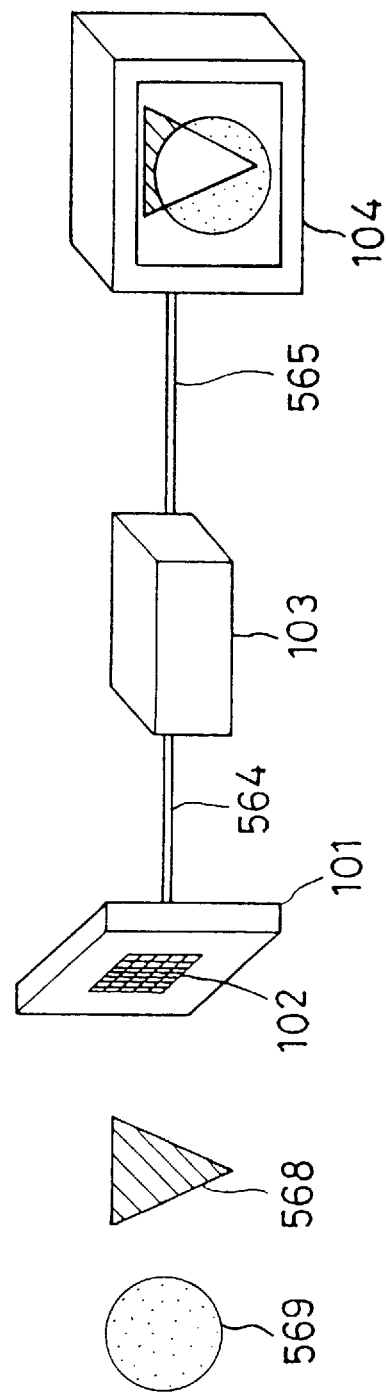
FIG. 42 is a block diagram showing a configuration of the apparatus of the present invention.

FIG. 42 is a block diagram showing a visual information processor according to the embodiment 28 of the present invention. In FIG. 42, reference numeral 101 refers to a photoreceptive device (a photoreceptive portion) mounted on a package, 104 is a photoreceptive surface of the photoreceptive device, and 103 is a preparing portion (a photoreceptive portion control device) into which the processed image is input from the photoreceptive device 101. Other structures are identical with those represented by the same reference numerals in FIG. 5.

Figure 43A:
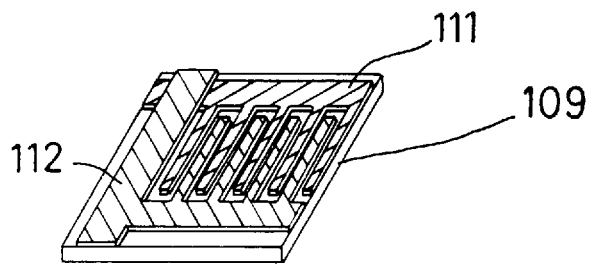
FIG. 43A is a perspective view showing a structure of a photoreceptive device and FIG. 43B is an exploded view of the circled portion of FIG. 43A.
Figure 43B:
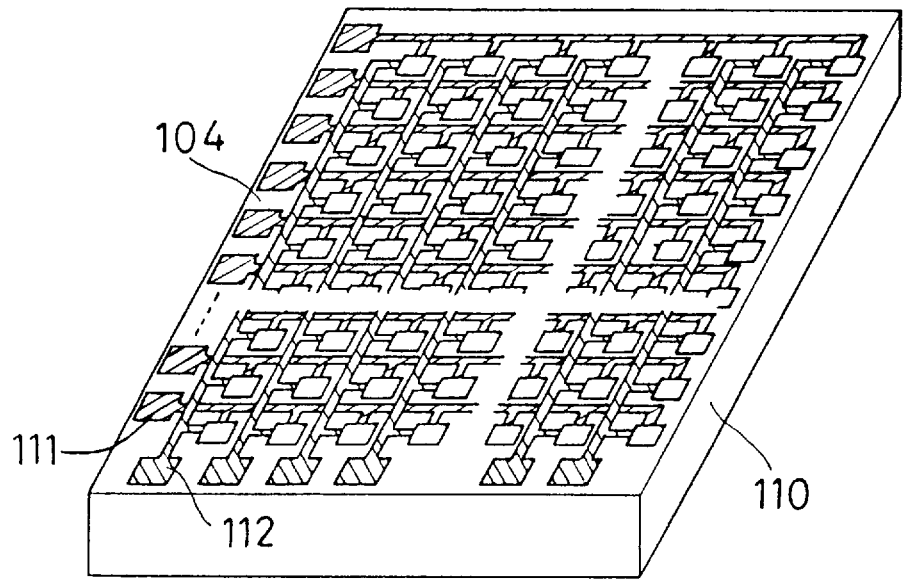

FIG. 43 is a perspective view showing a structure of the photoreceptive device 101. In FIG. 43, reference numeral 109 refers to a photo detector including a pair of Schottky electrodes to have a storage capacity of one pixel, 110 is GaAs substrate (a semiconductor), 111 is a voltage applied line to the photo detector 109, and 112 is a photoelectric current output line from the photo detector 109. A trap carrier is generated due to an interface trap at Schottky interface of Schottky junction.

Figure 44:
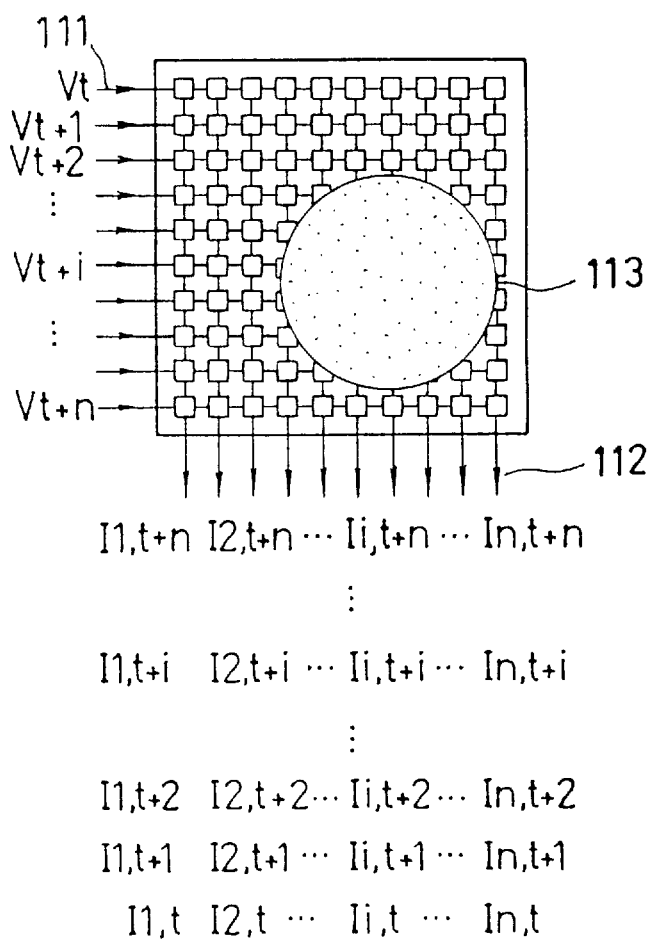
FIG. 44 is an explanatory diagram for illustrating photoelectric current output mode of the photoreceptive device.
Figure 45A:
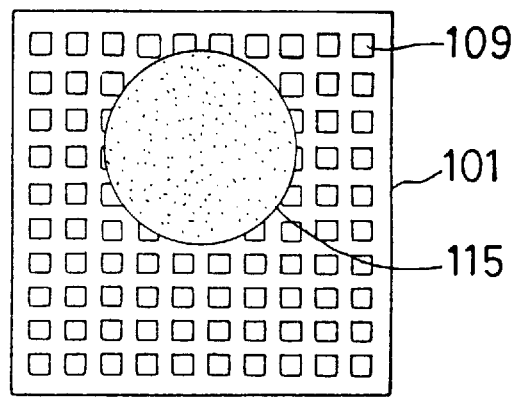
FIGS. 45A,B,C and D are explanatory diagrams for illustrating operations when obtaining AND image of two images.
Figure 45B:
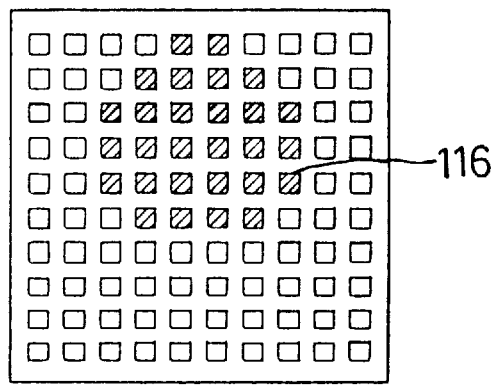
Figure 45C:
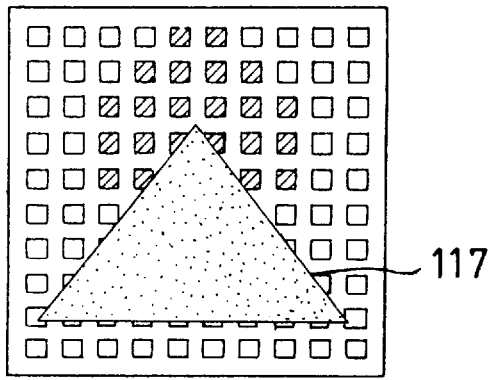
Figure 45D:
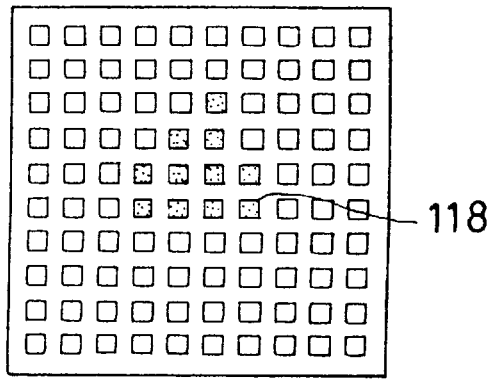
Figure 46A:
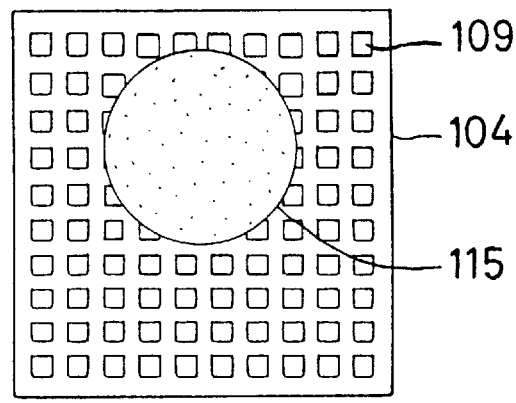
FIGS. 46A,B,C and D are explanatory diagrams for illustrating operations when obtaining OR image of two image patterns.
Figure 46B:
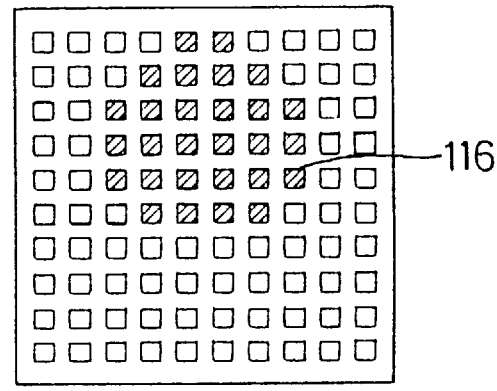
Figure 46C:
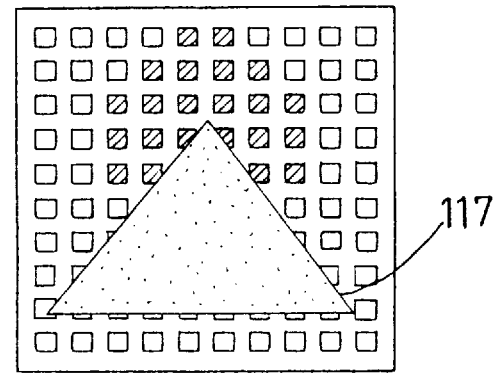
Figure 46D:
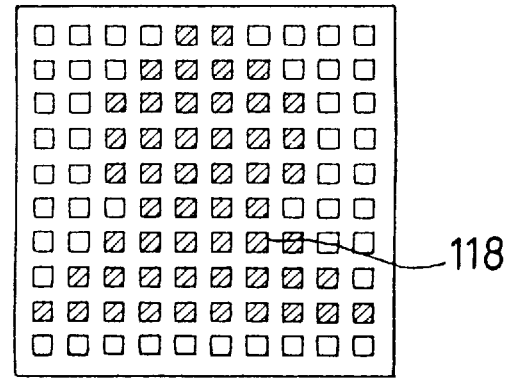
Figure 47A:
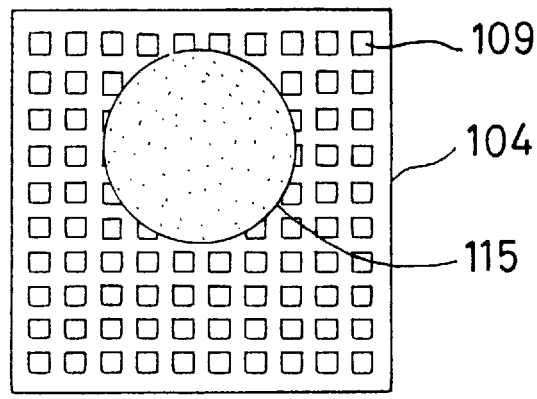
FIGS. 47A,B,C and D are explanatory diagrams for illustrating operations when obtaining EXOR image of two image patterns.
Figure 47B:
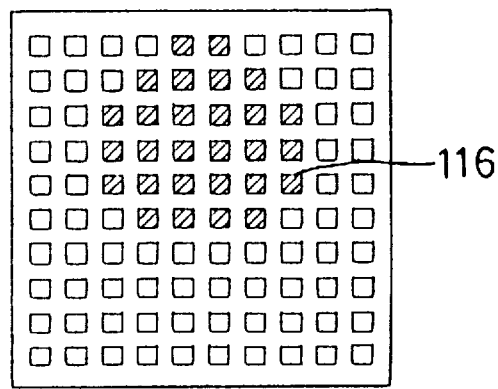
Figure 47C:
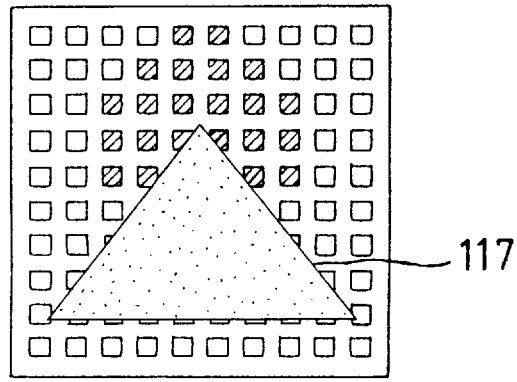
Figure 47D:
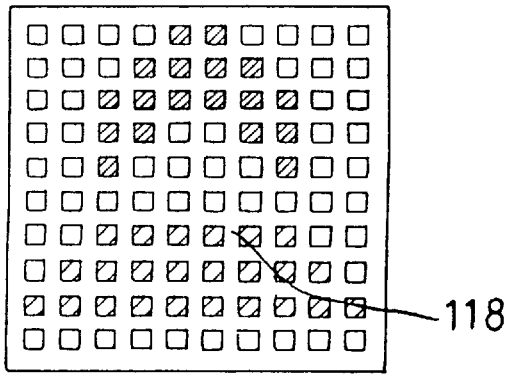

FIG. 44 is an explanatory diagram for illustrating a photoelectric current output mode of the photoreceptive device 101. In FIG. 44, reference 113 refers to en irradiated image pattern or a photosensitivity distribution. Voltage are applied to the voltage applied line 111 in the order of $V_t$, $V_{t+1}, \ldots, V_{t+n}$ so as to obtain the following set of output current (i.e., a set of the sum of the photoelectric current from each photo detector 9 arranged on each line on the photoreceptive device 1) at each time of t+1(i is of 0 to n):

$$I_{1,t+1}, I_{2,t+1}, \ldots, I_{n,t+1}$$

The preparing portion 103 can be operated to grasp a formation of the input image pattern based upon the set of current at each time point.

FIG. 45 is an explanatory diagram for illustrating the operation when obtaining AND image from two images. In FIG. 45, reference numeral 115 refers to the first irradiated image pattern, and 116 is a photosensitivity distribution formed by the image pattern. Reference numeral 117 refers to the second irradiated image pattern, and 118 is a photosensitivity distribution formed finally.

A description will now be given of the operation. In each photo detector 109, an amount of trap carrier in a trap level can be controlled by, for example, the applied voltage applied through the voltage applied line 111 from the preparing portion 103. The resultant internal electric field causes the photo detector 109 to have photoreceptive sensitivity.

Provided that a component in the direction of column is defined as i, and a component in the direction of row is defined as j, the sensitivity of (i, j) photo detector can be expressed as follows:

$$\eta_{ij}(p, V) = \alpha f(p) g(V) \tag{28}$$

where V is the applied voltage applied through the voltage applied line 111 to the photo detector 109 from the preparing portion 103, p is the intensity of light irradiated to the photo detector 109, j and g are monotone increasing functions passing origin, and α is a positive constant. Further, i is in the range of 1 to N, and j is in the range of 1 to M. The photosensitivity can be held after cutting off the applied voltage and turning off the incident ray.

For the sake of simplicity, the expression (28) is approximated as follows:

$$\eta_{ij}(p, V) = \beta p V \tag{29}$$

where β is a constant.

Provided that the intensity of light generated by the first image pattern is defined as p1 and the applied voltage at the time is defined as V1, the sensitivity of the respective photo detectors 109 generated by the first image pattern 113 is expressed as follows:

$$\eta_{ij}(p1_{ij}, V1) = \beta p1_{ij} V1 \tag{30}$$

Accordingly, when irradiating the second image pattern 117, an amount of light received by the respective photo detectors 109 is expressed as follows:

$$\eta_{ij}(p1_{ij}, V1) p2_{ij} = \beta p1_{ij} V1 p2_{ij} \tag{31}$$

Therefore, it is assumed that the voltage of $V_{t+1}$ is applied to the voltage applied line 111 as shown in FIG. 44 while irradiating the second image pattern 117 in a condition where the photosensitivity of each photo detector 109 is expressed as shown in the expression (29) (this condition corresponding to FIG. 45 (b)). In this case, the photoelectric current output proportional to $p1_{iji}$ by $p2_{iji}$ is output from each photo detector 109 to the photoelectric current output line 112.

That is, the preparing portion 103 can serve to obtain an AND image of two image patterns 115 and 117 corresponding to the final photosensitivity distribution 118 shown in FIG. 45 (d) based upon the current set output from the photoelectric current output line 112 at each time point. Further, the preparing portion 103 can serve to transfer the AND image to a computer 104 so as to display the AND image on a display portion of the computer 104.

Embodiment 29

FIG. 46 is an explanatory diagram for illustrating the operation to obtain OR image of two image patterns 115 and 117. In this case, a voltage V1 is applied to each photo detector 109 when irradiating the second image pattern 117 as well as when irradiating the first image pattern 115.

A photoreceptive sensitivity distribution generated in each photo detector 109 by the irradiation of the first image pattern 115 is expressed as follows:

$$\eta_{iji}(p1_{iji}, V1) = \beta p1_{iji} V1 \tag{32}$$

A photoreceptive sensitivity distribution generated by the second image pattern 117 is expressed as follows:

$$\eta_{ij}(p2_{ij}, V1) = \beta p2_{ij} V1 \tag{33}$$

Accordingly, the photoreceptive sensitivity distribution obtained after irradiating the second image pattern 117 (corresponding to FIG. 46 (d)) is expressed as follows:

$$\eta_{iji}(p1_{iji}, V1) + \eta_{ij}(p2_{ij}, V1) = \beta(p1_{ij} + p2_{ij}) V1 \tag{34}$$

That is, the photoreceptive sensitivity distribution has a value proportional to OR of the two image patterns. Hence, it is possible to obtain a photoelectric current output proportional to OR of the two image patterns from each photo detector 109 by applying the voltage of $V_{t+1}$ to the voltage applied line 111 as shown in FIG. 44 while irradiating a uniform light to the photoreceptive device 101. The preparing portion 103 can be operated to recognize OR image based upon the photoelectric current output.

Embodiment 30

FIG. 47 is an explanatory diagram for illustrating the operation to obtain an exclusive OR (EXOR) image of two image patterns 115 and 117. In this case, a negative voltage of =V2 is applied to a voltage applied line 111 when irradiating the second image pattern 117.

A photoreceptive sensitivity distribution generated in each photo detector 109 by the irradiation of the first image pattern 115 is expressed as follows:

$$\eta_{iji}(p1_{ij}, V1) = \beta p1_{ij} V1 \tag{35}$$

A photoreceptive sensitivity distribution generated by the second image pattern 117 is expressed as follows:

$$\eta_{ij}(p2_{ij},-V1)=-\beta p2_{ij}V1 \quad (36)$$

Accordingly, the photoreceptive sensitivity distribution obtained after irradiating the second image pattern 117 (corresponding to FIG. 47 (d)) is expressed as follows:

$$\eta_{ij}(p1_{ij},V1)+\eta_{ij}(p2_{ij},-V1)=\beta(p1_{ij}-p2_{ij})V1 \quad (37)$$

That is, the photoreceptive sensitivity distribution has a value proportional to EXOR of the two image patterns. Hence, it is possible to obtain a photoelectric current output proportional to EXOR of the two image patterns from each photo detector 109 by applying the voltage of $V_{t+1}$ to the voltage applied line 111 as shown in FIG. 44 while irradiating a uniform light to the photoreceptive device 101. The preparing portion 103 can be operated to recognize EXOR image based upon the photoelectric current output.

Embodiment 31

Figure 48A:
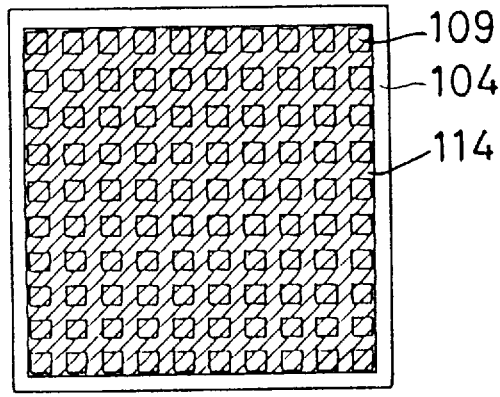
FIGS. 48A,B and C are explanatory diagrams for illustrating operations when obtaining NOT image of an image pattern.
Figure 48B:
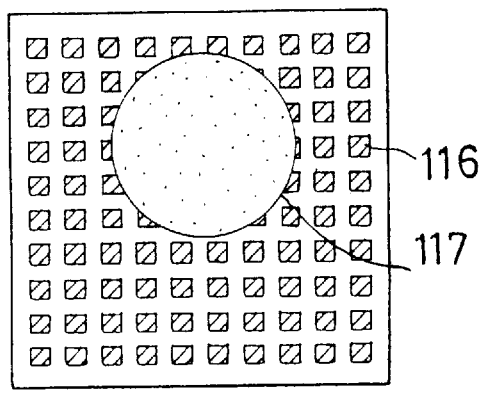
Figure 48C:
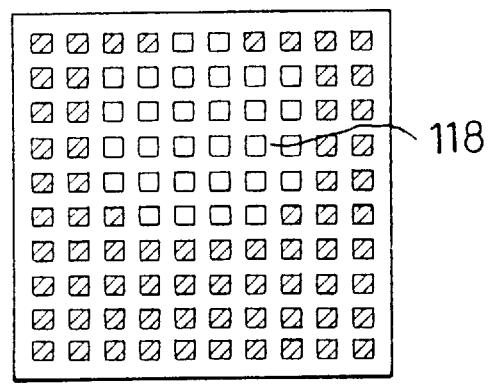
Figure 49E:
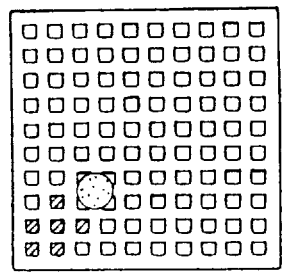
FIGS. 49A,B,C,D,E,F,G,H and I are explanatory diagrams for illustrating operations when detecting a time-varying image pattern.
Figure 49F:
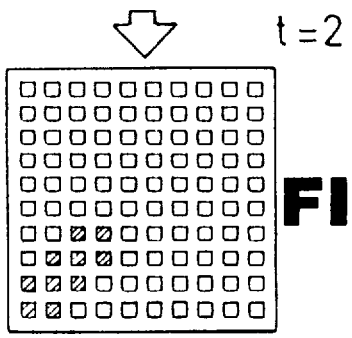
Figure 49G:
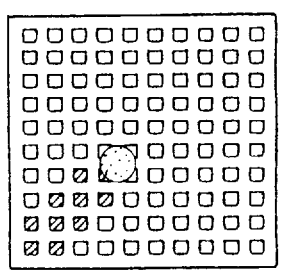
Figure 49H:
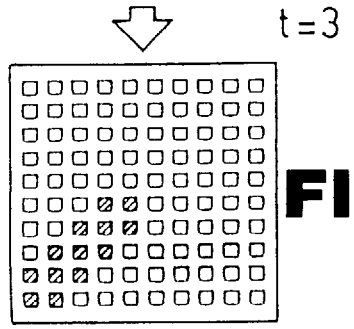
Figure 49I:
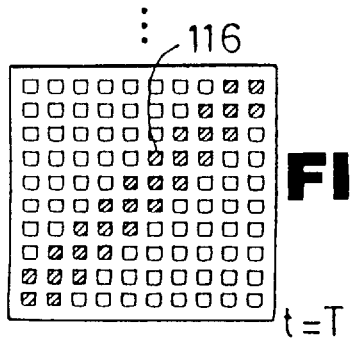
Figure 50A:
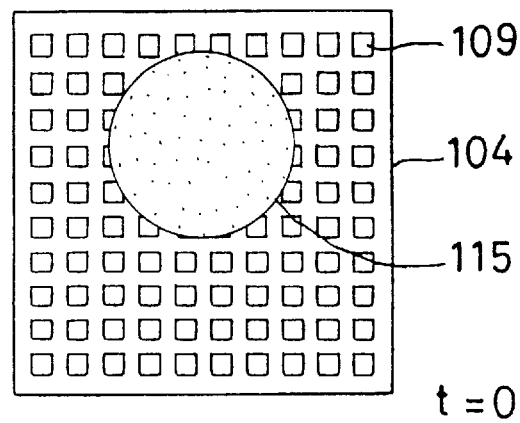
FIGS. 50A,B and D are explanatory diagrams for illustrating operations when detecting movement of the image pattern.
Figure 50B:
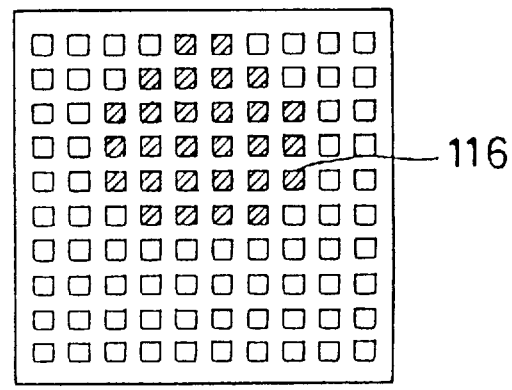
Figure 50C:
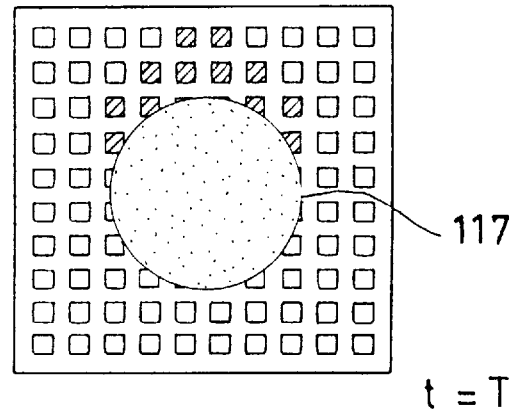
Figure 50D:
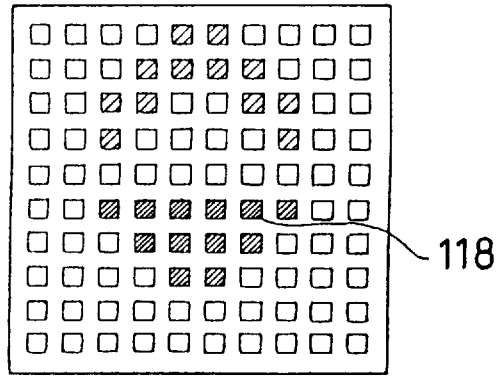

FIG. 48 is an explanatory diagram for illustrating the operation to obtain a reverse (NOT) image of two image patterns 115 and 117. In this case, uniform light 114 is irradiated as the first image pattern. A negative voltage of −V1 is applied to a voltage applied line 111 when irradiating the second image pattern 117.

A photoreceptive sensitivity distribution generated in each photo detector 109 by the irradiation of the uniform light 114 is expressed as follows:

$$\eta_{ij}(p,V1)=\beta pV1 \quad (38)$$

A photoreceptive sensitivity distribution generated by the second image pattern 117 is expressed as follows:

$$\eta_{ij}(p2_{ij},-V1)=-\beta p2_{ij}V1 \quad (39)$$

Accordingly, the photoreceptive sensitivity distribution obtained after irradiating the second image pattern 117 (corresponding to FIG. 48 (d)) is expressed as follows:

$$\eta_{ij}(p,V1)-\eta_{ij}(p2_{ij},V1)=\beta(p-p2_{ij})\,V1=\beta(1-p2_{ij}/p)V1 \quad (40)$$

That is, the photoreceptive sensitivity distribution has a value proportional to NOT of the second image pattern 117. Hence, it is possible to obtain a photoelectric current output proportional to NOT of the second image pattern 117 from each photo detector 109 by applying the voltage of $V_{t+1}$ to the voltage applied line 111 as shown in FIG. 44 while irradiating the uniform light to the photoreceptive device 101. The preparing portion 103 can be operated to recognize NOT image based upon the photoelectric current output.

Embodiment 32

FIG. 49 is an explanatory diagram for illustrating the operation to detect a moving image pattern 115. That is, as the image pattern 115 is moved, a photoreceptive sensitivity distribution 116 is varied according to locus of movement of the image pattern 115.

When the image pattern, that is, an irradiated pattern on a photoreceptive surface is moved with voltage V applied to each photo detector 109, the photoreceptive sensitivity distribution can be expressed in the following, provided that intensity of light is defined as $P_{i(t)j(t)}$:

$$\int_o^T \eta(p_{i(t)j(t)},V)dt=\beta V\int_o^T p_{i(t)j(t)}dt \quad (41)$$

where an irradiation is started at a time of t =0, and the irradiation is ended at a time of t =T.

Therefore, it is possible to obtain a photoelectric current output according to the locus of movement of the image pattern 115 from each photo detector 109 by applying the voltage of $V_{t+1}$ to the voltage applied line 111 as shown in FIG. 44 while irradiating uniform light to a photoreceptive device 101 after the time t is equal to T. Thus, a preparing portion 103 can be operated to recognize the locus of movement based upon the photoelectric current output.

Embodiment 33

FIG. 50 is an explanatory diagram for illustrating the operation to detect a movement of an image pattern 115. In this case, the first image pattern 115 is identical with a second image pattern 117. Intensity of light of a moving image pattern is defined as $P_{i(t)j(t)}$. In this case, a negative voltage −V1 is applied to a voltage applied line 111 at a time of t=0 by a preparing portion 103 or the like, and a positive voltage V1 is applied at a time of t = T. Accordingly, a photoreceptive sensitivity distribution 118 at the time of t=T can be expressed as follows:

$$\eta_{ij}(p1_{i(o)j(o)},-V1)+\eta_{ij}(p1_{i(T)j(T)},V1)=\beta(p1_{i(T)j(T)}-p1_{i(o)j(o)})V1 \quad (42)$$

That is, the photoreceptive sensitivity distribution 118 has a value proportional to EXOR of the two image patterns 115 and 117 (which are identical in the embodiment). Hence, a voltage of $V_{t+1}$ is applied to the voltage applied line 111 as shown in FIG. 44 while uniform light is irradiated to a photoreceptive device 101. Consequently, it is possible to obtain photoelectric current output proportional to EXOR of the two image patterns, that is, the photoelectric current output corresponding to areas containing the moving image pattern and areas containing no image pattern from each photo detector 109. The preparing portion 103 can be operated to recognize the movement of the image based upon the photoelectric current output.

Embodiment 34

FIG. 51 is an explanatory diagram for illustrating the operation to detect whether or not an image pattern is entering some area. In this case, a positive voltage V1 is applied to a voltage applied line 111 when irradiating the second image pattern as well as when irradiating the first image pattern 115.

Figure 51A:
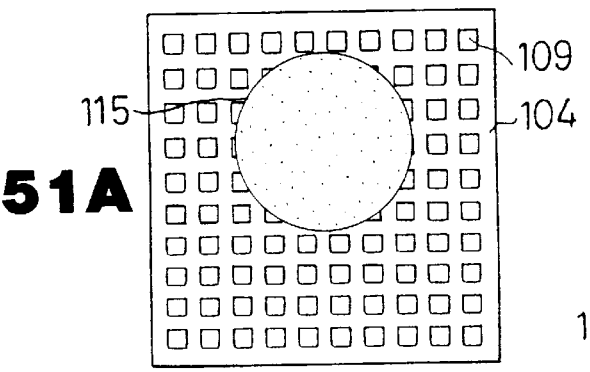
FIGS. 51A,B,C,D,E and F are explanatory diagrams for illustrating operations when detecting whether or not the image pattern moves into a certain area.
Figure 51E:
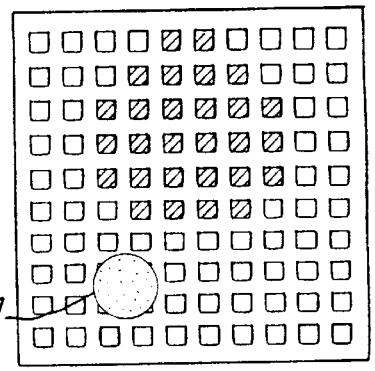
Figure 51B:
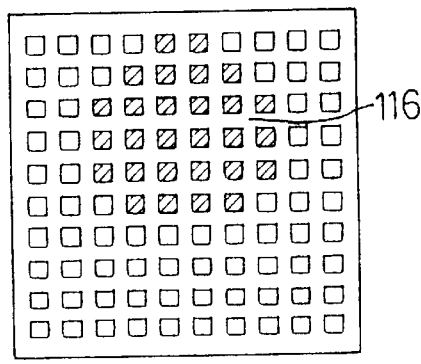
Figure 51F:
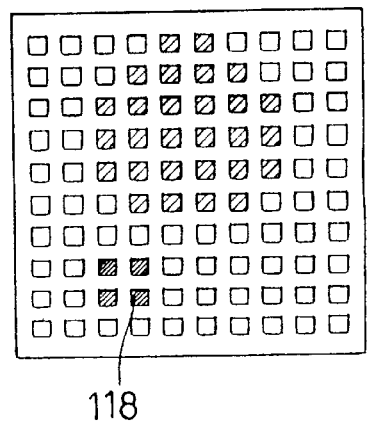
Figure 51C:
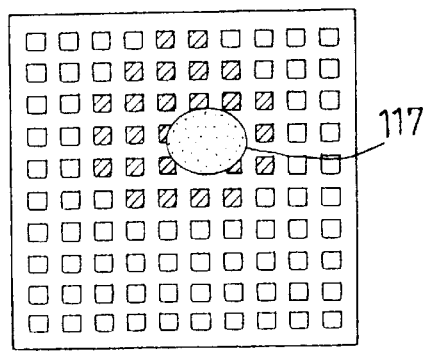
Figure 51D:
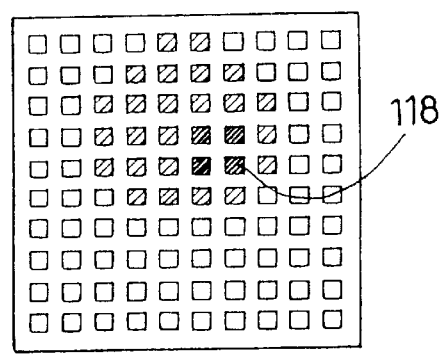

The second image pattern is irradiated to an area where a photoreceptive sensitivity distribution 116 is significant as shown in FIG. 51(c), in a condition where the photoreceptive sensitivity distribution 116 is formed based upon the first image pattern as shown in FIG. 51(b). Accordingly, the irradiated portion has a high photoreceptive sensitivity distribution 118. On the other hand, if the second image pattern is irradiated to an area where the photoreceptive sensitivity distribution 116 is not significant as shown in FIG. 51(e), there is no variation In the photoreceptive sensitivity distribution 116 formed based upon the first image pattern 115.

Hence, the voltage of $V_{t+1}$ is applied to the voltage applied line 111 as shown in FIG. 44 while irradiating uniform light to a photoreceptive device 101. Consequently, it is possible to obtain photoelectric current output according to a photoreceptive sensitivity distribution shown in FIG. 51(d) or FIG. 51(f) from each photo detector 109. A preparing portion 103 is operated to detect whether or not the photoreceptive sensitivity distribution 116 formed by the first image pattern has a high sensitivity portion based upon the photoelectric current output. Accordingly, the preparing portion 103 can be operated to detect whether or not some image pattern (which is the second image pattern 117 in the embodiment) is entering some area (which is an area having the irradiated first image pattern in the embodiment).

Embodiment 35

Figure 52A:
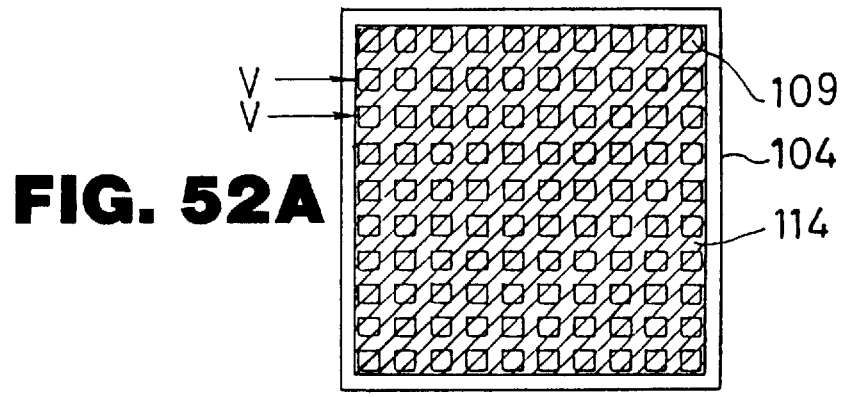
FIGS. 52A,B,C and D are explanatory diagrams for illustrating operations when detecting whether or not the image pattern exists in a certain area.
Figure 52B:
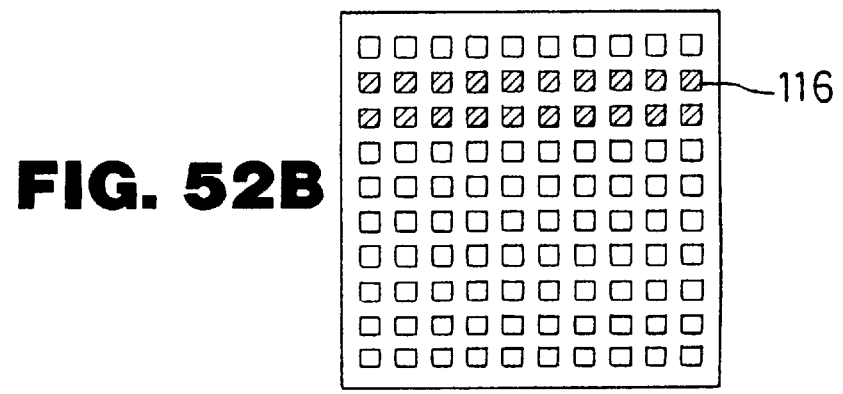

Though the same voltage is applied to all of photo detectors 109 in the above-mentioned embodiments, the voltage may be applied to one specific line or a plurality of specific lines of voltage applied lines 111 as shown in FIG. 52(a). When uniform light 114 is irradiated in this condition, there is generated a photoreceptive sensitivity distribution 116 having sensitivity of the voltage applied line (or lines) as shown in FIG. 52(b).

Figure 52C:
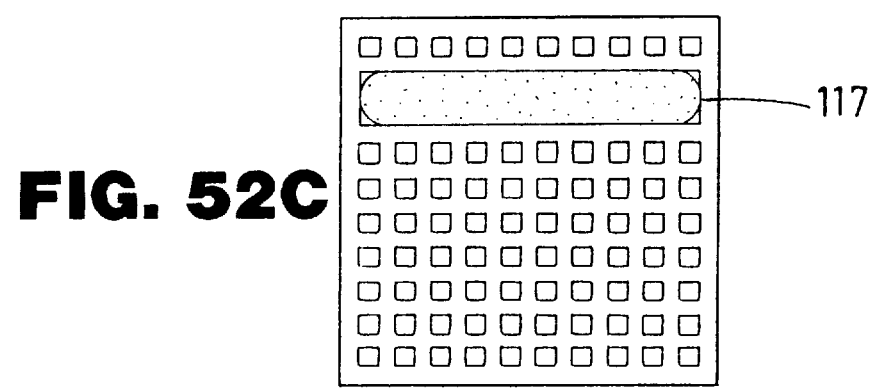
Figure 52D:
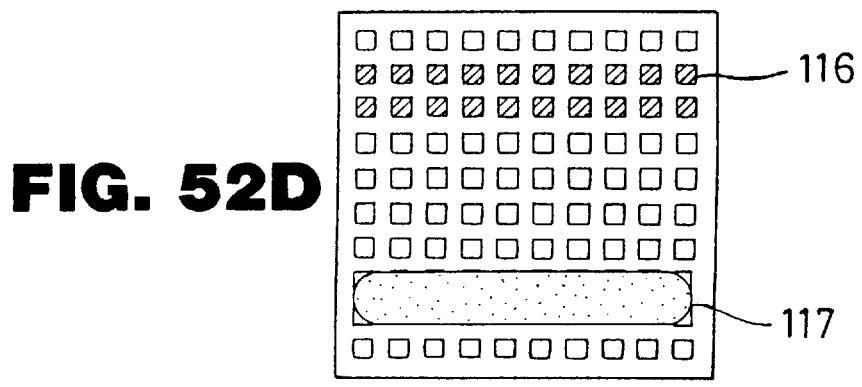

Subsequently, when an image pattern 117 is irradiated with no voltage applied, photoelectric current output is input into the preparing portion 103. As shown in FIG. 52(d), the photoelectric current output has a small value when irradiating the image pattern 117 to a portion having no photosensitivity. However, large photoelectric current output can be output when irradiating the image pattern 117 to a portion having the photosensitivity as shown in FIG. 52(c). Thus, the preparing portion 103 can be operated to detect whether or not the image pattern 117 exists in an area having a significant photoreceptive sensitivity distribution 116 by detecting a large or small photoelectric current output.

Spatially modulated light may be substituted for the uniform light 114 as first irradiated light, and may be combined with a predetermined voltage application pattern to form a two-dimensional photoreceptive sensitivity distribution. For example, in case an image pattern is irradiated to a Walsh pattern formed as the photoreceptive sensitivity distribution, it is possible to obtain a Walsh coefficient of the image pattern.

Embodiment 36

Figure 53A:
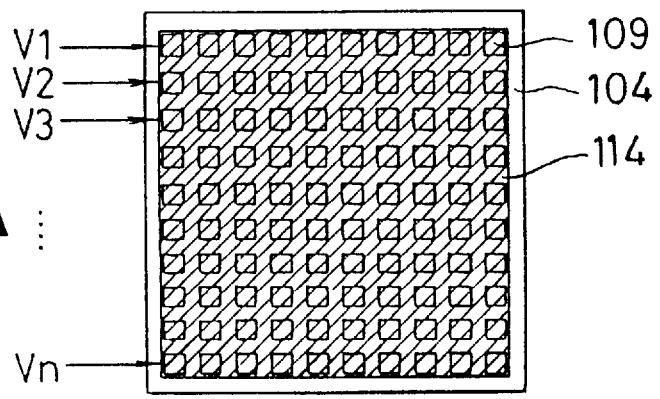
FIGS. 53A,B and C are explanatory diagrams for illustrating operations when detecting a further accurate position of an image pattern.
Figure 53B:
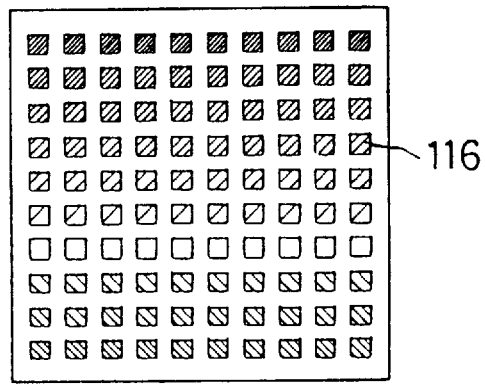
Figure 53C:
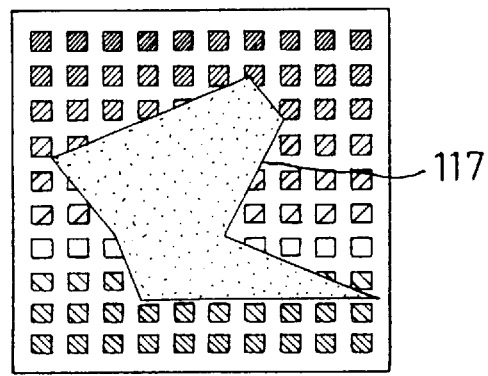
Figure 54A:
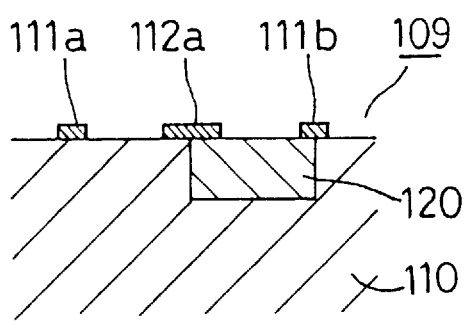
FIGS. 54A,B,C and D are sectional views showing a photo detector in a photoreceptive device having a structure different from that of the photoreceptive device shown in FIG. 43.
Figure 54B:
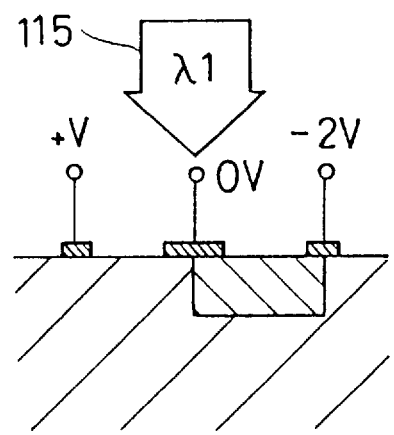
Figure 54C:
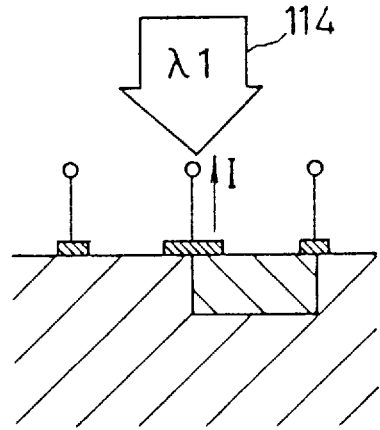
Figure 54D:
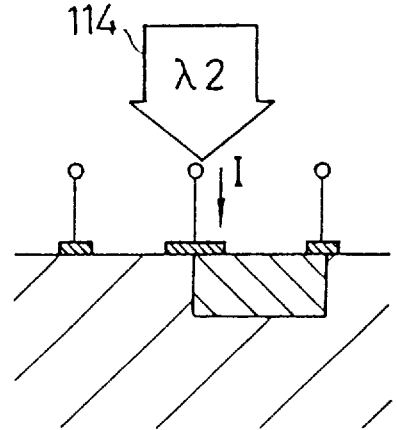

FIG. 53 is an explanatory diagram for illustrating the operation to detect a position of an image pattern further accurately. In this case, the respective voltage V1, V2 to Vn are different from each other and are applied to the respective voltage applied lines 111 when irradiating uniform light 114. Since the value of each photoelectric current output is varied in response to variation of a position of an image pattern 117, a preparing portion 103 can be operated to recognize the position of the image pattern depending upon the value of each output current.

Further, applied voltage patterns are set such that the voltage of the adjacent voltage applied lines 111 have the same value and polarities opposed to each other. In this case, an output other than zero can be obtained from an isolated linear portion while a portion of the image pattern having an area equal to a predetermined value or more has a photoelectric current output of zero. As a result, it is possible to perform a line detection.

Besides, it is possible to obtain Fourier transform image of the image pattern by varying the voltage application pattern to a sine-shaped pattern.

In this case as in the embodiment 35, spatially modulated light may be substituted for uniform light 114 as first irradiated light, and may be combined with a predetermined voltage application pattern to form a two-dimensional photoreceptive sensitivity distribution.

Embodiment 37

FIG. 54 is a sectional view showing a photo detector of a photoreceptive device having a structure different from that shown in FIG. 43. In the embodiment, three Schottky electrodes 111a, 112a, 111b are mounted on GaAs substrate 110. AlGaAs portion 120 is provided in a part of the GaAs substrate 110 as shown in FIG. 54(a). The Schottky electrode 111a on the GaAs and the Schottky electrode 112a on the GaAs and the AlGaAs are provided to form a photo detector #1. The Schottky electrode 112a and the Schottky electrode 111b on the AlGaAs are provided to form a photo detector #2. An entire construction of a visual information processor is identical with that shown in FIG. 42.

The AlGaAs has a wider band gap than that of the GaAs. Therefore, the photo detectors can be set such that the photo detector #1 has a sensitivity of $\eta$ for wavelengths of $\lambda 1$ and $\lambda 2$ ($\lambda 1 < \lambda 2$), and the photo detector #2 has a sensitivity for the wavelength of $\lambda 1$ and has no sensitivity for the wavelength of $\lambda 2$.

A description will now be given of the operation. When an image pattern 115 (having the wavelength $\lambda 1$) is irradiated, voltage V is applied to the photo detector #1, and voltage $-2V$ is applied to the photo detector #2 through the voltage applied lines 111. Accordingly,..the sensitivity of the photo detector #1 is expressed as follows:

$$\eta(p, V) = \beta p V \tag{43}$$

The sensitivity of the photo detector #2 is expressed as follows:

$$\eta(p, -2V) = -2\beta p V \tag{44}$$

Next, voltage of $V_{t+1}$ is applied to the voltage applied line 111 as shown in FIG. 44 while uniform light is irradiated to a photoreceptive device 101. Consequently, photoelectric current output is generated from the photo detector #1 and the photo detector #2 in the respective photo detectors 109. In case the uniform light 114 has the wavelength $\lambda 1$, the sum of output from the photo detectors #1 and #2 is equal to a value proportional to the following expression:

$$\eta(p, V) + \eta(p, -2V) = -\beta p V \tag{45}$$

The sum of the photoelectric current output is output from the Schottky electrode 112a to photoelectric current output lines 112.

In case the uniform light 114 has the wavelength $\lambda 2$, the photoelectric current output of the photo detector #2 becomes zero. Hence, the sum of the output has a value proportional to the following expression:

$$\eta(p, V) + 0 = \beta p V \tag{46}$$

Therefore, it is possible to control a direction of the photoelectric current output according to the wavelength of the uniform light 114 during reading out. Accordingly, the preparing portion 103 can be operated to recognize the image pattern 115 based upon the photoelectric current output, and to perform addition and subtraction between the image pattern 115 and another image pattern by controlling the direction of the photoelectric current output.

The embodiment have been described with respect to the combination of the GaAs and the AlGaAs. However, another combination may be employed as long as materials having each different band gap are combined, and for example, a combination of the GaAs and InGaAs may be employed.

The respective embodiments have been described with respect to a photoreceptive sensitivity controlled by the applied voltage and the light. However, the sensitivity may be controlled by only current injection, and may be also controlled by using the applied voltage and the light as well as the current injection.

Further, the respective embodiments have been described with respect to processing for two images, recognition processing of a position of one image and the like. However, the present invention can be easily applied to processing for three or more images. Besides, the respective embodiments has been described with respect to processing for images such as AND processing. However, the processed image may be recognized, identified and sorted, and thereafter may be used as input data in image analysis.

Figure 55:
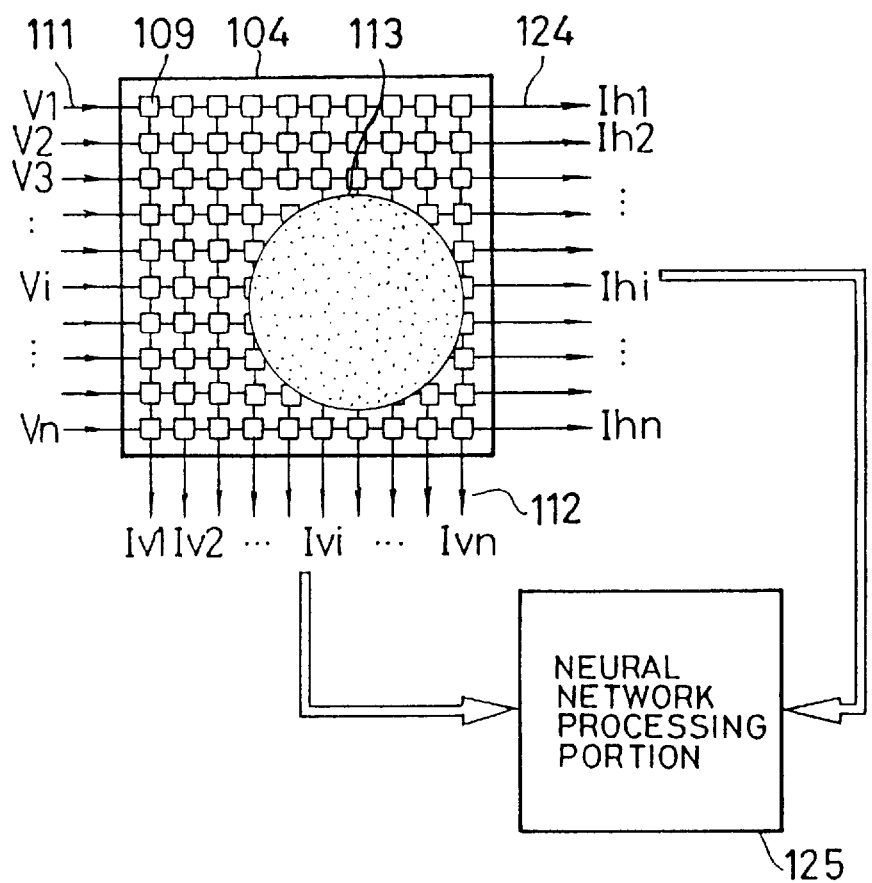
FIG. 55 is an explanatory diagram for illustrating another photoelectric current output mode of a photoreceptive device.

In the respective embodiments, a mode shown in FIG. 9 has been described as a final reading mode of visual information, but a mode shown in FIG. 55 may be also employed. In this construction, vertical photoelectric current outputs $I_{v1}$ to $I_{vn}$ are not only output from the photoelectric current output line 112, but also horizontal photoelectric current outputs $I_{h1}$ to $I_{hn}$ are output from the photoelectric current output line 124. In such a way, it is possible to obtain a vertically projected image of the image pattern and a horizontally projected image. A neural network processing portion 125 is operated to reproduce an original image pattern based upon the respective projected images.

Embodiment 38

Figure 56:
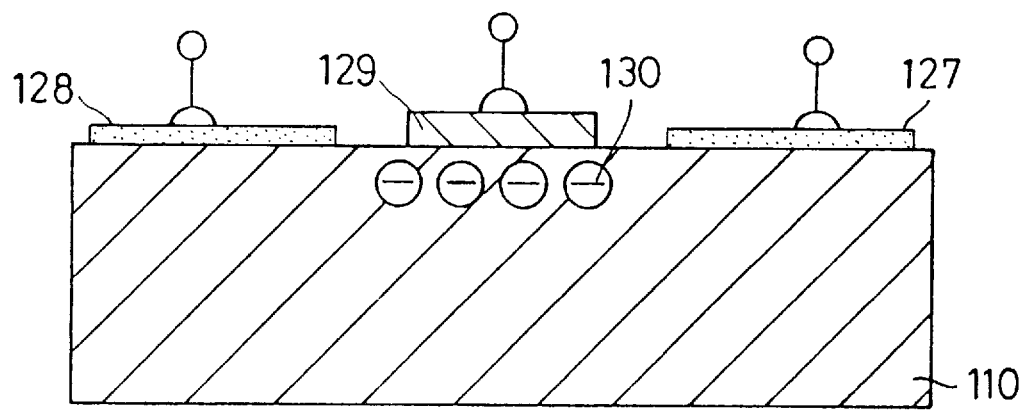
FIG. 56 is a sectional view showing a structure of an information processing device applied to the apparatus of the present invention.

FIG. 56 is a sectional view showing a structure of one embodiment of an information processing device of the present invention. In the device, a source electrode (signal electrode) 127, a drain electrode (signal electrode) 128 and a gate electrode (control electrode) 129 are provided on GaAs substrate 110. The gate electrode 129 is in contact with GaAs substrate 110 through Schottky junction. Schottky interface includes a trap carrier generated by an interface trap. Further, the source electrode 127 is grounded.

A description will now be given of the operation. This device serves as a memory device. During writing information, negative bias voltage is applied to the gate electrode 129 so that current flows between the drain electrode 128 and the source electrode 127. The carriers are partially stored in a trap level 130 under the gate electrode 129. Consequently, a threshold voltage is high (i.e., in "0" state) as seen from the gate electrode 129. If gate voltage is not more than the threshold voltage, drain current can not flow smoothly.

During erasing information, the gate voltage is positively biased such that the trap level 130 is empty. Accordingly, the threshold voltage is low, that is, is set to "1" state. During reading, voltage is applied to the gate electrode 129 so as to select a cell, and sufficient low voltage is applied to the drain electrode 128. As a result, "1" or "0" is read out according to a difference between the threshold voltage. As set forth above, this device can serve as a non-volatile memory.

Embodiment 39

Figure 57:
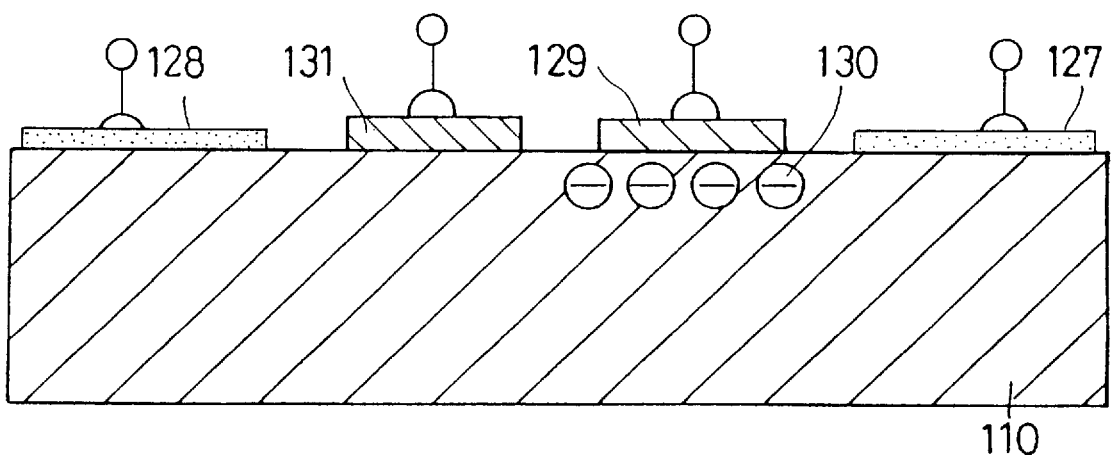
FIG. 57 is a sectional view showing a structure of another information processing device applied to the apparatus of the present invention.

FIG. 57 is a sectional view showing a structure of another embodiment of an information processing device. In this case, the information processing device is provided with a gate electrode (a second control electrode) 131. The gate electrode 131 is made of aluminum which is formed by epitaxial growth as well as a gate electrode 129 which is in contact with GaAs substrate through Schottky contact. Since a trap is hardly formed under the gate electrode 131 which is made of epitaxial aluminum, the gate electrode has no memory function.

The gate electrode 129 is in contact with GaAs substrate through the Schottky contact so as to serve as a memory, and the gate electrode 131 is operated to modulate the carrier. That is, the gate electrode 131 serves as a floating gate for injecting or drawing out a trap carrier in response to an external control. In other words, a spatial distribution of depletion layers is controlled depending upon an amount of stored charge which is controlled by the gate electrode 131. This results in modulated conductance.

The embodiment has been described with respect to a case where using the epitaxial aluminum, however, another metal may be used.

Further, the two embodiments have been described with respect to a case where using GaAs substrate 110, but another semiconductor such as Si or HgCdTe, or a combination thereof may be used. In addition, the respective embodiments have been described with respect to a case where using the trap level generated by the Schottky contact. However, the present invention may employ a trap level inside a semiconductor, a level of an interface between different types of semiconductors, an interface level in MIS (Metal Insulator Semiconductor), a trap level in Poly-Si, or a combination thereof.

Moreover, a silicon three-dimensional integrated device may be substituted for the single GaAs substrate 110. A top layer of the silicon three-dimensional integrated device may be provided with device functions according to the respective embodiments, and a next adjacent layer thereof may be provided with another function. Like an optical neuro-chip, a structure including integrated light emitting devices may be employed. Alternatively, a photo detector may be provided on GaAs, and a device having another function may be provided on Si by epitaxial growth technique of compound semiconductor such as GaAs on Si.

Furthermore, the two embodiments have been described with respect to a case where generating the trap carrier by the current injection. However, the trap carrier may be generated by using the applied voltage and the light, or current as well as the voltage and the light as shown in embodiments 34 to 43.

According to the first aspect of the present invention, the apparatus for sensing and processing images includes the photo detector array in which a plurality of VSPDs are arranged in a matrix forms, a control circuit feeding a row of the array with voltage, and a neural network for processing current from the columns of the array. Thus, there are several effects in that the array output can be processed row by row through the neural network by controlling sensitivity of each row of the array, and it is possible to process visual information at a high speed.

In the apparatus for sensing and processing images according to the second to the sixth aspects of the present invention, the control circuit includes the analog voltage shift register. Thus, there is an effect in that it is possible to periodically circulate an element of a voltage vector (a control vector).

In the apparatus for sensing and processing images according to the seventh aspect of the present invention, the control circuit is provided with the analog voltage shift register having the input terminal and the output terminal which are connected to each other. Hence, there is an effect in that it is possible to obtain any number of processing cycles by using data stored in the control circuit.

In the apparatus for sensing and processing images according to the eighth aspect of the present invention, the control circuit is provided with the analog voltage shift register which can be connected to the function generator. Consequently, there is an effect in that it is possible to perform a one-dimensional or two-dimensional transform.

In the apparatus for sensing and processing images according to the ninth aspect of the present invention, the neural network has a resettable integrator. Thus, there is an effect in that it is possible to process a time dependent visual information.

In the apparatus for sensing and processing images according to the tenth aspect of the present invention, VSPD has the color filter. Thus, there is an effect in that color information can be processed.

In the apparatus for sensing and processing images according to the eleventh to the thirteenth aspects of the present invention, VSPD is provided so as to form a hexagonal configuration. Thus, there is an effect in that it is possible to process visual information as in the case of a biological retina.

In the method for sensing and processing images according to the fourteenth aspect of the present invention, the set of the control voltages from the control circuit represents a first matrix, and the neural network represents a second matrix. Consequently, there are effects as follows: results of multiplication of the image with the first matrix or the second matrix or both of them are output as the image projected to the photo detector array. Further, the first or the second matrix or both of them can be set according to contents of the formation of at least one focus of attention, the horizontal and/or vertical one-dimensional convolution of the kernel, the contents of the one-dimensional or two-dimensional orthogonal and non-orthogonal transformation.

In the method of sensing and processing images according to the fifteenth aspect of the present invention, there is provided the resettable integrator. Thus, there is an effect in that it is possible to perform the image processing of the time dependent image.

The method of sensing and processing images according to the sixteenth aspect of the present invention, includes the step of processing according to a merit function for classification of visual information. Thus, there is an effect in that it is possible to classify and process the visual information at a high speed.

In the method of sensing and processing images according to the seventeenth aspect of the present invention, there are employed the merit function for classifying visual information, and the optimizing algorithm wherein the merit function is processed according to the optimizing algorithm. Thus, there is an effect in that it is possible to process the visual information at a high speed in an optimized process.

In the apparatus for sensing and processing images according to the eighteenth aspect of the present invention, voltage data stored in the control circuit can be partially applied to the control electrode. Thus, there are several effects as follows: it is possible to set the photosensitivity of the photo detector for each row. The output electrodes connected for each column enable the sum of photoelectric current. Further, a shift function or a variable connecting function in a memory on the side of an output side enables the sum of current from the plurality of output electrodes.

In the apparatus for sensing and processing images according to the nineteenth aspect of the present invention, there are effects in that a switching gate in each photoreceptive element serves to apply voltage applied to each row only to a predetermined column, and magnitude of the voltage applied to each photoreceptive element can be stored in a capacitor.

In the apparatus for sensing and processing images according to the twentieth aspect of the present invention, since one terminal of a variable sensitivity photo detector is grounded via the capacitor and is connected via the switching gate to the output terminal. Thus, there are effects as follows: output from the variable sensitivity photo detector can be stored in each photoreceptive element, and results of a plurality of image processing can be synthesized. Further, it is possible to substantially enhance the sensitivity by accumulating output in the capacitor while the voltage is applied to the variable sensitivity photo detector.

The apparatus for sensing and processing images according to the twenty-first aspect of the present invention employs two variable sensitivity photo detectors for one photoreceptive element. Thus, there is an effect in that it is possible to simultaneously execute vertical and horizontal one-dimensional sums of the products.

The apparatus for sensing and processing images according to the twenty-second aspect of the present invention is provided with a surface formed in a two-dimensional array to pass the light signal through both sides thereof. Thus, there is an effect in that it is possible to perform the operation between two images or two-dimensional signals.

The apparatus for sensing and processing images according to the twenty-third aspect of the present invention, is provided with a control circuit for applying a voltage other than zero volts to only one control electrode, and applying voltage of zero volts to the other control electrodes. Thus, there is an effect in that it is possible to output visual information in a row having the applied voltage other than zero volts as photoelectric current in parallel.

The apparatus for sensing and processing images according to the twenty-fourth and the twenty-fifth aspects of the present invention, is provided with depletion layers provided in two pn junctions which are formed between the common semiconductor layer and two semiconductor layers formed thereon. Either of the depletion layers can be adjusted in thickness and expansion since output of a power source connected to one of an electrode is variable in a range from negative voltage to positive voltage. Hence, it is possible to sequentially adjust the sensitivity in the range from negative sensitivity to positive sensitivity.

The apparatus for sensing and processing images according to the twenty-sixth aspect of the present invention, can have a broader depletion layer with the aid of the i-type semiconductor layer, resulting in higher response speed.

The apparatus for sensing and processing images according to the twenty-seventh aspect of the present invention, can have a good resistance to the fluctuation of voltage when the power voltage is equal to zero with the aid of an $n^--n^+-p^+$ semiconductor laminated structure.

The apparatus for sensing and processing images according to the twenty-eighth aspect of the present invention, can have higher response speed and a good resistance to the fluctuation of voltage with the aid of an $n^--i-n^+-p^+$ semiconductor laminated structure.

The apparatus for sensing and processing images according to the twenty-ninth aspect of the present invention can have higher sensitivity with the aid of the interdigital structures which are combined with each other.

In the apparatus for sensing and processing images according to the thirtieth aspect of the present invention, incident rays can transmit through the p-type semiconductor layer or the n-type semiconductor layer having an uncovered electrode so as to reach the depletion layer. Therefore, it is possible to improve the utilization factor of light without a transparent electrode.

In the apparatus for sensing and processing images according to the thirty-first aspect of the present invention, there is an effect in that it is possible to employ a compact variable sensitivity photo detector because of a plane structure thereof.

In the apparatus for sensing and processing images according to the thirty-second aspect of the present invention, there are effects in that it is possible to employ the compact variable sensitivity photo detector having higher sensitivity with the aid of the interdigital structures, and having high utilization factor of light because of the plane structure thereof.

The apparatus for sensing and processing images according to the thirty-third aspect of the present invention can employ a variable photo detector having higher sensitivity since an incident ray is not absorbed or damped because of a wide band gap of the semiconductor layer extending to the depletion layer.

In the apparatus for sensing and processing images according to the thirty-fourth aspect of the present invention, there is an effect in that it is possible to employ a variable sensitivity photo detector having a wavelength sensitivity characteristic which is adjustable by a power supply voltage with the aid of a laminated structure of $n^-$ GaAs layer-$n^-$ AlGaAs layer-$p^+$ AlGaAs layer.

In the apparatus for sensing and processing images according to the thirty-fifth aspect of the present invention, there is an effect in that it is possible to employ a single input multiple output type of variable sensitivity photo detector array.

In the apparatus for sensing and processing images according to the thirty-sixth aspect of the present invention, there is an effect in that it is possible to employ multiple input single output type of variable sensitivity photo detector array.

In the apparatus for sensing and processing images according to the thirty-seventh aspect of the present invention, there is an effect in that it is possible to draw a set of output current in parallel according to a set of power supply voltage with respect to a predetermined input pattern.

In the apparatus for sensing and processing images according to the thirty-eighth aspect of the present invention, there is an effect in that it is possible to change a set of current values injected into light emitting diodes so as to adjust intensity pattern of incident ray generated by the light emitting diode, and concurrently draw the set of output current in parallel according to the pair of power supply voltage.

In the apparatus for sensing and processing images according to the thirty-ninth aspect of the present invention, an artificial retinal device is provided with the photo detector array in which the variable sensitivity photo detectors are integrated in the matrix form, and the sensitivity of the photo detector is set so as to discriminate between a time-varying image and a static image. Thus, there are effects in that it is possible to direct input processing of image signals, and obtain a small-sized and inexpensive artificial retinal device.

In the apparatus for sensing and processing images according to the fortieth aspect of the present invention, the artificial retinal device is provided with a differential amplifier serving to calculate a difference between output signals. Thus, there is an effect in that it is possible to unify a driver mode of Y data driver so as to obtain a further simplified configuration of the artificial retinal device.

In the apparatus for sensing and processing images according to the forty-first aspect of the present invention, the artificial retinal device is provided Lo differentiate output from the photo detector array. Thus, there is an effect in that it is possible to surely recognize a moving object even if an image signal is extremely fine.

In the apparatus for sensing and processing images according to the forty-second aspect of the present invention, a visual information processor is provided with a photoreceptive portion having the integrated photo detectors having a trap level, and a photoreceptive portion control device serving to control a trap carrier in the trap level in each photo detector, and perform processing to visual information irradiated the photoreceptive device by using photoelectric current output from each photo detector. Thus, there is an effect in that it is possible to obtain a visual information processor which can perform demand processing to a plurality of visual information which are sequentially input, and easily perform visual information processing without a special memory member.

In the apparatus for sensing and processing images according to the forty-third aspect of the present invention, a visual information processor is provided with a photoreceptive portion having the integrated photo detectors having the trap level, and a photoreceptive portion control device. The photoreceptive portion control device serves to generate a first photoreceptive sensitivity distribution by applying voltage to each photo detector when the first image pattern is irradiated to the photoreceptive portion. Further, the photoreceptive portion control device serves to input photoelectric current output according to a second photoreceptive sensitivity distribution generated at a time when a second image pattern is irradiated to the photoreceptive portion. Thus, there is an effect in that it is possible to obtain a visual information processor which can easily output results of processing with respect to the two image patterns at a high speed.

In the apparatus for sensing and processing images according to the forty-fourth aspect of the present invention, a visual information processor is provided with a photoreceptive portion having the integrated photo detectors having the trap level, and a photoreceptive portion control device. The photoreceptive portion control device serves to generate a first photoreceptive sensitivity distribution by applying a first voltage to each photo detector when the first image pattern is irradiated to the photoreceptive portion. Further, the photoreceptive portion control device serves to generate a second photoreceptive sensitivity distribution by applying a second voltage to each photo detector when a second image pattern is irradiated to the photoreceptive portion. Thus, there is an effect in that it is possible to obtain a visual information processor which can easily output results of processing with respect to the two image patterns at a high speed.

In the apparatus for sensing and processing images according to the forty-fifth aspect of the present invention, a visual information processor is provided with a photoreceptive portion having the integrated photo detectors having the trap level, and a photoreceptive portion control device. The photoreceptive portion control device serves to apply voltage to each photo detector for a period between a start of detecting movement of an image pattern irradiated to the photoreceptive portion, and an end of detecting the movement thereof. Thus, there is an effect in that it is possible to obtain a visual information processor which can easily detect the movement of images.

In the apparatus for sensing and processing images according to the forty-sixth aspect of the present invention, a visual information processor is provided with a photoreceptive portion and a photoreceptive portion control device. The photoreceptive portion includes integrated photo detectors respectively having the trap level, and the photo detector is provided with two devices having wave length ranges for providing the photosensitivity, which are deviated from each other. The photoreceptive portion control device serves to draw photoelectric current generated at a time when uniform light is irradiated to the photoreceptive portion. Thus, there is an effect in that it is possible to obtain a visual information processor which can control a direction of the photoelectric current output according to a wavelength of the uniform light, and can easily perform addition and subtraction between an image pattern and another image pattern.

In the apparatus for sensing and processing images according to the forty-seventh aspect of the present invention, an information processing device is provided with a control electrode having the trap level, and a signal electrode for accumulating a carrier in the trap level of the control electrode when writing information. Thus, there is an effect in that it is possible to obtain an information processing device which has a further simplified structure, facilitates fabrication thereof, and serves as a non-volatile memory.

In the apparatus for sensing and processing images according to the forty-eighth aspect of the present invention, an information processing device is provided with a control electrode having the trap level, a signal electrode for accumulating a carrier in the trap level of the control electrode when writing information, and a second control electrode provided on a semiconductor without the trap level. Thus, there is an effect in that it is possible to obtain an information processing device which can serve as a non-volatile memory, and modulate a carrier at a high speed.

While the invention has been described in terms of express embodiments, and alternatives have been suggested, it should be recognized that those skilled in the art may make modifications thereof without departing from the spirit and scope of the invention as defined in the appended claims appended hereto.

What is claimed is:

1. An apparatus for sensing and processing images comprising:
    an array of variable sensitivity photo detectors arranged in a matrix form, said variable sensitivity photo detectors having a conversion efficiency which is a monotone, smoothly increasing function of an applied control voltage, wherein the conversion efficiency can assume both positive and negative values;
    a control circuit for feeding rows of said array with voltages for sensitivity control; and
    a neural network for processing currents flowing from columns of said array to ground.

2. An apparatus for sensing and processing images according to claim 1, wherein said control circuit includes a shift register for shifting analog voltage.

3. An apparatus for sensing and processing images according to claim 2, wherein said analog voltage shift register includes a charge coupled device.

4. An apparatus for sensing and processing images according to claim 2, wherein said analog voltage shift register includes a chain of sample/hold circuits.

5. An apparatus for sensing and processing images according to claim 2, wherein a digital shift register having a width of L bits is employed as said analog voltage shift register so as to cooperate with a set of D/A convertors having a width of L bits.

6. An apparatus for sensing and processing images according to claim 2, wherein a chain of digital shift registers having a length of L and a width of one bit is employed as said analog voltage shift register so as to obtain L+1 PCM encoding analog voltage levels.

7. An apparatus for sensing and processing images according to claim 5, wherein an output terminal of said digital shift register is connected to an input terminal thereof so as to obtain a closed loop operation mode.

8. An apparatus for sensing and processing images according to claim 6, wherein an output terminal of said digital shift register is connected to an input terminal thereof so as to obtain a closed loop operation mode.

9. An apparatus for sensing and processing images according to claim 2, wherein a shift register receives input from a function generator.

10. An apparatus for sensing and processing images according to claim 3, wherein a shift register receives input from a function generator.

11. An apparatus for sensing and processing images according to claim 4, wherein a shift register receives input from a function generator.

12. An apparatus for sensing and processing images according to claim 5, wherein a shift register receives input from a function generator.

13. An apparatus for sensing and processing images according to claim 6, wherein a shift register receives input from a function generator.

14. An apparatus for sensing and processing images according to claim 1, wherein said neural network includes a resettable integrator.

15. An apparatus for sensing and processing images according to claim 1, wherein said photo detector in said array is provided with a color filter.

16. An apparatus for sensing and processing images according to claim 1, wherein said photo detectors disposed on alternate rows in said array are shifted by a distance equal to half distance between two adjacent photo detectors in said row so as to provide a hexagonal configuration of said photo detectors.

17. An apparatus for sensing and processing images according to claim 1, wherein said array is provided with a hexagonal configuration of said photo detectors by partially eliminating said photo detectors.

18. An apparatus for sensing and processing images according to claim 16, wherein said photo detector has a hexagonal form.

19. An apparatus for sensing and processing images according to claim 17, wherein said photo detector has a hexagonal form.

20. A method of sensing and processing images comprising the steps of:
    projecting an image on an array having a plurality of variable sensitivity photo detectors, said variable sensitivity photo detectors having a conversion efficiency which is a monotone, smoothly increasing function of an applied control voltage, wherein the conversion efficiency can assume both positive and negative values;
    applying control voltages to rows of said array so as to control sensitivity of said photo detectors; and
    providing a neural network with current flowing from each column of said array to the ground as an input signal so as to perform processing,
    whereby said control voltages form a vector S, said projected image forms a matrix W, and said neural network employs a matrix T;
    wherein said neural network generates an output V defined by V=TWS, wherein said vector S and said matrix T are selected to achieve at least one of focus of attention, horizontal and/or vertical one-dimensional convolution of a kernel, and contents of processing of one-dimensional or two-dimensional orthogonal and non-orthogonal transformation.

21. A method of sensing and processing images according to claim 20, wherein a time dependent image can be processed by using a neural network having a resettable integrator.

22. A method of sensing and processing images comprising the steps of:
    projecting an image on an array having a plurality of photo detectors, said variable sensitivity photo detectors having a conversion efficiency which is a monotone, smoothly increasing function of an applied control voltage, wherein the conversion efficiency can assume both positive and negative values;
    applying control voltages to rows of said array so as to control sensitivity of said photo detectors, wherein a set of said control voltages forms a matrix to be multiplied by a matrix provided by said projected image; and
    classifying said projected image into a class by using a classifier actuated according to current output from each column of said array.

23. A method of sensing and processing images according to claim 22, further comprising the steps of:
   performing said classifying step by using a merit function representing the degree of quality of classification in said classifier;
   processing said merit function according to an optimizing algorithm so as to vary a value of said control voltage according to results of said processing, and thereby optimizing said merit function.

24. An apparatus for sensing and processing images comprising an image sensor including:
   a two-dimensional array of variable sensitivity photo detectors having a conversion efficiency from light to current which is a monotone, smoothly increasing function which varies depending upon magnitude of voltage across two terminals, wherein the conversion efficiency can assume both positive and negative values;
   a control circuit having one terminal of each photo detector connected to a common control electrode for each row, and the other terminal connected to a common output electrode for each column, wherein a plurality of voltage data is stored in said control circuit so as to transfer said data, and said stored voltage data is partially connected to said control electrode;
   a one-dimensional memory enabling shift of said stored data; and
   a fixed connecting portion for connecting between said one-dimensional memory and said output electrode or a variable connecting portion for connecting between said one-dimensional memory and said output electrode.

25. An apparatus for sensing and processing images comprising an image sensor including:
   a two-dimensional array of photoreceptive elements formed by variable sensitivity photo detectors having one terminal directly connected to an output terminal and another terminal connected via a capacitor to the ground and connected via a switching gate to a control terminal, and having a conversion efficiency from light to current which is a monotone, smoothly increasing function which varies depending upon magnitude of voltage across two terminals, wherein the conversion efficiency can assume both positive and negative values, and wherein said control terminal is connected to a common control electrode for each row, and said output terminal is connected to a common output electrode for each column;
   a control circuit having a terminal connected to said control electrode so as to output any voltage; and
   an output circuit having a mechanism for applying current from any one of said output electrodes.

26. An apparatus for sensing and processing images comprising an image sensor including:
   a two-dimensional array of photoreceptive elements formed by variable sensitivity photo detectors having one terminal grounded via a capacitor and connected to an output terminal via a switching gate, and another terminal directly connected to a control terminal, and having a conversion efficiency from light to current which is a monotone, smoothly increasing function which varies depending upon magnitude of voltage across said two terminals, wherein the conversion efficiency can assume both positive and negative values, and wherein said control terminal is connected to a common control electrode for each row, and said output terminal is connected to a common output electrode for each column;
   a control circuit having a terminal connected to said control electrode so as to output any voltage; and
   an output circuit having a mechanism for applying current from any one of said output electrodes.

27. An apparatus for sensing and processing images comprising an image sensor including a two-dimensional array of photoreceptive elements formed by two variable sensitivity photo detectors having a conversion efficiency from light to current which is a monotone, smoothly increasing function which varies depending upon magnitude of voltage across two terminals, wherein the conversion efficiency can assume both positive and negative values, and wherein one terminal of one photo detector is connected to a common control electrode for each row, the other terminal thereof is connected to a common output electrode for each column, and one terminal of the other photo detector is connected to a common electrode for each column, and the other terminal thereof is connected to a common output terminal for each row.

28. An apparatus for sensing and processing images comprising an image sensor including a two-dimensional array of variable sensitivity photo detectors having a conversion efficiency from light to current which is a monotone, smoothly increasing function which varies depending upon magnitude of voltage across two terminals so as to input light signal from both sides of a surface formed by said array, wherein the conversion efficiency can assume both positive and negative values.

29. An apparatus for sensing and processing images comprising an image sensor including:
   a two-dimensional array of variable sensitivity photo detectors having a conversion efficiency from light to current which is a monotone, smoothly increasing function which varies depending upon magnitude of voltage across two terminals, wherein the conversion efficiency can assume both positive and negative values, and wherein one terminal is connected to a common control electrode for each row, and the other terminal is connected to a common output electrode for each column;
   a control circuit optionally varying a position of a voltage vector having voltage other than zero volts with respect to voltage vectors in which only one voltage vector has a voltage other than zero volts and other voltage vectors are all equal to zero volts; and
   a mechanism for connecting said voltage to said control electrode.

30. An apparatus for sensing and processing images according to claim 1, wherein a pair of semiconductor layers formed on a common semiconductor layer are provided to rise in an interdigital form, and teeth portions of said pair of interdigital semiconductor layers are combined with each other so as to form each of said photo detectors.

31. An apparatus for sensing and processing images according to claim 2, wherein a pair of semiconductor layers formed on a common semiconductor layer are provided to rise in an interdigital form, and teeth portions of said pair of interdigital semiconductor layers are combined with each other so as to form each of photo detectors.

32. An apparatus for sensing and processing images according to claim 3, wherein a pair of semiconductor layers formed on a common semiconductor layer are provided to rise in an interdigital form, and teeth portions of said pair of interdigital semiconductor layers are combined each other so as to form each of said photo detectors.

33. An apparatus for sensing and processing images according to claim 4, wherein a pair of semiconductor layers formed on a common semiconductor layer are provided to rise in an interdigital form, and teeth portions of said pair of interdigital semiconductor layers are combined with each other so as to form each of said detectors.

34. An apparatus for sensing and processing images according to claim 5, wherein a pair of semiconductor layers formed on a common semiconductor layer are provided to rise in an interdigital form, and teeth portions of said pair of interdigital semiconductor layers are combined with each other so as to form each of said photo detectors.

35. An apparatus for sensing and processing images according to claim 30, wherein a plurality of photo detectors are adjacently arranged while an electrode connected to a power source is defined as a common electrode.

36. An apparatus for sensing and processing images according to claim 31, wherein a plurality of photo detectors are adjacently arranged while an electrode connected to a power source is defined as a common electrode.

37. An apparatus for sensing and processing images according to claim 32, wherein a plurality of photo detectors are adjacently arranged while an electrode connected to a power source is defined as a common electrode.

38. An apparatus for sensing and processing images according to claim 33, wherein a plurality of photo detectors are adjacently arranged while an electrode connected to a power source is defined as a common electrode.

39. An apparatus for sensing and processing images according to claim 34, wherein said interdigital portion is embedded in said common semiconductor layer, and said electrode is also embedded in said common semiconductor layer in a wiring form.

40. An apparatus for sensing and processing images according to claim 34, wherein a plurality of photo detectors are adjacently arranged while an electrode connected to a power source is defined as a common electrode.

41. An apparatus for sensing and processing images according to claim 30, wherein a plurality of photo detectors are adjacently arranged while an electrode not connected to a power source is defined as a common electrode.

42. An apparatus for sensing and processing images according to claim 31, wherein a plurality of photo detectors are adjacently arranged while an electrode not connected to a power source is defined as a common electrode.

43. An apparatus for sensing and processing images according to claim 32, wherein a plurality of photo detectors are adjacently arranged while an electrode not connected to a power source is defined as a common electrode.

44. An apparatus for sensing and processing images according to claim 33, wherein a plurality of photo detectors are adjacently arranged while an electrode not connected to a power source is defined as a common electrode.

45. An apparatus for sensing and processing images according to claim 34, wherein a plurality of photo detectors are adjacently arranged while an electrode not connected to a power source is defined as a common electrode.

46. An apparatus for sensing and processing images according to claim 30, wherein a plurality of photo detectors are arranged in a matrix form while said two electrodes are defined as common electrodes.

47. An apparatus for sensing and processing images according to claim 31, wherein a plurality of photo detectors are arranged in a matrix form while said two electrodes are defined as common electrodes.

48. An apparatus for sensing and processing images according to claim 32, wherein a plurality of photo detectors are arranged in a matrix form while said two electrodes are defined as common electrodes.

49. An apparatus for sensing and processing images according to claim 33, wherein a plurality of photo detectors are arranged in a matrix form while said two electrodes are defined as common electrodes.

50. An apparatus for sensing and processing images according to claim 34, wherein a plurality of photo detectors are arranged in a matrix form while said two electrodes are defined as common electrodes.

51. An apparatus for sensing and processing images according to claim 30, wherein a plurality of variable sensitivity photo detectors are arranged in a matrix form while two electrodes are defined as common electrodes, and an array of light emitting diodes are arranged on said plurality of photo detectors.

52. An apparatus for sensing and processing images according to claim 31, wherein a plurality of variable sensitivity photo detectors are arranged in a matrix form while two electrodes are defined as common electrodes, and an array of light emitting diodes are arranged on said plurality of photo detectors.

53. An apparatus for sensing and processing images according to claim 32, wherein a plurality of variable sensitivity photo detectors are arranged in a matrix form while two electrodes are defined as common electrodes, and an array of light emitting diodes are arranged on said plurality of photo detectors.

54. An apparatus for sensing and processing images according to claim 33, wherein a plurality of variable sensitivity photo detectors are arranged in a matrix form while two electrodes are defined as common electrodes, and an array of light emitting diodes are arranged on said plurality of photo detectors.

55. An apparatus for sensing and processing images according to claim 34, wherein a plurality of variable sensitivity photo detectors are arranged in a matrix form while two electrodes are defined as common electrodes, and an array of light emitting diodes are arranged on said plurality of photo detectors.

56. An apparatus for sensing and processing images according to claim 30, wherein said interdigital portion is embedded in said common semiconductor layer, and said electrode is also embedded in said common semiconductor layer in a wiring form.

57. An apparatus for sensing and processing images according to claim 31, wherein said interdigital portion is embedded in said common semiconductor layer, and said electrode is also embedded in said common semiconductor layer in a wiring form.

58. An apparatus for sensing and processing images according to claim 32, wherein said interdigital portion is embedded in said common semiconductor layer, and said electrode is also embedded in said common semiconductor layer.

59. An apparatus for sensing and processing images according to claim 33, wherein said interdigital portion is embedded in said common semiconductor layer, and said electrode is also embedded in said common semiconductor layer in a wiring form.

60. An apparatus for sensing and processing images according to claim 56, wherein a plurality of photo detectors are adjacently arranged while an electrode connected to a power source is defined as a common electrode.

61. An apparatus for sensing and processing images according to claim 57, wherein a plurality of photo detectors are adjacently arranged while an electrode connected to a power source is defined as a common electrode.

62. An apparatus for sensing and processing images according to claim 58, wherein a plurality of photo detectors are adjacently arranged while an electrode connected to a power source is defined as a common electrode.

63. An apparatus for sensing and processing images according to claim 59, wherein a plurality of photo detectors are adjacently arranged while an electrode connected to a power source is defined as a common electrode.

64. An apparatus for sensing and processing images according to claim 39, wherein a plurality of photo detectors are adjacently arranged while an electrode connected to a power source is defined as a common electrode.

65. An apparatus for sensing and processing images according to claim 56, wherein a plurality of photo detectors are adjacently arranged while an electrode not connected to a power source is defined as a common electrode.

66. An apparatus for sensing and processing images according to claim 57, wherein a plurality of photo detectors are adjacently arranged while an electrode not connected to a power source is defined as a common electrode.

67. An apparatus for sensing and processing images according to claim 58, wherein a plurality of photo detectors are adjacently arranged while an electrode not connected to a power source is defined as a common electrode.

68. An apparatus for sensing and processing images according to claim 59, wherein a plurality of photo detectors are adjacently arranged while an electrode not connected to a power source is defined as a common electrode.

69. An apparatus for sensing and processing images according to claim 39, wherein a plurality of photo detectors are adjacently arranged while a plurality of photo detectors are adjacently arranged while an electrode not connected to a power source is defined as a common electrode.

70. An apparatus for sensing and processing images according to claim 56, wherein a plurality of photo detectors are arranged in a matrix form while two electrodes are defined as common electrodes.

71. An apparatus for sensing and processing images according to claim 57, wherein a plurality of photo detectors are arranged in a matrix form while two electrodes are defined as common electrodes.

72. An apparatus for sensing and processing images according to claim 58, wherein a plurality of photo detectors are arranged in a matrix form while two electrodes are defined as common electrodes.

73. An apparatus for sensing and processing images according to claim 59, wherein a plurality of photo detectors are arranged in a matrix form while two electrodes are defined as common electrodes.

74. An apparatus for sensing and processing images according to claim 39, wherein a plurality of photo detectors are arranged in a matrix form while two electrodes are defined as common electrodes.

75. An apparatus for sensing and processing images according to claim 56, wherein a plurality of variable sensitivity photo detectors are arranged in a matrix form while two electrodes are defined as common electrodes, and an array of light emitting diodes are arranged on said plurality of photo detectors.

76. An apparatus for sensing and processing images according to claim 57, wherein a plurality of variable sensitivity photo detectors are arranged in a matrix form while two electrodes are defined as common electrodes, and an array of light emitting diodes are arranged on said plurality of photo detectors.

77. An apparatus for sensing and processing images according to claim 58, wherein a plurality of variable sensitivity photo detectors are arranged in a matrix form while two electrodes are defined as common electrodes, and an array of light emitting diodes are arranged on said plurality of photo detectors.

78. An apparatus for sensing and processing images according to claim 59, wherein a plurality of variable sensitivity photo detectors are arranged in a matrix form while two electrodes are defined as common electrodes, and an array of light emitting diodes are arranged on said plurality of photo detectors.

79. An apparatus for sensing and processing images according to claim 39, wherein a plurality of variable sensitivity photo detectors are arranged in a matrix form while two electrodes are defined as common electrodes, and an array of light emitting diodes are arranged on said plurality of photo detectors.

* * * * *